US009074084B2

(12) United States Patent
Harvey et al.

(10) Patent No.: US 9,074,084 B2
(45) Date of Patent: *Jul. 7, 2015

(54) BLENDED FLUOROPOLYMER COMPOSITIONS

(75) Inventors: Leonard W. Harvey, Downingtown, PA (US); Michael Coates, Elverson, PA (US); Julie K. Wright, Widnes (GB)

(73) Assignee: Whitford Corporation, Elverson, PA (US)

( * ) Notice: Subject to any disclaimer, the term of this patent is extended or adjusted under 35 U.S.C. 154(b) by 198 days.

This patent is subject to a terminal disclaimer.

(21) Appl. No.: 13/296,752

(22) Filed: Nov. 15, 2011

(65) Prior Publication Data

US 2012/0076944 A1 Mar. 29, 2012

Related U.S. Application Data

(62) Division of application No. 12/468,580, filed on May 19, 2009.

(60) Provisional application No. 61/057,597, filed on May 30, 2008, provisional application No. 61/100,311, filed on Sep. 26, 2008, provisional application No. 61/145,433, filed on Jan. 16, 2009, provisional application No. 61/145,875, filed on Jan. 20, 2009.

(51) Int. Cl.
| | |
|---|---|
| *C08L 27/18* | (2006.01) |
| *C08L 27/12* | (2006.01) |
| *C08J 3/00* | (2006.01) |
| *C08J 3/12* | (2006.01) |
| *C09D 5/03* | (2006.01) |
| *C09D 127/18* | (2006.01) |
| *C08L 29/10* | (2006.01) |
| *C09D 127/12* | (2006.01) |
| *C09D 129/10* | (2006.01) |

(52) U.S. Cl.
CPC ............ *C08L 27/12* (2013.01); *Y10T 428/2982* (2015.01); *C08J 3/005* (2013.01); *C08J 3/12* (2013.01); *C08J 2327/18* (2013.01); *C08L 27/18* (2013.01); *C08L 2201/50* (2013.01); *C08L 2205/02* (2013.01); *C09D 5/03* (2013.01); *C09D 127/18* (2013.01); *C08L 29/10* (2013.01); *C09D 127/12* (2013.01); *C09D 129/10* (2013.01)

(58) Field of Classification Search
USPC ........................................................ 528/481
See application file for complete search history.

(56) References Cited

U.S. PATENT DOCUMENTS

| | | | | |
|---|---|---|---|---|
| 2,685,707 A | * | 8/1954 | Llewellyn et al. | 264/127 |
| 3,067,262 A | * | 12/1962 | Brady | 570/126 |
| 3,692,759 A | * | 9/1972 | Ocone | 528/481 |
| 3,803,108 A | * | 4/1974 | Ocone | 34/287 |
| 4,112,211 A | * | 9/1978 | Kuhls et al. | 526/219 |
| 4,123,401 A | | 10/1978 | Berghmans et al. | |
| 4,252,859 A | | 2/1981 | Cancannon et al. | |
| 4,610,918 A | | 9/1986 | Effenberger et al. | |
| 4,654,235 A | | 3/1987 | Effenberger et al. | |
| 4,749,752 A | | 6/1988 | Youlu et al. | |
| 4,767,646 A | | 8/1988 | Cordova et al. | |
| 4,904,735 A | | 2/1990 | Chapman, Jr. et al. | |
| 4,914,158 A | | 4/1990 | Yoshimura et al. | |
| 4,952,630 A | | 8/1990 | Morgan et al. | |
| 4,960,431 A | | 10/1990 | Cordova et al. | |
| 5,240,660 A | | 8/1993 | Marshall | |
| 5,250,356 A | | 10/1993 | Batzar | |
| 5,317,061 A | | 5/1994 | Chu et al. | |
| 5,397,629 A | | 3/1995 | Jahn | |
| 5,444,116 A | | 8/1995 | Amin et al. | |
| 5,463,006 A | * | 10/1995 | Abusleme et al. | 526/247 |
| 5,468,798 A | | 11/1995 | Leech | |
| 5,473,018 A | | 12/1995 | Namura et al. | |
| 5,501,879 A | | 3/1996 | Murayama | |
| 5,560,978 A | | 10/1996 | Leech | |
| 5,590,420 A | | 1/1997 | Gunn | |
| 5,603,999 A | | 2/1997 | Namura et al. | |

(Continued)

FOREIGN PATENT DOCUMENTS

| | | | |
|---|---|---|---|
| EP | 0395895 A1 | | 6/1993 |
| EP | 0322877 A2 | | 3/1994 |
| EP | 1839846 A1 | | 10/2007 |
| GB | 2434152 A | * | 7/2007 |
| JP | 2005-320398 A | | 11/2005 |
| WO | WO00/58389 A1 | | 10/2000 |
| WO | WO2006/045753 A1 | | 5/2006 |
| WO | WO 2006114411 A1 | * | 11/2006 |
| WO | WO2007/050247 A2 | | 5/2007 |
| WO | WO2007/061915 A2 | | 5/2007 |
| WO | WO2009/010739 A1 | | 1/2009 |
| WO | WO2009/010740 A1 | | 1/2009 |

OTHER PUBLICATIONS

Lewis, Sr. R., Hawley's Condensed Chemical Dictionary, 2007, p. 1197.

(Continued)

*Primary Examiner* — Nicole M Buie-Hatcher
(74) *Attorney, Agent, or Firm* — Faegre Baker Daniels LLP

(57) ABSTRACT

Blended fluoropolymer compositions are provided, in which a liquid dispersion of a first fluoropolymer is blended with a liquid dispersion of a second fluoropolymer. The first fluoropolymer may be polytetrafluoroethylene (PTFE), such as a low molecular weight PTFE (LPTFE) in the form of an aqueous dispersion having a mean particle size of less than 1.0 microns (μm) and a first melt temperature ($T_m$) of 332° C. or less. The second fluoropolymer may be a melt processable fluoropolymer (MPF), such as methylfluoroalkoxy (MFA), fluorinated ethylene propylene (FEP), or perfluoroalkoxy (PFA), for example, in the form of an aqueous dispersion having a mean particle size of less than 1.0 microns (μm). When the blended fluoropolymer composition is dried, a crystal structure representing a true alloy of the fluoropolymers is formed, having melt characteristics that differ from those of the individual fluoropolymers.

31 Claims, 65 Drawing Sheets

(56) References Cited

U.S. PATENT DOCUMENTS

| | | | |
|---|---|---|---|
| 5,752,278 A | 5/1998 | Gunn | |
| 5,829,057 A | 11/1998 | Gunn | |
| 6,021,523 A | 2/2000 | Vero | |
| 6,034,038 A | 3/2000 | Lockwood et al. | |
| 6,060,167 A * | 5/2000 | Morgan et al. | 428/422 |
| 6,061,829 A | 5/2000 | Gunn | |
| 6,080,474 A | 6/2000 | Oakley et al. | |
| 6,133,359 A | 10/2000 | Bate et al. | |
| 6,143,368 A | 11/2000 | Gunn | |
| 6,255,384 B1 | 7/2001 | McCarthy et al. | |
| 6,436,533 B1 | 8/2002 | Heffner et al. | |
| 6,461,679 B1 | 10/2002 | McMeekin et al. | |
| 6,518,349 B1 | 2/2003 | Felix et al. | |
| 6,518,352 B1 | 2/2003 | Visca et al. | |
| 6,531,559 B1 | 3/2003 | Smith et al. | |
| 6,548,612 B2 | 4/2003 | Smith et al. | |
| 6,583,226 B1 * | 6/2003 | Kaulbach et al. | 525/199 |
| 6,596,207 B1 | 7/2003 | Gunn | |
| 6,649,699 B2 | 11/2003 | Namura | |
| 6,673,125 B2 | 1/2004 | Miller et al. | |
| 6,673,416 B1 | 1/2004 | Nishio | |
| 6,737,165 B1 | 5/2004 | Smith et al. | |
| 6,750,162 B2 | 6/2004 | Underwood et al. | |
| 6,761,964 B2 | 7/2004 | Tannenbaum | |
| 6,800,176 B1 | 10/2004 | Birchenall | |
| 6,800,602 B1 | 10/2004 | Kvita et al. | |
| 6,824,872 B2 | 11/2004 | Coates et al. | |
| 6,846,570 B2 | 1/2005 | Leech et al. | |
| 6,867,261 B2 | 3/2005 | Bladel et al. | |
| 6,872,424 B2 | 3/2005 | Linford et al. | |
| 7,026,036 B2 | 4/2006 | Leech et al. | |
| 7,030,191 B2 | 4/2006 | Namura | |
| 7,041,021 B2 | 5/2006 | Gibson et al. | |
| 7,160,623 B2 | 1/2007 | Smith et al. | |
| 7,166,685 B2 * | 1/2007 | Curtin et al. | 526/243 |
| 7,220,483 B2 | 5/2007 | Coates et al. | |
| 7,276,287 B2 | 10/2007 | Smith et al. | |
| 7,291,678 B2 | 11/2007 | Namimatsu | |
| 7,625,973 B2 | 12/2009 | Ambrose et al. | |
| 8,053,549 B2 * | 11/2011 | Melville et al. | 528/481 |
| 8,404,309 B2 | 3/2013 | Harvey et al. | |
| 2001/0018493 A1 | 8/2001 | Lee et al. | |
| 2001/0048179 A1 | 12/2001 | Stewart et al. | |
| 2004/0072935 A1 | 4/2004 | Blong et al. | |
| 2004/0242783 A1 | 12/2004 | Yabu et al. | |
| 2004/0253387 A1 | 12/2004 | Cavero | |
| 2005/0106325 A1 | 5/2005 | Nishio | |
| 2006/0121288 A1 * | 6/2006 | Mochizuki et al. | 428/421 |
| 2006/0122333 A1 | 6/2006 | Nishio | |
| 2006/0148971 A1 | 7/2006 | Jing et al. | |
| 2006/0180936 A1 | 8/2006 | Japp et al. | |
| 2006/0189719 A1 | 8/2006 | Ambrose et al. | |
| 2006/0293459 A1 | 12/2006 | Yoshimoto et al. | |
| 2007/0004848 A1 | 1/2007 | Hintzer et al. | |
| 2007/0106026 A1 | 5/2007 | Namura | |
| 2007/0106027 A1 * | 5/2007 | Namura | 525/199 |
| 2007/0117929 A1 | 5/2007 | Burch et al. | |
| 2007/0117930 A1 | 5/2007 | Venkataraman et al. | |
| 2007/0255012 A1 | 11/2007 | Smith et al. | |
| 2009/0317553 A1 | 12/2009 | Harvey et al. | |

OTHER PUBLICATIONS

McKeen, L. Fluorinated Coatings and Finishes Handbook—The Definitive User's Guide and Databook, 2006, William Andrew Publishing/Plastics Design Library, pp. 15-36.

International Search Report and Written Opinion mailed Nov. 27, 2009 in International Application No. PCT/US2009/058407.

International Search Report and Written Opinion mailed Nov. 27, 2009 in International Application No. PCT/US2009/058444.

International Search Report and Written Opinion mailed Aug. 3, 2009 in related International Application No. PCT/US2009/044516.

International Preliminary Report on Patentability mailed Sep. 9, 2010 in related International Patent Application No. PCT/US2009/044516.

Written Opinion and Search Report dated Jun. 8, 2012 in related Singapore Application No. 201008280-8.

Office Action mailed Sep. 12, 2013 in related U.S. Appl. No. 12/468,580.

Response filed Dec. 5, 2013 in related U.S. Appl. No. 12/468,580.

"Typical Properties of Fluoropolymer", Plastic Materials Data Sheets, Matweb, 2004.

"DuPont Teflon PTFE Grade 30 Aqueous Dispersion", Matweb, 1996.

Notice of Opposition and Opposition Statement and English Translation of same dated Apr. 11, 2013 relating to European Patent No. EP2342279B1.

Patent Proprietors Response to Notice of Opposition dated Sep. 12, 2013 filed in related European Patent No. EP2342279B1.

Evidential reference identified on p. 2 of the Opposition Statement noted as A1 A1: Delivery notes and formulation evidence items 1 to 8.

Evidential reference identified on p. 2 of the Opposition Statement noted as A2 A2: Technical data sheet for 3M Dyneon TF 5050.

Evidential reference identified on p. 2 of the Opposition Statement noted as A3 A3: Extract from WO 2011/130154.

Evidential reference identified on p. 2 of the Opposition Statement noted as A4 with an English translation A4: Herr Blädel-Bräunlein's statutory declaration.

Evidential reference identified on p. 2 of the Opposition Statement noted as A5 A5: Technical data sheet for 3M Dyneon TF 9205.

Evidential reference identified on p. 2 of the Opposition Statement noted as A6 with an English translation A6: E-mail from 3M in respect of E-15416.

Evidential reference identified on p. 2 of the Opposition Statement noted as A7 A7: Extract from product information for Dyneon polytetrafluoroethylenes.

Evidential reference identified on p. 2 of the Opposition Statement noted as A8 A8: Extract from 3M's Internet pages relating to Dyneon LPTFEs.

Evidential reference identified on p. 2 of the Opposition Statement noted as A9 with an English translation A9: Extract from Kunststoffe Hoechst—Hostaflon.

Evidential reference identified on p. 2 of the Opposition Statement noted as A11 with an English translation A11: Technical data sheet for 3M Dyneon TF 5070.

Evidential reference identified on p. 2 of the Opposition Statement noted as A12 A12: Technical data sheet for 3M Dyneon TF 6900.

Evidential reference identified on p. 2 of the Opposition Statement noted as A13 A13: Technical data sheet for 3M Dyneon TF 6910.

Evidential reference identified on p. 2 of the Opposition Statement noted as A14 A14: WO 2004/076570 (by post only).

* cited by examiner

BLENDED FLUOROPOLYMER COMPOSITIONS

CROSS REFERENCE TO RELATED APPLICATIONS

This application is a divisional of U.S. patent application Ser. No. 12/468,580, entitled BLENDED FLUOROPOLYMER COMPOSITIONS, filed on May 19, 2009, which claims the benefit under Title 35, U.S.C. §119(e) of U.S. Provisional Patent Application Ser. No. 61/057,597, entitled BLENDED FLUOROPOLYMER COMPOSITIONS, filed on May 30, 2008; U.S. Provisional Patent Application Ser. No. 61/100,311, entitled BLENDED FLUOROPOLYMER COMPOSITIONS, filed on Sep. 26, 2008; U.S. Provisional Patent Application Ser. No. 61/145,433, entitled BLENDED FLUOROPOLYMER COMPOSITIONS, filed on Jan. 16, 2009; and U.S. Provisional Patent Application Ser. No. 61/145,875, entitled BLENDED FLUOROPOLYMER COMPOSITIONS, filed on Jan. 20, 2009, the disclosures of each are expressly incorporated by reference herein in their entirety.

BACKGROUND OF THE INVENTION

1. Field of the Invention

The present invention relates to fluoropolymers and, in particular, relates to blended fluoropolymer compositions having improved, synergistic properties.

2. Description of the Related Art

Fluoropolymers are long-chain polymers comprising mainly ethylenic linear repeating units in which some or all of the hydrogen atoms are replaced with fluorine. Examples include polytetrafluoroethylene (PTFE), methylfluoroalkoxy (MFA), fluoro ethylene propylene (FEP), perfluoroalkoxy (PFA), poly(chlorotrifluoroethylene) and poly(vinylfluoride).

Fluoropolymers are amongst the most chemically inert of all polymers and are characterized by an unusual resistance to acids, bases and solvents. They have unusually low frictional properties and have the ability to withstand extremes of temperature. Accordingly, fluoropolymers are utilised in a wide variety of applications in which resistance to extreme environments is necessary. Current applications include the formation of tubing and packing materials within chemical plants, semiconductor equipment, automotive parts and structural cladding.

SUMMARY OF THE INVENTION

The present invention provides blended fluoropolymer compositions. In one embodiment, a liquid dispersion of a first fluoropolymer is blended with a liquid dispersion of a second fluoropolymer. The first fluoropolymer may be polytetrafluoroethylene (PTFE), such as a low molecular weight PTFE (LPTFE) that has been polymerized via a dispersion or emulsion polymerization process, and which has not been agglomerated, irradiated, or thermally degraded. The LPTFE may be in the form of an aqueous dispersion, having a mean particle size of less than 1.0 microns (μm), with the LPTFE having a first melt temperature ($T_m$) of 332° C. or less. The second fluoropolymer may be a melt processable fluoropolymer (MPF), such as methylfluoroalkoxy (MFA), fluorinated ethylene propylene (FEP), or perfluoroalkoxy (PFA), for example, in the form of an aqueous dispersion, and having a mean particle size of less than 1.0 microns. Blending of the dispersions facilitates interaction of the LPTFE and MPF on a submicron level to facilitate intimate blending such that, when the blended fluoropolymer composition is dried, a crystal structure representing a true alloy of the fluoropolymers is formed, having melt characteristics that differ from those of the individual fluoropolymers. The blended fluoropolymer composition may be used to provide a coating having improved impermeability, stain resistance, abrasion resistance, smoothness, and higher contact angles.

In one form thereof, the present invention provides a blended fluoropolymer dispersion, including polytetrafluoroethylene (PTFE) having a first melt temperature ($T_m$) of 332° C. or less, in the form of a liquid dispersion of particles having a mean particle size of 1.0 microns (μm) or less; and a melt processable fluoropolymer (MPF) in the form of a liquid dispersion of particles having a mean particle size of 1.0 microns (μm) or less.

In one embodiment, the polytetrafluoroethylene (PTFE) dispersion may have a mean particle size of 0.9 microns (μm) or less, 0.75 microns (μm) or less, 0.5 microns (μm) or less, 0.4 microns (μm) or less, 0.3 microns (μm) or less, or 0.2 microns (μm) or less, and a first melt temperature ($T_m$) of 330° C. or less, 329° C. or less, 328° C. or less, 327° C. or less, 326° C. or less, and 325° C. or less.

In one embodiment, the polytetrafluoroethylene (PTFE) dispersion is obtained via emulsion polymerization and without being subjected to agglomeration, thermal degradation, or irradiation, and includes less than 1.0 wt. % surfactant, based on the weight of said polytetrafluoroethylene (PTFE) dispersion.

In a further embodiment, the melt processable fluoropolymer (MPF) is a perfluoroalkyl vinyl ether or fluorinated ethylene propylene, and has a melt flow rate (MFR) of at least 4.0 g/10 min.

The melt processable fluoropolymer (MPF) may be perfluoroalkoxy (PFA), and exemplary compositions have a PFA content of 37 wt. % to 80 wt. % and a PTFE content of 20 wt. % to 63 wt. %, based on the total solids of the PTFE and PFA. Other exemplary compositions have a PFA content of 37 wt. % to 65 wt. % and a PTFE content of 35 wt. % to 63 wt. %, based on the total solids of the PTFE and PFA. Further exemplary compositions have a PFA content of 43 wt. % to 63 wt. % and a PTFE content of 37 wt. % to 57 wt. %, based on the total solids of the PTFE and PFA. Further exemplary compositions have a PFA content of 50 wt. % to 60 wt. % and a PTFE content of 40 wt. % to 50 wt. %, based on the total solids of the PTFE and PFA. A further exemplary composition includes 53 wt. % PFA and 47 wt. % LPTFE.

The melt processable fluoropolymer (MPF) may be methylfluoroalkoxy (MFA), and exemplary compositions have a MFA content of 35 wt. % to 90 wt. % and a PTFE content of 10 wt. % to 65 wt. %, based on the total solids of the PTFE and MFA. Other exemplary compositions have a MFA content of 45 wt. % to 76 wt. % and a PTFE content of 24 wt. % to 65 wt. %, based on the total solids of the PTFE and MFA. Further exemplary compositions have a MFA content of 56 wt. % to 76 wt. % and a PTFE content of 24 wt. % to 44 wt. %, based on the total solids of the PTFE and MFA. Still further exemplary compositions have a MFA content of 63 wt. % to 70 wt. % and a PTFE content of 30 wt. % to 37 wt. %, based on the total solids of the PTFE and MFA. A further exemplary composition includes 67 wt. % MFA and 33 wt. % LPTFE.

The melt processable fluoropolymer (MPF) may be fluorinated ethylene propylene (FEP), and exemplary compositions have a FEP content of 25 wt. % to 90 wt. % and a PTFE content of 10 wt. % to 75 wt. %, based on the total solids of the PTFE and FEP. Other exemplary compositions have a FEP content of 35 wt. % to 90 wt. % and a PTFE content of 10 wt.

% to 65 wt. %, based on the total solids of the PTFE and FEP. Further exemplary compositions have a FEP content of 35 wt. % to 55 wt. % and a PTFE content of 45 wt. % to 65 wt. %, or a FEP content of 60 wt. % to 90 wt. % and a PTFE content of 10 wt. % to 40 wt. %, based on the total solids of the PTFE and FEP. Still further exemplary compositions have a FEP content of 40 wt. % to 50 wt. % and a PTFE content of 50 wt. % to 60 wt. %, or a FEP content of 75 wt. % to 85 wt. % and a PTFE content of 15 wt. % to 25 wt. %, based on the total solids of the PTFE and FEP. Further exemplary compositions include either 50 wt. % FEP and 50 wt. % LPTFE, or 75 wt. % FEP and 25 wt. % LPTFE.

The present invention also provides a method of forming a blended fluoropolymer dispersion, including the step of mixing the foregoing components. A fluoropolymer powder may be obtained from the blended fluoropolymer composition by drying the blended composition and, in particular, freeze drying the blended composition. A coating may be formed by applying the blended fluoropolymer composition to the substrate, and heat curing the blended fluoropolymer composition.

In another form thereof, the present invention provides a method of forming a blended fluoropolymer composition, including the steps of providing a first liquid dispersion of polytetrafluoroethylene (PTFE) particles having a first melt temperature ($T_m$) of 332° C. or less and a mean particle size of 1.0 microns or less; providing a second liquid dispersion of particles of a melt processible fluoropolymer (MPF) having a mean particle size of 1.0 microns or less; and mixing the first and second dispersions together.

The method may include the additional step of drying the blended fluoropolymer composition to form a powder and, in particular, freeze drying the blended fluoropolymer composition. The method may also include the additional steps of applying the blended fluoropolymer composition to a substrate; and heat curing the blended fluoropolymer composition.

BRIEF DESCRIPTION OF THE DRAWINGS

The above-mentioned and other features and advantages of this invention, and the manner of attaining them, will become more apparent and the invention itself will be better understood by reference to the following description of an embodiment of the invention taken in conjunction with the accompanying drawings, wherein:

FIGS. 1-11 correspond to Example 1, wherein:

FIG. 1 is a chart of normalized first ΔH of fusion, taken from DSC data, vs. concentration of MFA;

FIG. 2 is a chart of first ΔH of fusion of the MFA phase, taken from DSC data, vs. concentration of MFA;

FIG. 3 is a chart of normalized second ΔH of melting, taken from DSC data, vs. concentration of MFA;

FIG. 4 is a chart of normalized second ΔH of melting of the MFA phase, taken from DSC data, vs. concentration of MFA;

FIG. 5 is a chart of second melt point of the MFA phase, taken from DSC data, vs. concentration of MFA;

FIG. 6 is a chart of the ΔH of fusion for the MFA phase, taken from DSC data, vs. concentration of MFA;

FIG. 7 is a chart of second melt ΔH for the MFA phase, taken from DSC data, vs. concentration of MFA;

FIG. 8 is a chart of fusion temperature of the LPTFE phase, taken from DSC data, vs. concentration of MFA;

FIG. 9 is a chart of the second melt point of the LPTFE phase, taken from DSC data, vs. concentration of MFA;

FIG. 10 is a chart of normalized ΔH of fusion for the LPTFE phase, taken from DSC data, vs. concentration of MFA; and FIG. 11 is a chart of normalized second melt ΔH for the LPTFE phase, taken from DSC data, vs. concentration of MFA;

FIGS. 12-19 correspond to Example 2, wherein:

FIG. 12 is a chart of fusion melt point for the LPTFE phase, taken from DSC data, vs. concentration of FEP;

FIG. 13 is a chart of second melt point for the LPTFE phase, taken from DSC data, vs. concentration of FEP;

FIG. 14 is a chart of fusion melt point for the FEP phase, taken from DSC data, vs. concentration of FEP;

FIG. 15 is a chart of second melt point for the FEP phase, taken from DSC data, vs. concentration of FEP;

FIG. 16 is a chart of normalized fusion ΔH, taken from DSC data, vs. concentration of FEP;

FIG. 17 is a chart of normalized second melt ΔH, taken from DSC data, vs. concentration of FEP; and FIG. 18 is a chart of first melt point of the FEP phase, taken from DSC data, vs. concentration of FEP;

FIG. 19 is a chart of first melt point of the LPTFE phase, taken from DSC data, vs. concentration of FEP;

FIGS. 20-26B correspond to Example 3, wherein:

FIG. 20 is a chart of fusion temperature, taken from DSC data, vs. concentration of PFA;

FIG. 21 is a chart of second melt point, taken from DSC data, vs. concentration of PFA;

FIG. 22 is a chart of normalized fusion ΔH for the PFA phase, taken from DSC data, vs. concentration of PFA;

FIG. 23 is a chart of fusion ΔH for the LPTFE phase, taken from DSC data, vs. concentration of PFA;

FIG. 24 is a chart of normalized fusion ΔH for the LPTFE phase, taken from DSC data, vs. concentration of PFA;

FIG. 25 is a chart of normalized second melt ΔH for the LPTFE phase, taken from DSC data, vs. concentration of PFA;

FIG. 26B is a chart of contact angles of water on PFA/LPTFE blend films of Example 3;

FIGS. 27-34 correspond to Example 4, wherein:

FIG. 27 is a chart of peak normalized second melt ΔH for various MPF's, taken from DSC data, vs. concentration of MPF;

FIG. 28 is a chart of peak normalized fusion ΔH for various MPF's, taken from DSC data, vs. concentration of MPF;

FIG. 29 is a chart of peak normalized LPTFE second melt ΔH for various MPF's, taken from DSC data, vs. concentration of MPF;

FIG. 30 is a chart of peak normalized LPTFE fusion ΔH for various MPF's, taken from DSC data, vs. concentration of MPF;

FIG. 31 is a chart of LPTFE second melt point, taken from DSC data, vs. concentration of MPF;

FIG. 32 is a chart of LPTFE fusion temperature, taken from DSC data, vs. concentration of MPF;

FIG. 33 is a chart of second melt point for the MPF phase, taken from DSC data, vs. concentration of MPF; and FIG. 34 is a chart of fusion melt point for the MPF phase, taken from DSC data, vs. concentration of MPF;

FIGS. 35-37 correspond to Example 5, wherein:

FIG. 35 is a DSC trace for the of MFA of Example 5;

FIG. 36 is a DSC trace for the of LPTFE of Example 5; and

FIG. 37 is a DSC trace for the of MFA/LPTFE blend of Example 5;

FIGS. 41-47 correspond to Example 8, wherein:

FIG. 41 is a chart of normalized ΔH of fusion of PFA vs. PFA fraction;

FIG. 42 is a chart of contact angle vs. PFA fraction;

FIG. 43 is a chart of "Diff CA" vs. PFA fraction;

FIG. 44 is a chart of acid resistance rating vs. PFA fraction;

FIG. 45 is a chart of fusion melt point of PFA vs. PFA fraction;

FIG. 46 is a chart of second melt point of PFA vs. PFA fraction; and

FIG. 47 is a contour plot of acid resistance rating superimposed on a chart of acid hours vs. fraction of PFA;

FIGS. 48-54 correspond to Example 9, wherein:

FIG. 48 is a chart of normalized ΔH of fusion of FEP vs. FEP fraction;

FIG. 49 is a chart of contact angle vs. FEP fraction;

FIG. 50 is a chart of "Diff CA" vs. FEP fraction;

FIG. 51 is a chart of acid resistance rating vs. FEP fraction;

FIG. 52 is a chart of fusion melt point of FEP vs. FEP fraction;

FIG. 53 is a chart of second melt point of FEP vs. FEP fraction; and

FIG. 54 is a contour plot of acid resistance rating superimposed on a chart of acid hours vs. fraction of FEP;

FIGS. 55-61 correspond to Example 10, wherein:

FIG. 55 is a chart of normalized ΔH of fusion of MFA vs. MFA fraction;

FIG. 56 is a chart of contact angle vs. MFA fraction;

FIG. 57 is a chart of "Diff CA" vs. MFA fraction;

FIG. 58 is a chart of acid resistance rating vs. MFA fraction;

FIG. 59 is a chart of fusion melt point of MFA vs. MFA fraction;

FIG. 60 is a chart of second melt point of MFA vs. MFA fraction; and

FIG. 61 is a contour plot of acid resistance rating superimposed on a chart of acid hours vs. fraction of MFA;

FIGS. 62-63 correspond to Example 11, wherein:

FIG. 62 is a chart of DH fusion 1 vs. PFA fraction;

FIG. 63 is a chart of contact angle vs. PFA fraction; and

Figure 1:
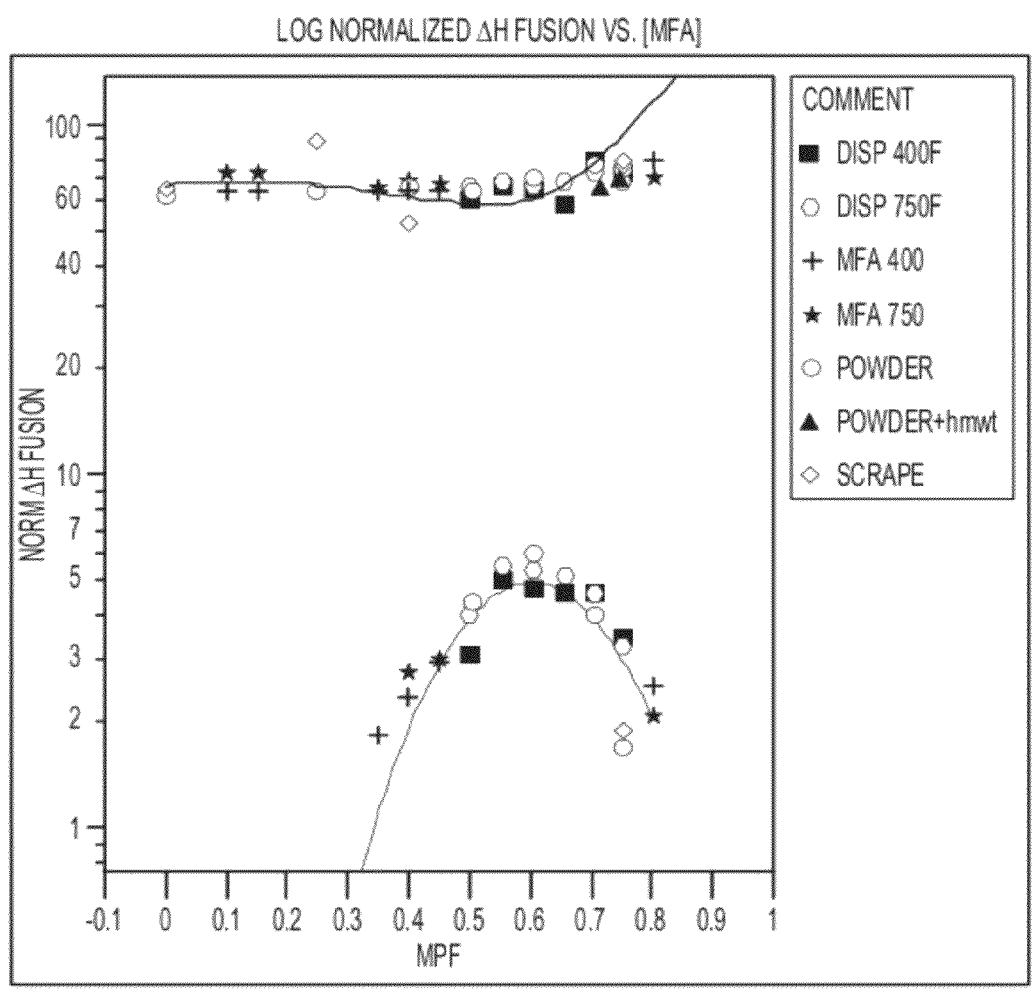
Figure 2:
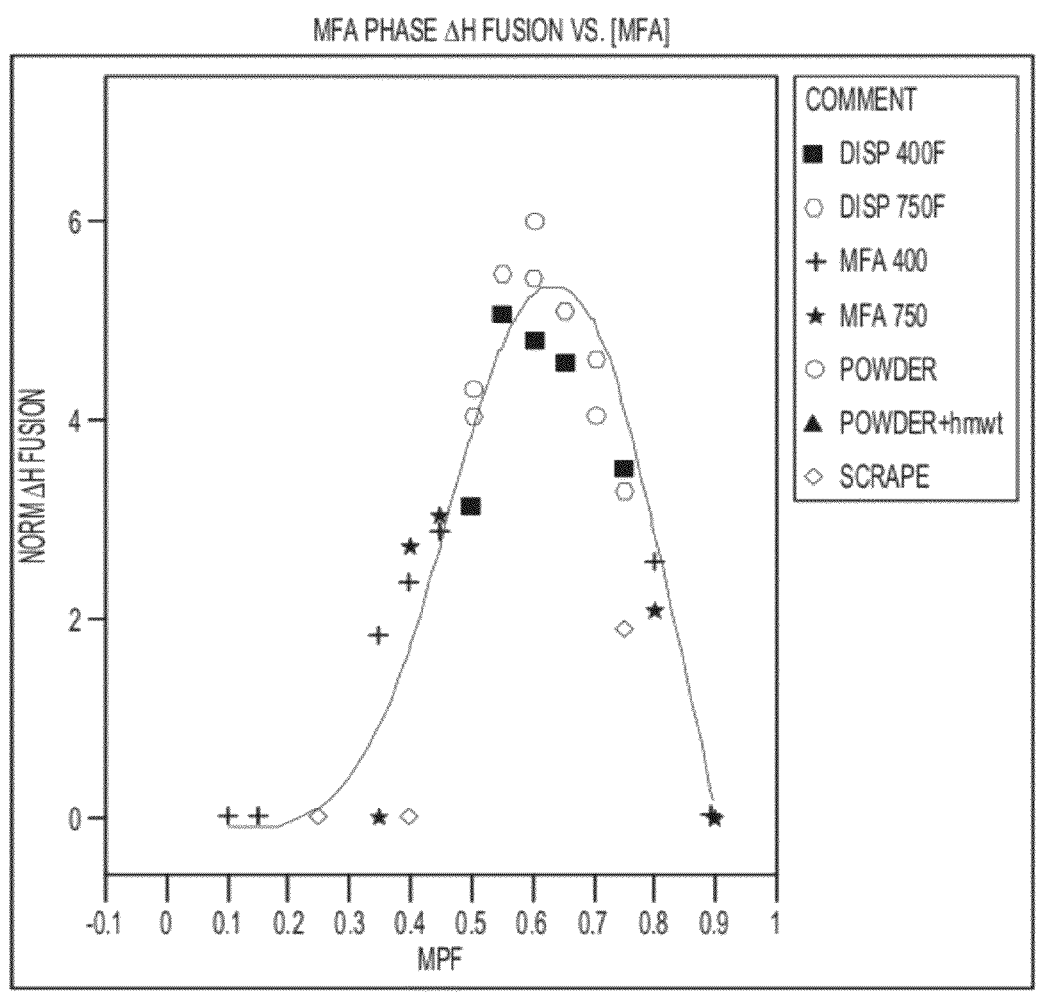
Figure 3:
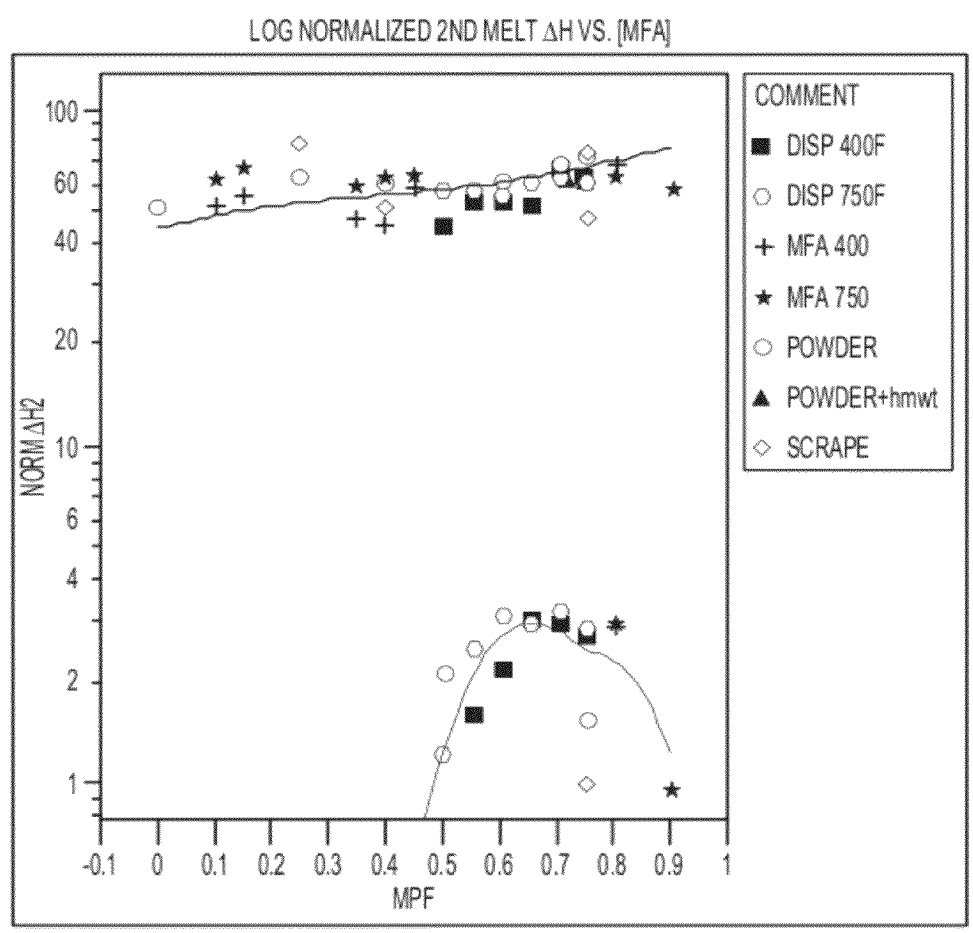
Figure 4:
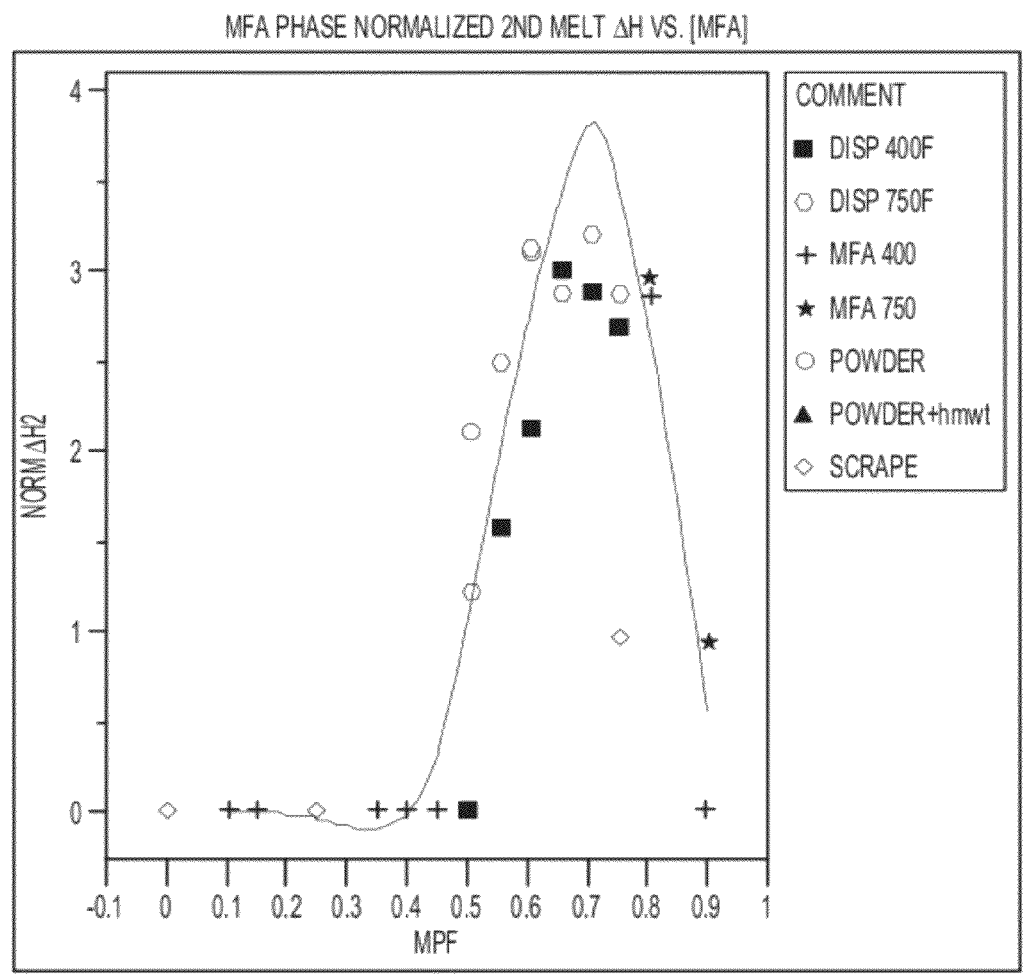
Figure 5:
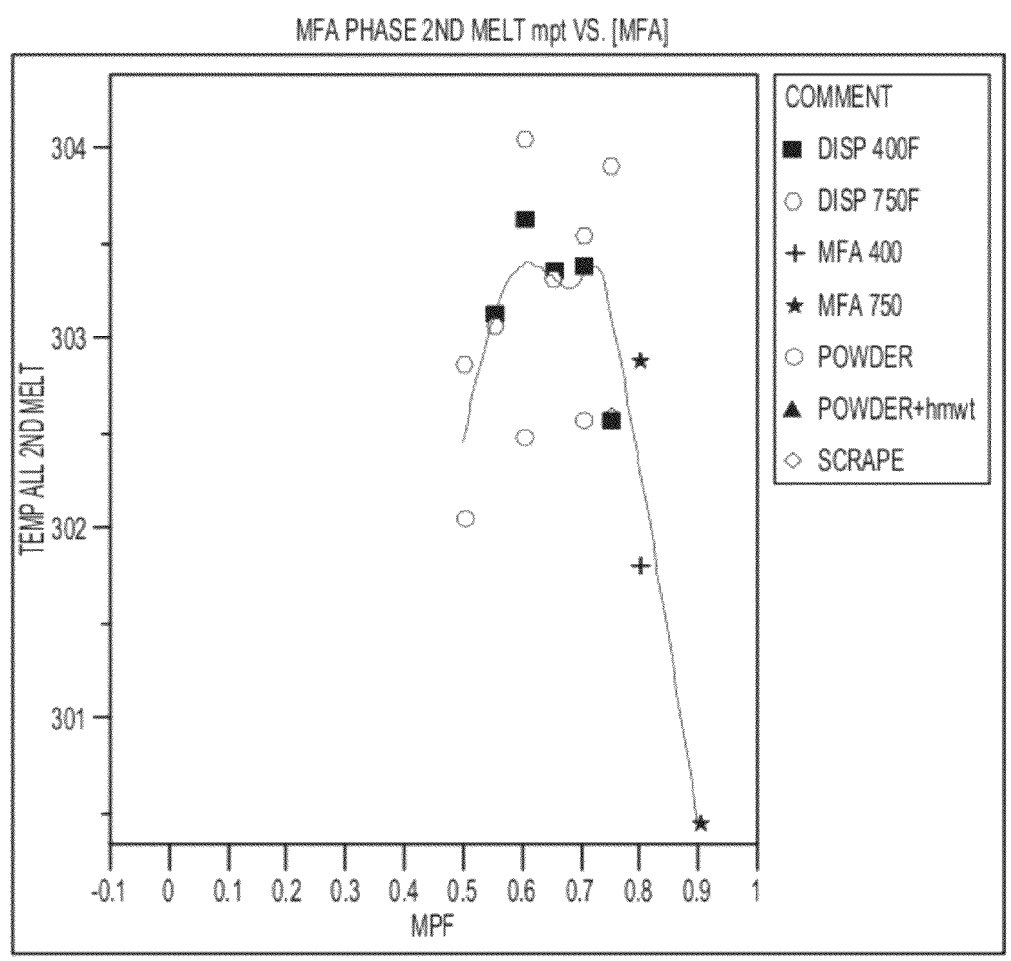
Figure 6:
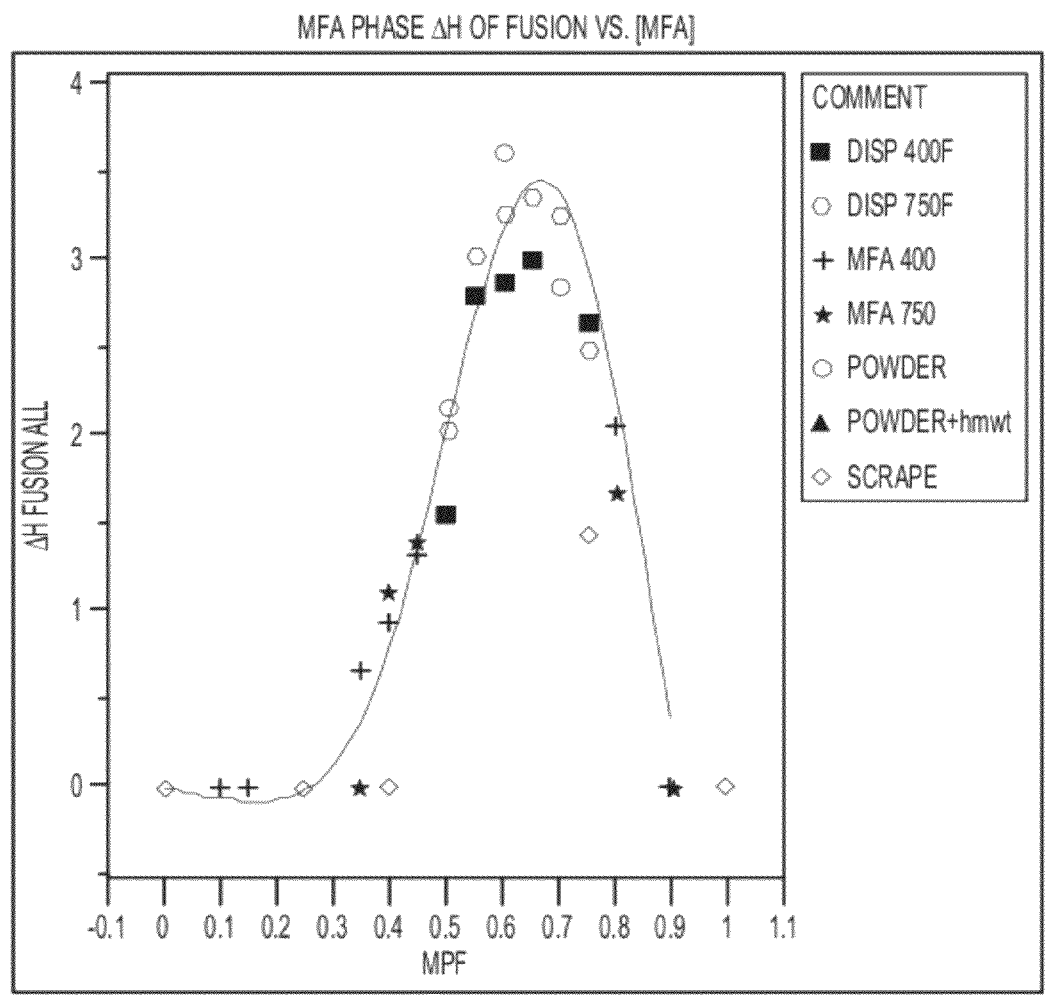
Figure 7:
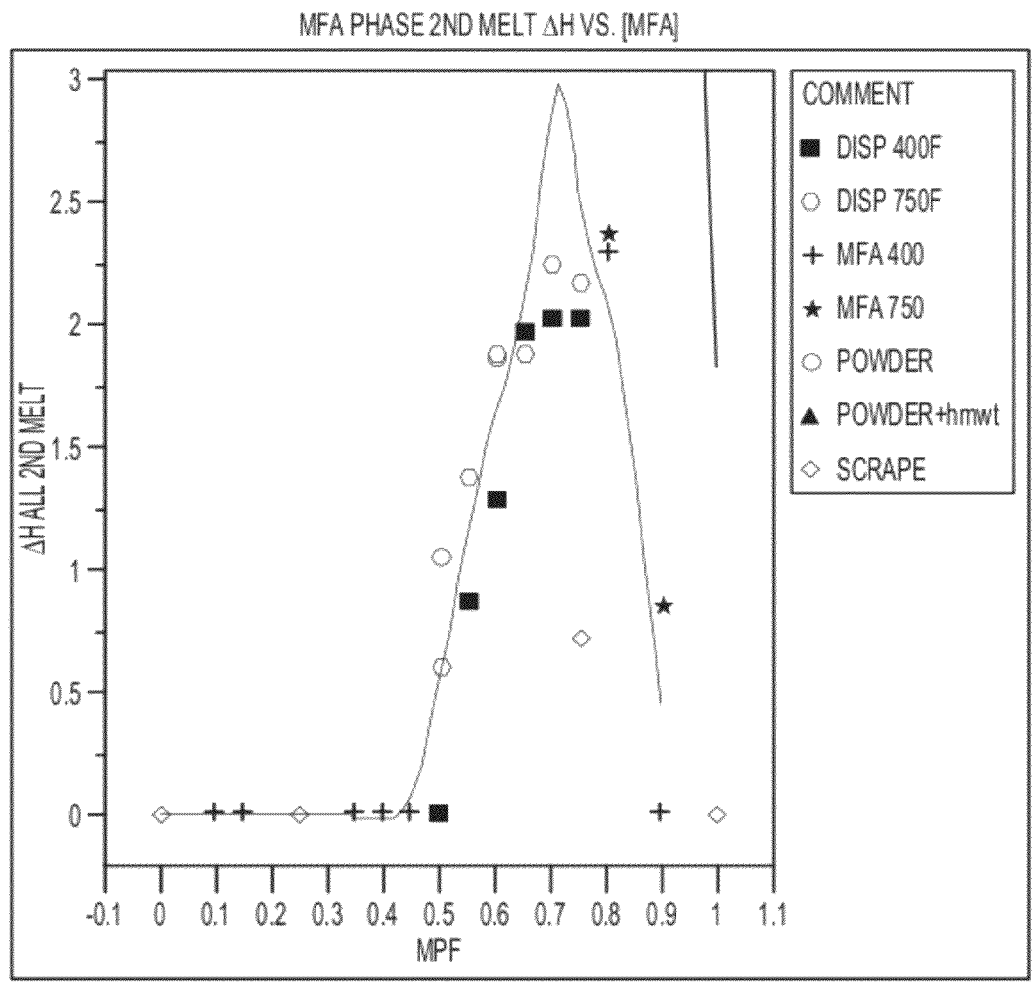

The exemplifications set out herein illustrate embodiments of the invention, and such exemplifications are not to be construed as limiting the scope of the invention in any manner.

DETAILED DESCRIPTION

The present invention provides blended fluoropolymer compositions. In one embodiment, a liquid dispersion of a first fluoropolymer is blended with a liquid dispersion of a second fluoropolymer. The first fluoropolymer may be polytetrafluoroethylene (PTFE), such as a low molecular weight PTFE (LPTFE) that has been polymerized via a dispersion or emulsion polymerization process, and which has not been agglomerated, irradiated, or thermally degraded. The LPTFE may be in the form of an aqueous dispersion, having a mean particle size of less than 1.0 microns (μm), with the LPTFE having a first melt temperature ($T_m$) of 332° C. or less. The second fluoropolymer may be a melt processible fluoropolymer (MPF), such as methylfluoroalkoxy (MFA), fluorinated ethylene propylene (FEP), or perfluoroalkoxy (PFA), for example, in the form of an aqueous dispersion, and having a mean particle size of less than 1.0 microns. Blending of the dispersions facilitates interaction of the LPTFE and MPF on a submicron level to facilitate intimate blending such that, when the blended fluoropolymer composition is dried, a crystal structure representing a true alloy of the fluoropolymers is formed, having melt characteristics that differ from those of the individual fluoropolymers. The blended fluoropolymer composition may be used to provide a coating having improved impermeability, stain resistance, abrasion resistance, smoothness, and higher contact angles.

The present blended fluoropolymer compositions, upon drying or curing, have been found to include two phases, namely, a predominantly LPTFE phase and a predominantly MPF phase.

As shown in the Examples below, blended fluoropolymer compositions made in accordance with the present invention provide improved barrier properties, as demonstrated by the ability of films cast from these compositions, made from blends having component ratios corresponding to maxima in the fusion or re-melt enthalpies of the predominately MPF phase as measured by DSC, to protect aluminum panels from hydrochloric acid attack as compared to compositions that do not correspond to maxima in the fusion or re-melt enthalpies.

As also shown in the Examples below, blended fluoropolymer compositions made in accordance with the present invention also provide improved stain resistance, as demonstrated by powder sprayed substrates made from freeze dried aqueous dispersion fluoropolymer blends having component ratios corresponding to maxima in the fusion or re-melt enthalpies of the predominately MPF phase, as measured by DSC, as compared to compositions that do not correspond to maxima in the fusion or re-melt enthalpies.

1. Low Molecular Weight Polytetrafluoroethylene (LPTFE).

The first fluoropolymer of the present blended fluoropolymer compositions may be a liquid dispersion of polytetrafluoroethylene (PTFE) and, in particular, may be a liquid dispersion of a PTFE having a low molecular weight (LPTFE) and/or other properties as discussed in detail below.

In one embodiment, the LPTFE is produced by a polymerization process that is well known in the art as dispersion polymerization or emulsion polymerization. These polymerization processes may be conducted with chain transfer agents, which reduce the average molecular weight of the fluoropolymers produced, and/or via other methods whereby the polymerization process is controlled to form a liquid dispersion of directly polymerized particles of PTFE having low molecular weight (LPTFE).

In some embodiments, the LPTFE, after being produced by dispersion polymerization or emulsion polymerization, is thereafter not agglomerated, irradiated, or thermally degraded.

In particular, the LPTFE has not been subjected to any agglomeration steps during its manufacture, and therefore retains a small mean particle size as described below.

Further, in embodiments described herein, the LPTFE has not been subjected to thermal degradation to reduce its molecular weight.

Still further, in embodiments described herein, the LPTFE has also not been subjected to irradiation, such as by high energy electron beam, to reduce its molecular weight. In these embodiments, the LPTFE dispersions will not demonstrate a spectra and/or will be below a detection limit when subjected to electron paramagnetic resonance (EPR) or electron spin resonance (ESR) spectroscopy, as opposed to irradiated PTFE, which will demonstrate such a spectra and/or will otherwise have detectable free radicals.

The liquid dispersion of LPTFE in most embodiments will be an aqueous dispersion, though the LPTFE may be dispersed in other solvents and/or LPTFE originally in an aqueous phase may be phase transferred into another solvent, such as organic solvents including hexane, acetone, or an alcohol.

The LPTFE, when produced as described above, will typically have a mean particle size of 1.0 microns (μm) or less, 0.9 microns (μm) or less, 0.75 microns (μm) or less, 0.5 microns (μm) or less, 0.4 microns (μm) or less, 0.3 microns (μm) or less, or 0.2 microns (μm) or less. In some embodiments, the LPTFE may have a mean particle size as low as 30, 50, 100, or 150 nm, or as large as 200, 250, or 350 nm, for example.

The number average molecular weight ($M_n$) of the LPTFE will typically be less than 500,000 and, in most embodiments, may be as low as 10,000 or greater, 20,000 or greater, or 25,000 or greater, or may be as high as 200,000 or less, 100,000 or less, or 70,000 or less, 60,000 or less, or 50,000 or less, for example.

The LPTFE will have a first melt temperature ($T_m$), as determined by a suitable method such as differential scanning calorimetry (DSC), that is either equal to or less than 332° C. In other embodiments, the first melt temperature of the LPTFE may be either equal to or less than 330° C., either equal to or less than 329° C., either equal to or less than 328° C., either equal to or less than 327° C., either equal to or less than 326° C., or either equal to or less than 325° C.

The LPTFE may be provided in the form of an aqueous dispersion which is either unstabilized or is minimally stabilized. As used herein, "unstabilized" or "minimally stabilized" refers to an aqueous dispersion that includes less than 1.0 wt. % of a traditional surfactant, such as non-ionic surfactant or an anionic surfactant, based on the weight of the LPTFE aqueous dispersion. In some embodiments, the LPTFE dispersion may be provided in the form of an aqueous dispersion having less than 1.0 wt. % surfactant, less than 0.8 wt. % surfactant, less than 0.6 wt. % surfactant, or even less than 0.5 wt. % surfactant.

The LPTFE will typically be in the form of a low molecular weight PTFE homopolymer. However, in other embodiments, the LPTFE may include a small amount of modifying co-monomer, in which case the PTFE is a co-polymer known in the art as "modified PTFE" or "trace modified PTFE". Examples of the modifying co-monomer include perfluoropropylvinylether (PPVE), other modifiers, such as hexaflouropropylene (HFP), chlorotrifluoroethylene (CTFE), perfluorobutylethylene (PFBE), or other perfluoroalkylvinylethers, such as perfluoromethylvinylehter (PMVE) or perfluoroethylvinylehter (PEVE). The modifying co-monomer will typically be present in an amount less than 0.1% by weight, for example, with respect to the PTFE.

Suitable LPTFE dispersions include SFN-D, available from Chenguang R.I.C.I, Chengdu, 610036 P.R. China, as well as TE3877N, available from DuPont. These fluoropolymers have characteristics set forth in Table 1 below:

TABLE 1

Characteristics of exemplary low molecular weight polytetrafluoroethylenes (LPTFE)

| LPTFE | Solids content (wt. %) | Molecular weight (Mn) | Mean particle size (μm) | Surfactant (wt. %, based on weight of LPTFE) (type) | First melt temperature (DSC) (° C.) |
|---|---|---|---|---|---|
| SFN-D | 25 | 10,000–20,000 | 0.19 | <1.0% (unstabilized) | typically between 324.5 and 326 |
| TE3877N | 60 | — | 0.2 | 6% (non-ionic) | 327.63 |

The LPTFE dispersions described above, which are provided as aqueous dispersions that are obtained via a controlled dispersion or emulsion polymerization process to produce directly polymerized LPTFE that is not thereafter subjected to agglomeration, thermal degradation, or irradiation, will be appreciated by those of ordinary skill in the art to be distinct from other PTFE materials that are commercially available.

First, the present LPTFE dispersions are distinct from PTFE that is produced by the polymerization process well known in the art as granular or suspension polymerization, which yields PTFE known in the art as granular PTFE resin or granular PTFE molding powder. Granular PTFE resins will typically have a high molecular weight, such as a number average molecular weight ($M_n$) of at least 1,000,000 or more and a first melt temperature ($T_m$) greater than the 332° C., typically much greater than 332° C. Granular PTFE resin is typically provided in solid, powder form including particles having a mean particle size of several microns, typically from 10 to 700 microns (μm). These resins may also be provided as fine cut resins having a mean particle size of 20 to 40 microns (μm), for example.

Additionally, the present LPTFE dispersions are distinct from lower molecular weight materials prepared from high molecular weight granular PTFE resins that have been degraded by irradiation or thermal degradation to form low molecular weight materials known as granular PTFE micropowders, which typically have a particle size ranging between 2 and 20 microns (μm). Examples of granular PTFE micropowders include Zonyl® MP1200, MP1300, and MP1400 resins, available from DuPont (Zonyl® is a registered trademark of E.I. du Pont de Nemours & Co.).

Second, the present LPTFE dispersions are also distinct from high molecular weight PTFE dispersions made from dispersion or emulsion polymerization conducted without chain transfer agents to thereby polymerize a high molecular weight PTFE having a number average molecular weight ($M_n$) of at least 1,000,000 or more, and a first melt temperature ($T_m$) greater than the 332° C., typically much greater than 332° C. These high molecular weight PTFE dispersions are typically stabilized with a traditional surfactant present in an amount greater than 1.0 wt. %, typically much greater than 1.0 wt. %.

Additionally, the present LPTFE dispersions are also distinct from high molecular weight PTFE dispersions that are produced via dispersion or emulsion polymerization and thereafter coagulated or agglomerated. Still further, the present LPTFE dispersions are distinct from high molecular weight PTFE dispersions that are produced via dispersion or emulsion polymerization and thereafter coagulated or agglomerated, and then are subjected to thermal degradation or irradiation to form low molecular weight PTFE powders, known in the art as PTFE micropowders, which are provided as solid powders having a particle size between 2 and 20 microns (μm), such as for use in extrusion and other applications. Examples of PTFE micropowders include Zonyl® MP1000, MP1100, MP1500 and MP1600 resins, available from DuPont (Zonyl® is a registered trademark of E.I. du Pont de Nemours & Co.).

Third, the present LPTFE dispersions are also distinct from LPTFE micropowders that are polymerized via dispersion or emulsion polymerization in the presence of chain transfer agents, and then are agglomerated to form PTFE micropowders having an average particle size of between 2 and 20 microns (μm), for example.

2. Melt Processable Fluoropolymers (MPF).

The second fluoropolymer may be a liquid dispersion of a melt processable fluoropolymer (MPF), such as methylfluoroalkoxy (MFA), perfluoroethylvinyl ether (EFA), fluorinated ethylene propylene (FEP), or perfluoroalkoxy (PFA), for example.

Similar to the LPTFE discussed above, the MPF may be produced by a polymerization process that is well known in the art as dispersion polymerization or emulsion polymerization. These polymerization processes may be conducted with chain transfer agents, which reduce the average molecular weight of the fluoropolymers produced, and/or via other methods whereby the polymerization process is controlled to form a liquid dispersion of directly polymerized particles of MPF.

In most embodiments, the MPF, after being produced by dispersion polymerization or emulsion polymerization, is thereafter not agglomerated, irradiated, or thermally degraded. In particular, the MPF will not have been subjected to any agglomeration steps during its manufacture, and therefore retains a small mean particle size as described below.

The liquid dispersion of MPF in most embodiments will be an aqueous dispersion, though the MPF may be dispersed in other solvents and/or MPF originally in an aqueous phase may be phase transferred into another solvent, such as organic solvents including hexane, acetone, or an alcohol.

The MPF, when produced as described above, will typically have a mean particle size of 1.0 microns (μm) or less, 0.9 microns (μm) or less, 0.75 microns (μm) or less, 0.5 microns (μm) or less, 0.4 microns (μm) or less, 0.3 microns (μm) or less, or 0.2 microns (μm) or less. In particular, the MPF may have a mean particle size as low as 30, 50, 100, or 150 nm, or as large as 200, 250, or 350 nm, for example.

The MPF may also be provided in the form of an aqueous dispersion which is either unstabilized or is minimally stabilized. As used herein, "unstabilized" or "minimally stabilized" refers to an aqueous dispersion that includes less than 1.0 wt. % of a traditional surfactant, such as non-ionic surfactant or an anionic surfactant, based on the weight of the MPF aqueous dispersion. In some embodiments, the MPF dispersion may be provided in the form of an aqueous dispersion having less than 1.0 wt. % surfactant, less than 0.8 wt. % surfactant, less than 0.6 wt. % surfactant, or even less than 0.5 wt. % surfactant.

Typically, the melt flow rate (MFR) of the MPF will be greater than 4 g/10 min, as determined by ASTM D1238.

Also, the MPF will typically have a co-monomer content, i.e., a content of one or more monomers other than tetrafluoroethylene (TFE), of about 3.0 wt. % or greater, such as 4.0 wt. % or greater, 4.5 wt. % or greater, 5.0 wt. % or greater, 5.5 wt. % or greater, or 6.0 wt. % or greater.

Suitable MPF dispersions include TE7224 (PFA), available from DuPont, 6900Z (PFA), available from Dyneon LLC, TE9568 (FEP), available from DuPont, Neoflon ND-110 (FEP), available from Daikin, and Hyflon XPH 6202-1 (MFA), available from Solvay. These MPF dispersions have characteristics set forth in Table 2 below:

TABLE 2

| | Characteristics of exemplary melt processable fluoropolymers (MPF) | | | |
|---|---|---|---|---|
| MPF (type) | Solids content (wt. %) | Mean particle size (μm) | Melt flow rate (MFR) (g/10 min) | First melt temperature (DSC) (° C.) |
| DuPont TE7224 (PFA) | 58.6 | 0.26 | 2.4 | 313.0 (shoulder 321.2) |
| Dyneon 6900Z (PFA) | 49.4 | 0.31 | 19.4 | 310.25 |
| DuPont TE9568 (FEP) | 55.6 | 0.17 | 11.9 | 257.84 |
| Daikin Neoflon ND-110 (FEP) | 56.5 | 0.16 | — | 232.83 |
| Solvay Hyflon XPH 6202-1 (MFA) | 27.2 | 0.28 | 4.5 | 306.31 (shoulder 287.29) |

3. Blended Fluoropolymer Compositions.

To form the blended fluoropolymer compositions of the present invention, a LPTFE liquid dispersion and a MPF liquid dispersion are blended together. When liquid dispersions are used, the dispersions may have varying solids contents, and one of ordinary skill in the art will recognize that the wet weights of the liquid LPTFE and MPF dispersions may be selected based on the solids contents of the dispersions and the desired relative weight percent ratio of the LPTFE and MPF that is desired in the resulting blended compositions.

Notably, because the LPTFE and the MPF are provided in the form of liquid dispersions having the small mean particle sizes set forth above, upon blending of the dispersions particles of the LPTFE and MPF are brought into contact with each other at the submicron level, prior to later processing steps in which the dispersions are dried or melted, for example. As discussed above, the LPTFE and MPF are not agglomerated prior to blending, such that the submicron interaction of the LPTFE and MPF is thought to facilitate the formation of the highly crystalline form of the dried or cured fluoropolymer blend that is believed to be important to achieving the beneficial results obtained with the present blended compositions.

In particular, it is thought that the blended fluoropolymer compositions of the present invention, and the manner of blending same, results in a better packing of the LPTFE and MPF in the MPF crystal phase. As discussed in the Examples below, in one embodiment, optimal packing of the crystals for any LPTFE or MPF may be determined by finding the maximum melting point of the re-melt peak and/or the maximum normalized heat of fusion/2nd melt for the MPF phase of the two components under examination by DSC. Furthermore, as also discussed in the Examples below, the compositions associated with these maxima also correspond to peaks in the contact angle data and acid etch resistance of these materials.

The relative ratios, fractions, or weight percents of the LPTFE and MPF in the blended fluoropolymer compositions described herein are based on the total weight of the LPTFE and MPF fluoropolymers, excluding other fluoropolymers other than LPTFE and MPF as well as non-fluoropolymer components that may be present, such as water or other solvents, surfactants, pigments, fillers, and other additives.

The LPTFE may comprise as little as 5 wt. %, 10 wt. %, or 15 wt. %, or as much as 85 wt. %, 90 wt. %, or 95 wt. % by weight of the blended composition. In one embodiment, the LPTFE may comprise between 40 wt. % and 60 wt. % of the blended composition, such as 50 wt. % of the blended composition. The MPF may comprise as much as 85 wt. %, 90 wt. %, or 95 wt. %, or as little as 5 wt. %, 10 wt. %, or 15 wt. % by weight of the blended composition. In one embodiment, the MPF may comprise between 40 wt. % and 60 wt. % of the blended composition, such as 50 wt. % of the blended composition.

The following are exemplary content ranges for the MPF and LPTFE fluoropolymers in blends of the present invention that, as will be apparent from the Examples below, have been found to embody the beneficial characteristics of the present invention. The content ranges set forth below are inclusive of all intermediate integer values.

Blends of LPTFE and MFA may include, in one embodiment, from 35 wt. % to 90 wt. % MFA and from 10 wt. % to 65 wt. % LPTFE. In another embodiment, such blends may include from 45 wt. % to 76 wt. % MFA and from 24 wt. % to 65 wt. % LPTFE. In another embodiment, such blends may include from 56 wt. % to 76 wt. % MFA and from 24 wt. % to 44 wt. % LPTFE. In another embodiment, such blends may include from 63 wt. % to 70 wt. % MFA and from 30 wt. % to 37 wt. % LPTFE. In a further embodiment, such blends may include 67 wt. % MFA and 33 wt. % LPTFE.

Blends of LPTFE and FEP may include, in one embodiment, from 25 wt. % to 90 wt. % FEP and from 10 wt. % to 75 wt. % LPTFE. In another embodiment, such blends may include from 35 wt. % to 90 wt. % FEP and from 10 wt. % to 65 wt. % LPTFE. In another embodiment, such blends may include either from 35 wt. % to 55 wt. % FEP and from 45 wt. % to 65 wt. % LPTFE, or from 60 wt. % to 90 wt. % FEP and from 10 wt. % to 40 wt. % LPTFE. In another embodiment, such blends may include either from 40 wt. % to 50 wt. % FEP and from 50 wt. % to 60 wt. % LPTFE, or from 75 wt. % to 85 wt. % FEP and from 15 wt. % to 25 wt. % LPTFE. In a further embodiment, such blends may include either 50 wt. % FEP and 50 wt. % LPTFE, or 75 wt. % FEP and 25 wt. % LPTFE.

Blends of LPTFE and PFA may include, in one embodiment, from 37 wt. % to 80 wt. % PFA and from 20 wt. % to 63 wt. % LPTFE. In another embodiment, such blends may include from 37 wt. % to 65 wt. % PFA and from 35 wt. % to 63 wt. % LPTFE. In another embodiment, such blends may include from 43 wt. % to 63 wt. % PFA and from 37 wt. % to 57 wt. % LPTFE. In another embodiment, such blends may include from 50 wt. % to 60 wt. % PFA and from 40 wt. % to 50 wt. % LPTFE. In a further embodiment, such blends may include 53 wt. % PFA and 47 wt. % LPTFE.

Aqueous dispersions of the first and second fluoropolymers may be blended with slow stirring, for example, or via another low or medium shear method which minimizes the potential for agglomeration, coagulation, or fibrillation of the fluoropolymer particles.

The blended fluoropolymer compositions may be used in the form of a blended dispersion, such as part of a wet coating system which is applied to a substrate and subsequently cured, such as by heat curing, to form a coating of film. The blended fluoropolymer compositions may themselves comprise the coating or film, or may be a component of a more fully formulated coating system which includes other components. Also, the blended fluoropolymer compositions may themselves be, or may be a component of, a primer coating which is applied directly to the surface of a substrate, and/or may themselves be, or may be a component of, an overcoat which is applied over a primer coating.

The blended fluoropolymer compositions will typically be heat cured, but may also be dried, such as by water evaporation, freeze drying, or spray drying, for example, to form blended powders. The blended fluoropolymers may be used as powders and/or may be formed into solid pellets that may be used to manufacture extruded articles such as wire, cable, fuel hose liners or other tubing, and injection moldable items.

The blended fluoropolymer compositions may also include auxiliary components or additives, such as fillers, reinforcement additives, pigments, and film formers, if desired, depending on the end use application of the blended fluoropolymer compositions.

4. Freeze Drying of the Blended Fluoropolymer Compositions.

In drying a blended fluoropolymer dispersion made in accordance with the present invention using freeze drying, the blended dispersion is frozen in a freezer at a temperature below 0° C., such as at a temperature in the range of −60° C. to −20° C. Typically, freezing might be completed in 6 hrs to 24 hrs. The blended aqueous dispersion may be poured, scooped or otherwise transferred into a tray prior to freezing, and the tray is then placed into the freezer and frozen within the tray.

The fluoropolymer dispersions may be aqueous, with or without surfactant and with or without bridging solvents (organic solvent used to aid the dispersion/solvating of additional resins). If bridging solvents are used, they should be at concentrations low enough and have high enough melting points so that freezing is not inhibited.

Then, sublimation is carried out, such as by using subatmospheric pressure or a vacuum. The use of a reduced pressure causes sublimation of the carrier from a frozen state directly to a gaseous state, avoiding the solid to liquid and liquid to gas transition. The reduced pressure may be created by means of a vacuum pump, for example, in the range 0.01 atm to 0.99 atm, or 0.04 atm to 0.08 atm. Typically, sublimation might be completed in 12 hrs to 48 hrs.

The freeze drying may be carried out at a temperature which is in practice below the glass transition temperature of the fluoropolymer. The glass transition temperature, $T_g$, of a polymer is the temperature at which it changes from a glassy form to a rubbery form. The measured value of $T_g$ will depend on the molecular weight of the polymer, its thermal history and age, and on the rate of heating and cooling. Typical values are MFA about 75° C., PFA about 75° C., FEP about −208° C., PVDF about −45° C. Also, the temperature may be controlled to assist the sublimation process and avoid melting of the carrier liquid. It is a beneficial coincidence that these controls also maintain temperatures below the Tg values for some of the materials listed. Thus, the method may be carried out at ambient temperature. Alternatively, the method may be carried out at a temperature above ambient temperature, in order to reduce the time taken to complete the process.

The blended fluoropolymer composition may be treated after sublimation has occurred or at any point during the process of the present invention. Such modifications may include, milling or irradiation of the fluoropolymer composition. Irradiation of the fluoropolymer composition would generally be carried out after milling to assist in particle size control. Milling adjusts the particle size distribution of the fluoropolymer composition, for example reducing the mean particle size to produce a finer powder. Typically the milling would be carried out conventionally in a pin or jet mill.

Where the method additionally comprises irradiation of the modified fluoropolymer particles, this would typically be carried out on the powder, but alternatively on the dispersion. Irradiation adjusts the melt characteristics of the modified fluoropolymer, for example to lower the melting temperatures/glass transition temperatures and increase the melt flow rate. Irradiation of fluoropolymer dispersions is discussed in U.S. Pat. No. 7,220,483, the disclosure of which is expressly incorporated herein by reference.

The freeze drying method does not result in the tight agglomeration of the particles, but instead produces a fine powder, which is suitable for use in extrusion, conventional powder spray application techniques or for redispersion in aqueous or organic media. The friable powder can be broken down easily for particle size modification. The method may be carried out at a temperature below the glass transition temperature of the fluoropolymer, in contrast to the known processes involving spray drying and coagulation, which require temperatures well in excess of 100° C. The use of ambient temperature allows greater energy efficiency, while the use of temperatures that are above ambient temperature, but below the glass transition temperature, can be used to increase the speed with which the sublimation proceeds. Temperatures above ambient can also be used to assist secondary drying, to drive off any remaining liquid carrier traces.

The freeze drying method can be used to prepare a modified fluoropolymer powdered material whether the fluoropolymer would tend to be fibrillatable or non-fibrillatable. A fibrillatable polymer is one which forms fibers when exposed to a shear force. The known methods, which involve spray drying and coagulation, both expose the solid fluoropolymer particles to shear forces, which can result in the production of an intractable material. The present invention does not involve shear forces at any stage and is therefore suitable for use with a fibrillatable fluoropolymer. The method may be used to prepare a modified fluoropolymer powdered material from a pumpable or non-pumpable suspension of the solid fluoropolymer particles in a liquid carrier. The dispersion may be non-pumpable because of high viscosity or shear sensitivity. The method does not involve any steps where the suspension must be pumped. Instead, the dispersion may be poured or scooped into the tray for freezing, and the solid, frozen block may be transferred into the vacuum chamber.

EXAMPLES

The following non-limiting Examples illustrate various features and characteristics of the present invention, which is not to be construed as limited thereto. Throughout the Examples and elsewhere herein, percentages are by weight unless otherwise indicated.

Several of the Figures herein were originally prepared in color, and included characters of varying color to represent data points associated with different types or grades of LPTFE and/or MPF materials that were tested, in order to distinguish data associated with the different types or grades of such materials. The Figures are now presented herein in black and white to primarily illustrate trends in the data based on the collection of data points, and without need to associate the various characters and data points with the particular types or grades of LPTFE and/or MPF materials that were used.

Introduction to Examples 1-5

Examples 1-3 present three data sets for blends of LPTFE (SFN-D, Chenguang) with each of PFA (du Pont PFA TE7224, Lot#0804330005, Solids=58.6%) (Example 1); FEP (DuPont FEP dispersion TE9568, Lot#080333032, Solids=55.6%) (Example 2); and PFA (Solvay Hyflon MFA XPH 6202-1, Lot# Lab, Solids=27.2%) (Example 3). The data presented was obtained using differential scanning calorimetry (DSC) and, in most cases, individual data points in the Figures were each taken from DSC curves.

In Examples 1-3, 'normalized' means data that is normalized for the fraction of the given component in the original mixture, i.e., for the SFN-D phase the normalized SFN-D data is given by, {SFN-D data}/(1-[MPF]).

The preparation of blended fluoropolymer compositions for Examples 1-4 is outlined as follows. The given amounts of aqueous fluoropolymer dispersions are mixed under air in a mixer for 30 minutes to ensure homogenous mixture of the dispersions. The mixture is mixed under low to medium shear to avoid coagulation of blended dispersion. A plastic eye-dropper is used to place a known weight of the mixed, blended dispersion into a pre-weighed drying dish. The dispersion is flashed at 100° C. in an oven for 30 minutes, and the residual powder is then dried at 200° C. for an additional 30 minutes. After the dried powder is cooled to room temperature, the powder is weighed and the wt. % solids in the mixed dispersion is calculated. The blended fluoropolymer powder is then ready for DSC analysis.

For DSC analysis, 10 mg (+/−1 mg) of the dried powder is placed in a aluminum DSC sample pan, and the pan is sealed with a standard lid. The heating and cooling cycles of the DSC are as follows: (1) ramp 15.0° C./min to 400° C.; (2) isothermal for 1.00 min; (3) ramp 15.0° C./min to 135° C.; (4) isothermal for 1.00 min; (5) ramp 15.0° C./min to 400° C.; and (6) air cool.

The melting peaks are obtained during the (1) ramping up heating process. The crystallization peaks are obtained in the (3) cooling process. The 2nd melting peaks are obtained at the (5) heating process.

Example 1

MFA/LPTFE Blends

Samples of MFA/SFN-D blends were obtained from a variety of sources including powders formed by freeze drying, dried mixed dispersions, and scraped dried films. The initial form of the blend did not influence the observations.

The main observation made in the DSC for these materials is the fact that there is a maximum in the re-melt and fusion peaks for the MFA phase which corresponds with a maximum in the observed melting points as well. These maxima occur at a composition known to give the beneficial effects of the present invention (i.e., at approximately 65%-75% [MFA]; see FIGS. 1-5) and are believed to be characteristic of it. In these compositions the SFN-D phase also yields higher melt enthalpies relative to pure SFN-D however in this case the melting points are lower (FIGS. 8-11). It appears that both phases experience an increase in crystallinity under these conditions and in the case of the MFA phase it appears that this may be associated with denser crystals. In other words, the compositions of both phases appear to be more crystalline. This will undoubtedly improve permeability resistance and is also expected to lower surface energy (reducing staining etc).

When all the MFA data are fitted there is a maximum in the re-melt peak of the MFA phase both for peak area (heat of melting) and melting point at approximately 70% MFA which corresponds to the desired properties. The heat of fusion data appears to shift its peak to slightly lower MFA content. This may be due to incomplete mixing of the first and second fluoropolymers at the first melting point, but may be more likely due to an apparent shift in melting point when the sample is heated vs. cooled.

The non-normalized data is shown FIGS. 6-9 and shows the same maximum in the $\Delta H\ 2^{nd}$ melt curve.

Considering FIGS. 1-4 and FIGS. 9-10 it can be seen that both the LPTFE phase and the MFA phase experience increased in crystallinity at compositions between 65-75% MFA.

Example 2

FEP/LPTFE Blends

Figure 18:
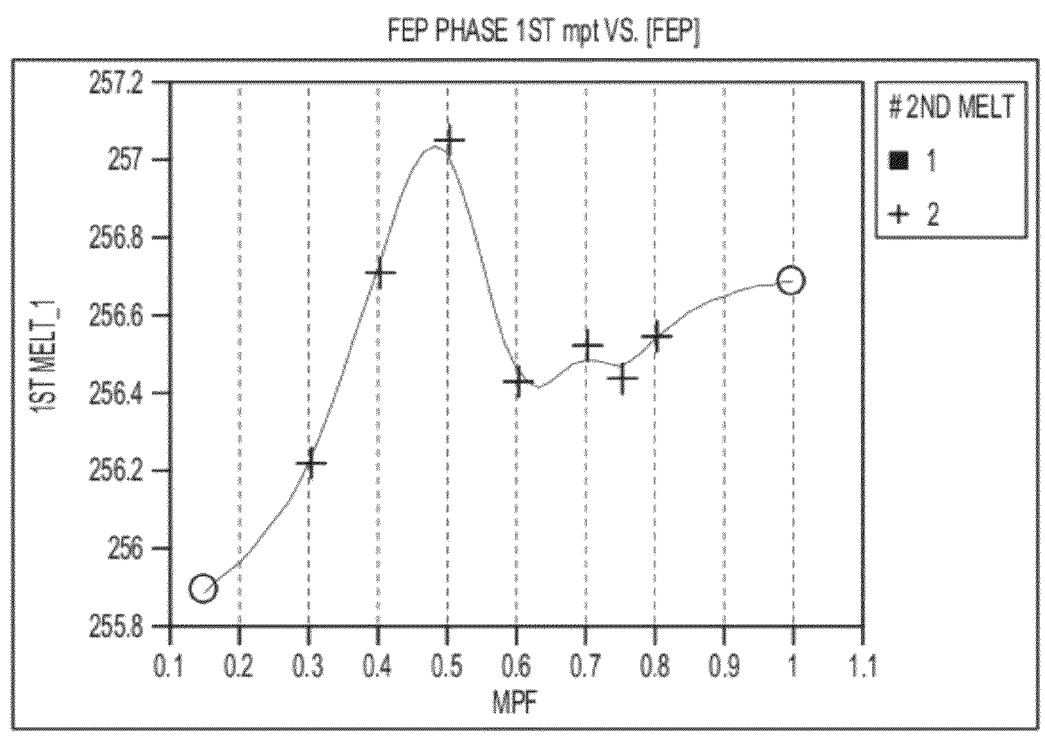
Figure 19:
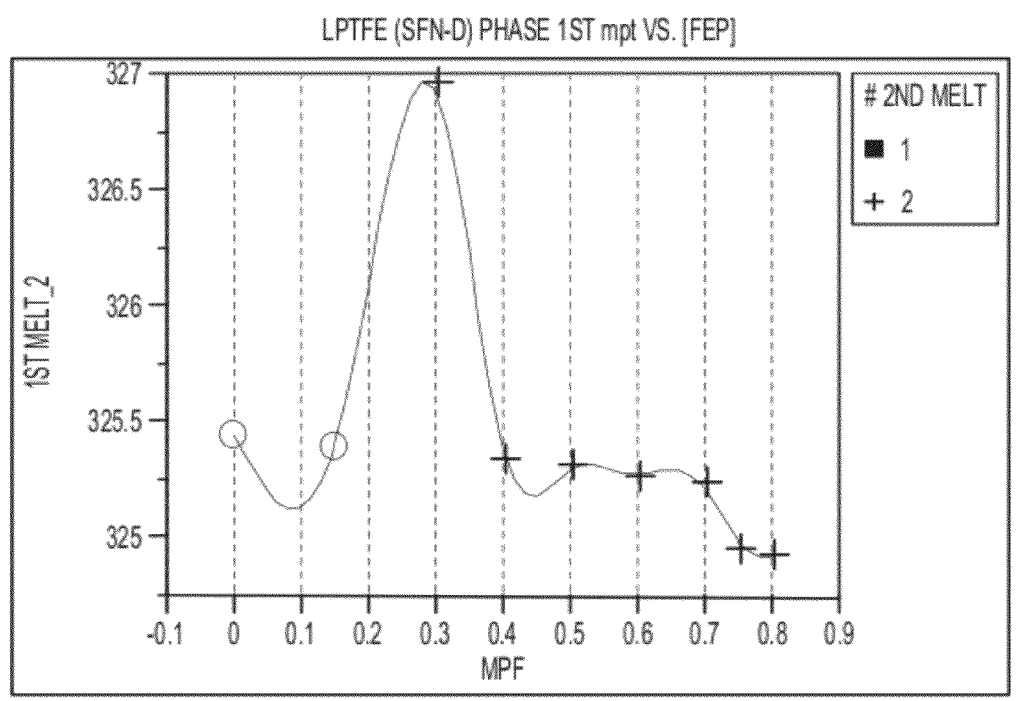
Figure 20:
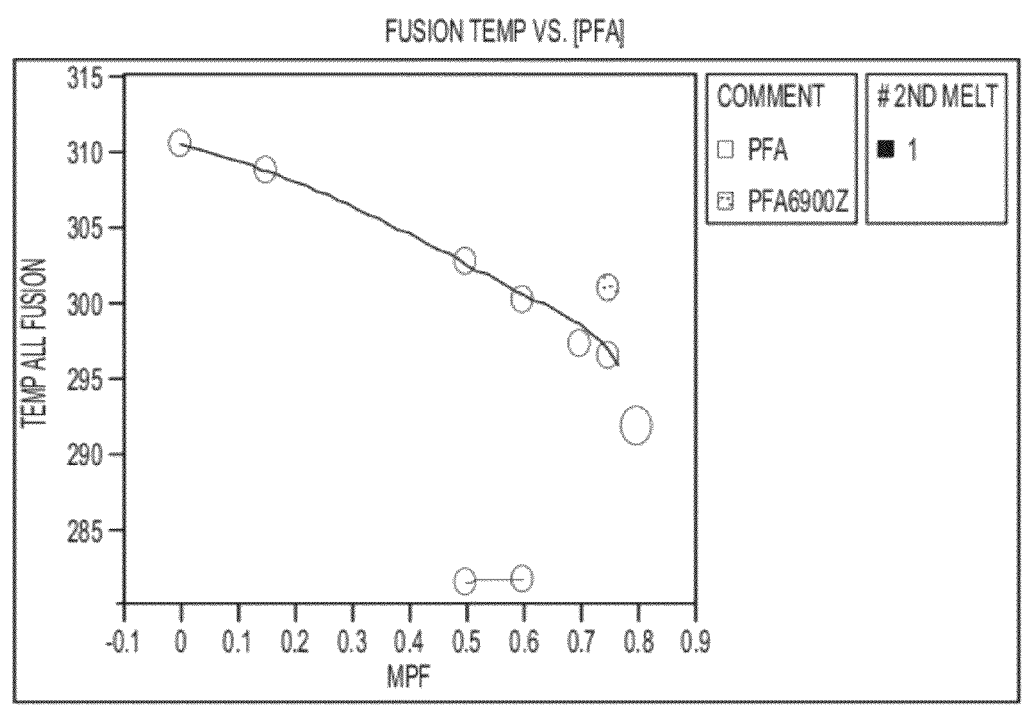

With respect to FEP, it appears that there might be 2 peaks in the FEP phase melt and fusion enthalpy curves, at approximately 40% and at approximately 80% [FEP]. Similarly, there are also apparently 2 peaks in the SFN-D phase, but these occur at slightly different compositions, i.e., at approximately 35% and at approximately 75% [FEP] (see FIGS. 18 and 19).

By analogy with the MFA blends of Example 1, it would seem reasonable to assume that the beneficial effects of the present invention might be observed at approximately 40% [FEP] and possibly at approximately 80% [FEP]. The various melting points show peaks in similar regions as was the case in the MFA of Example 1 (FIGS. 14, 15, 18, and 19).

Figure 16:
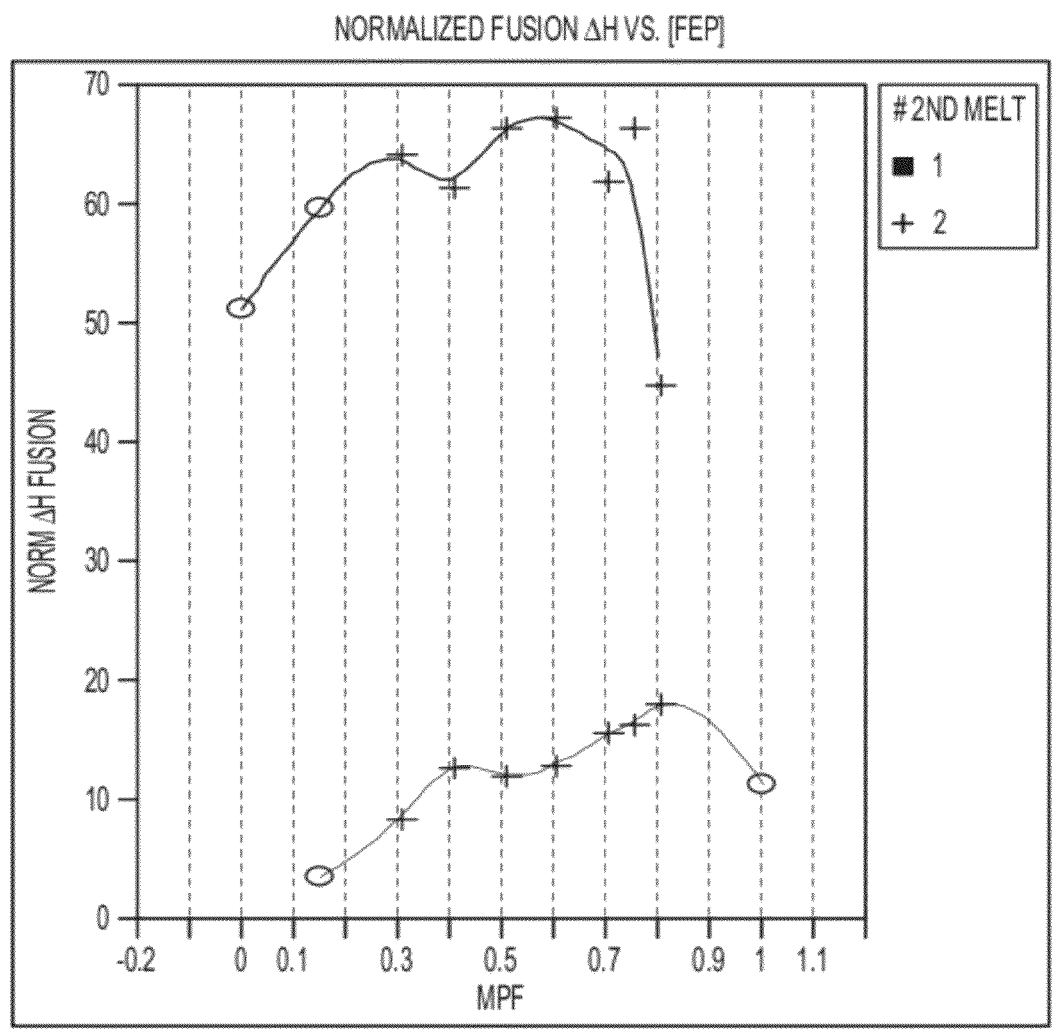
Figure 17:
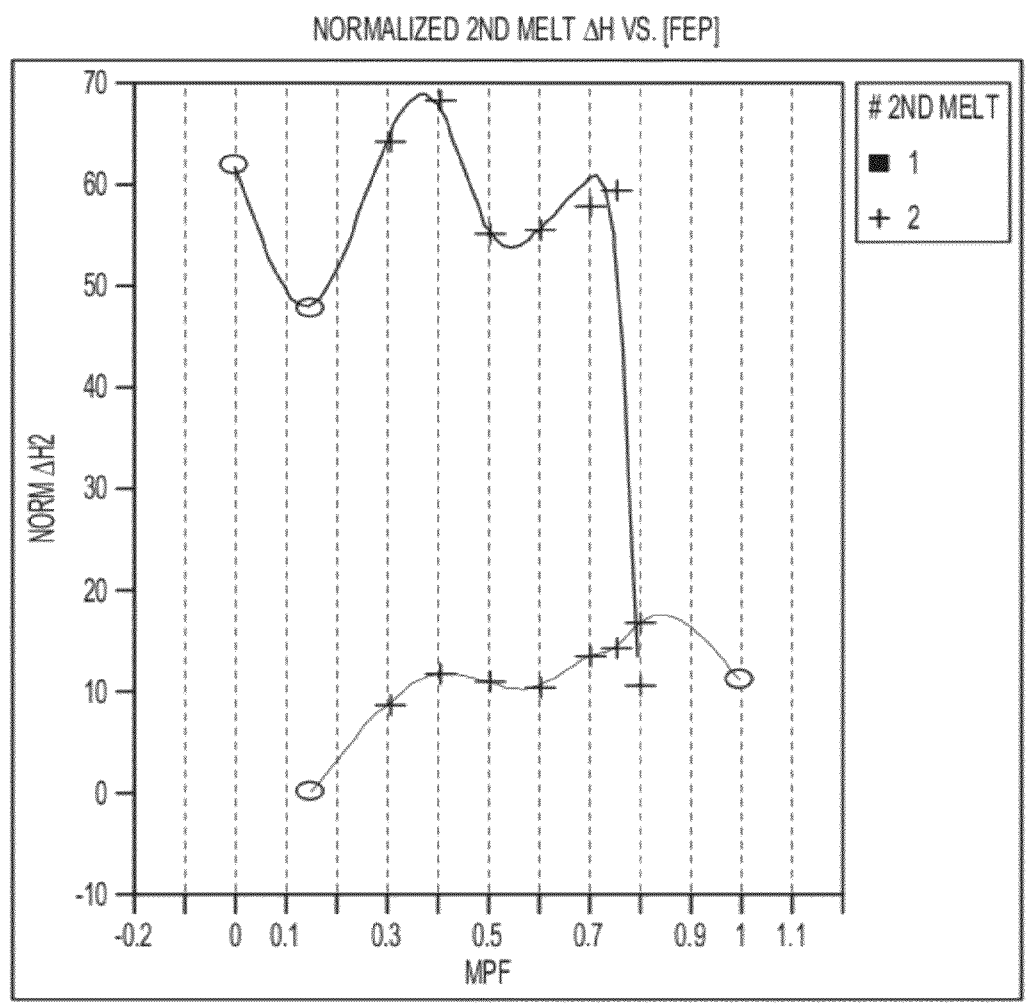

If we examine the FEP/SFN-D blends we see that in the $2^{nd}$ melt temperature of the FEP phase there appears to be at a minimum for 70% FEP but there is a peak at 50% [FEP]. There also appears to be a peak in the ΔH for $2^{nd}$ melt and in the fusion data at 80-90% (FIGS. 16 and 17).

Figure 8:
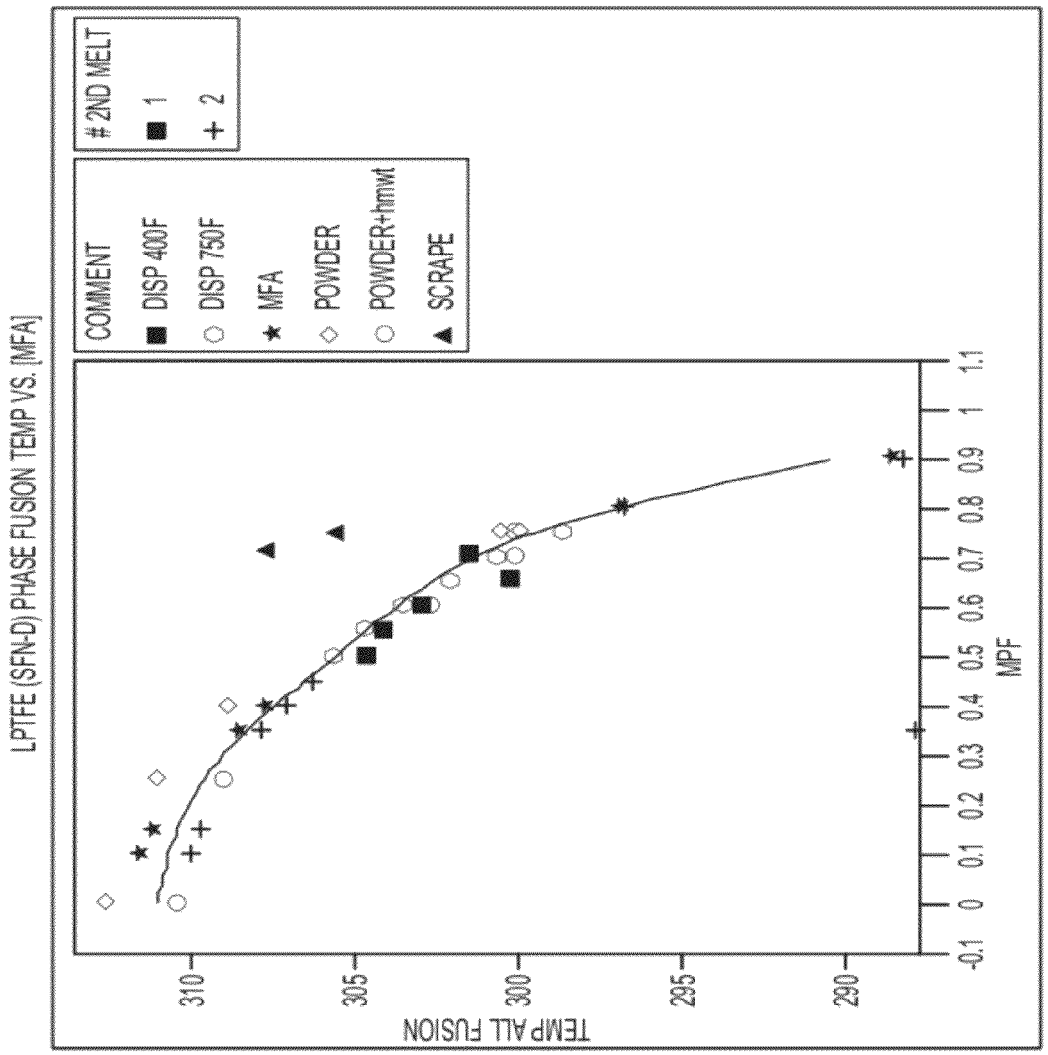
Figure 9:
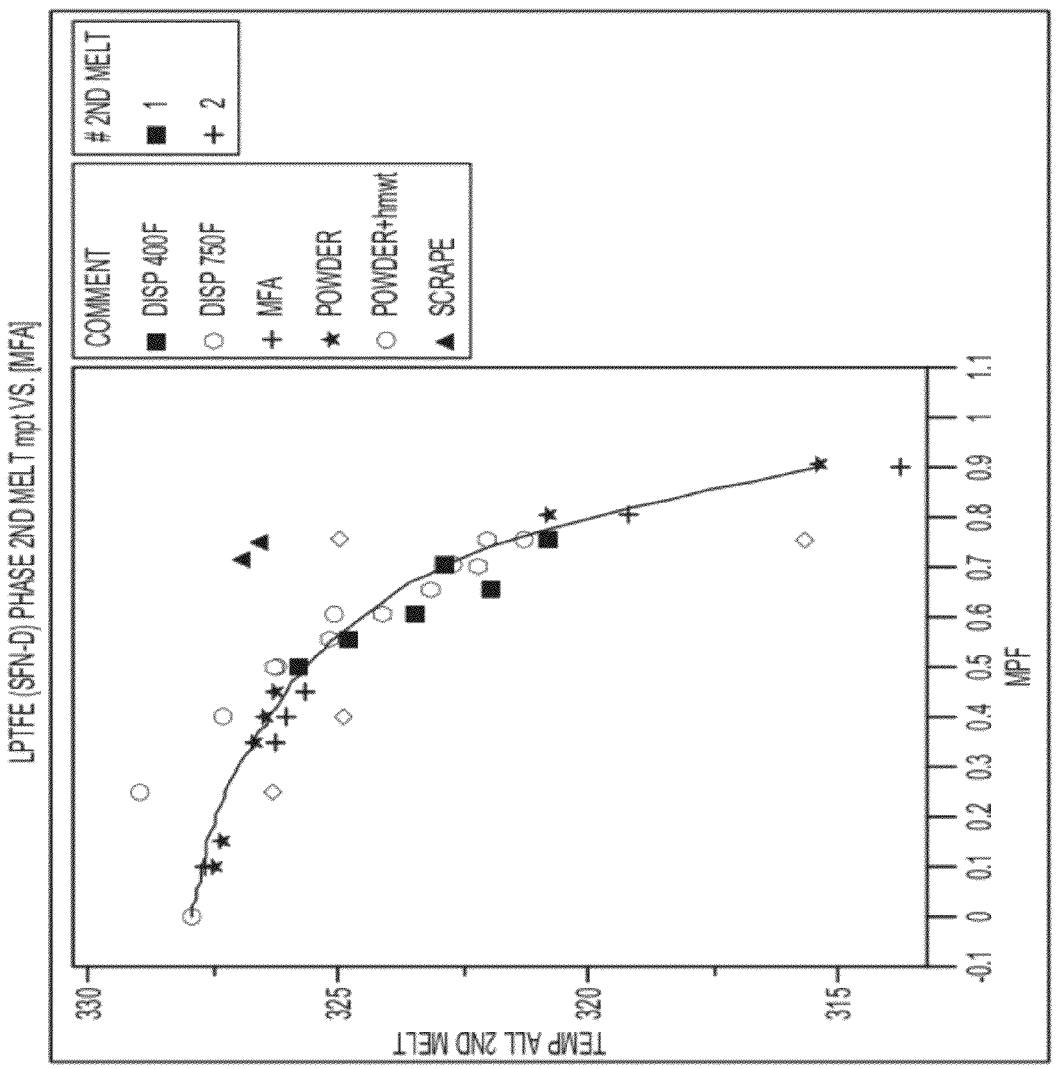
Figure 10:
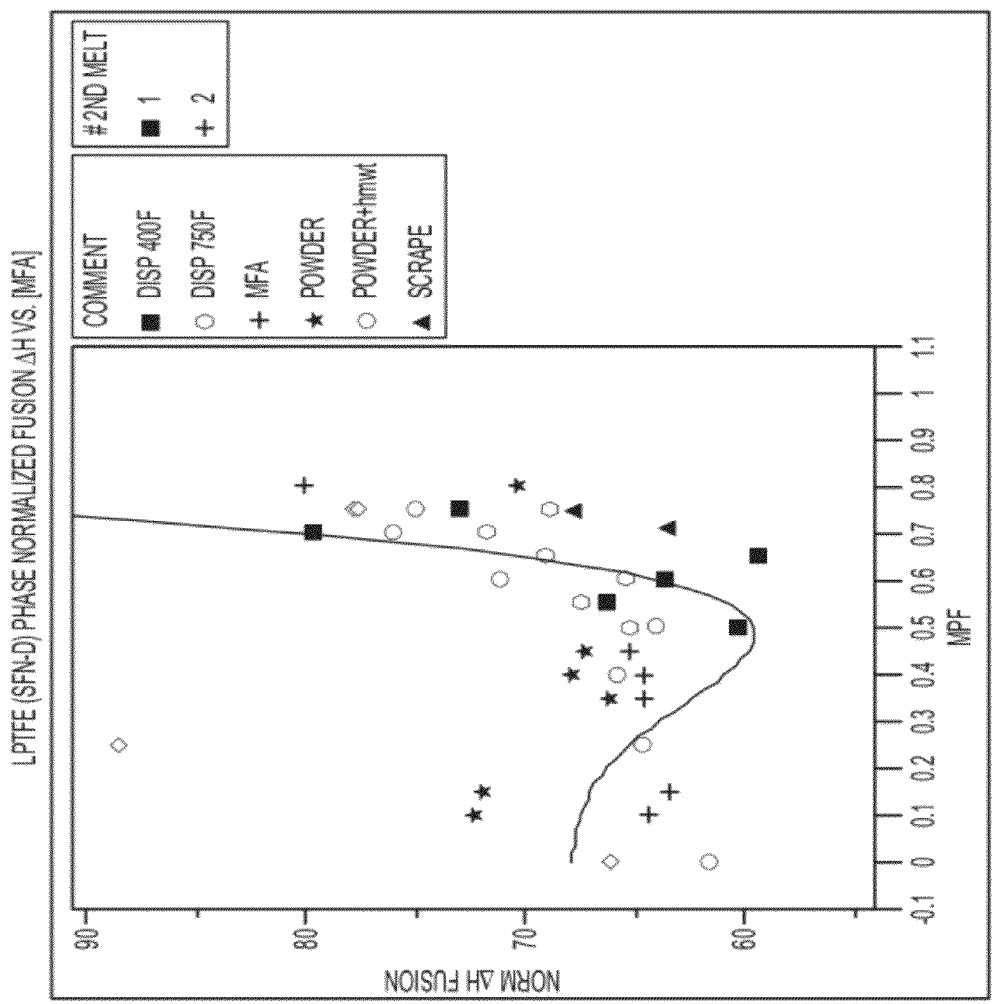
Figure 11:
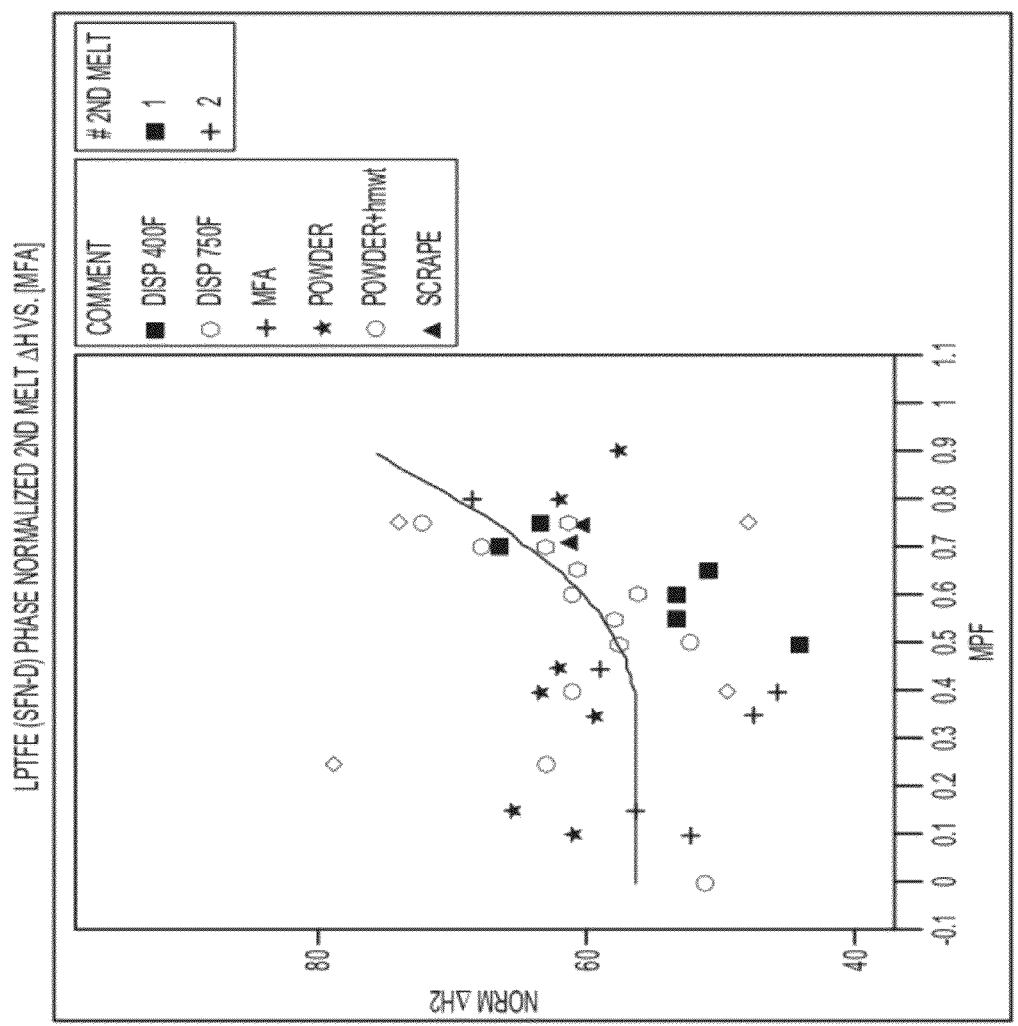
Figure 12:
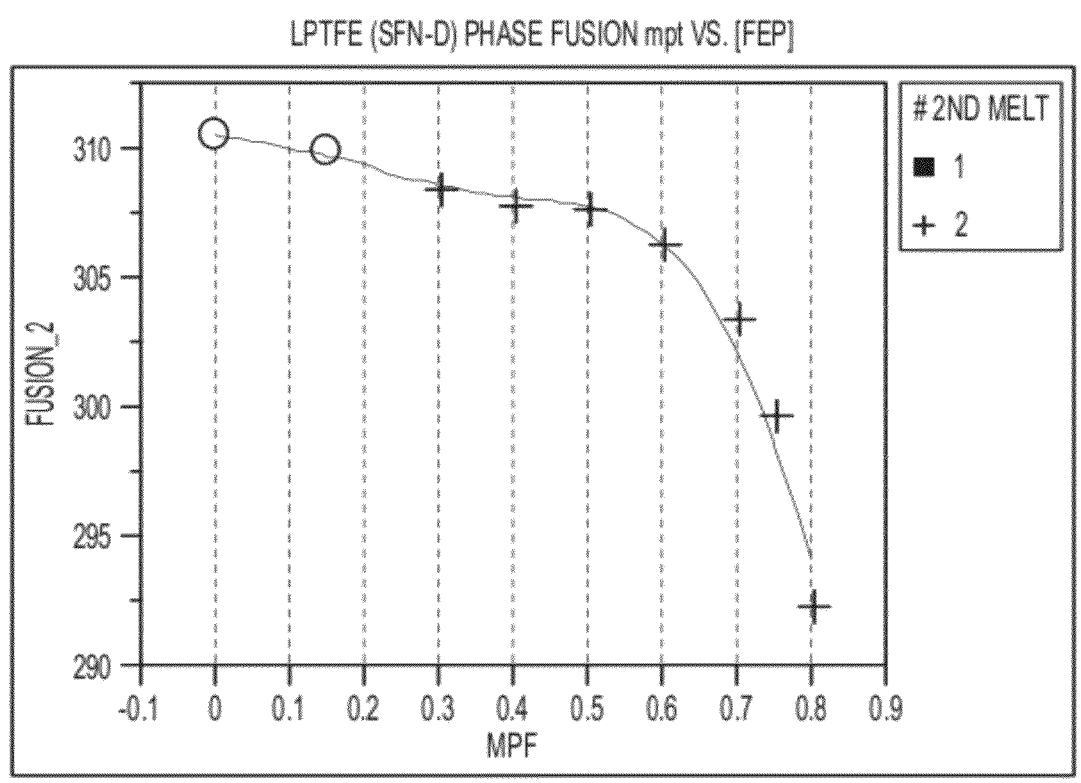
Figure 13:
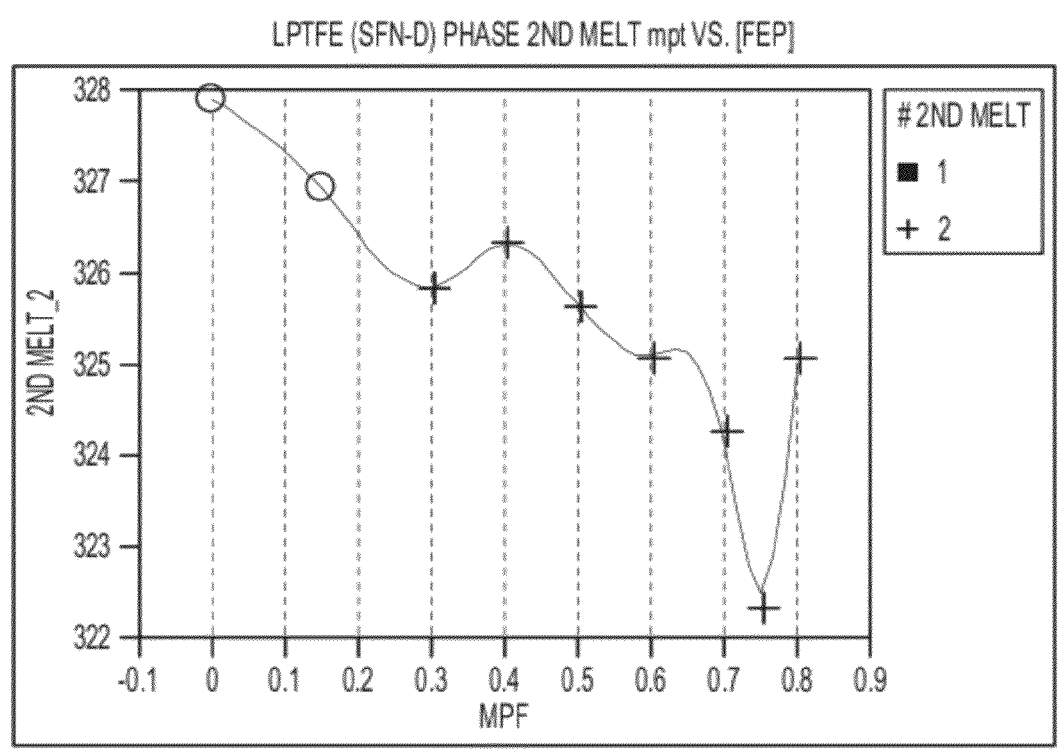
Figure 14:
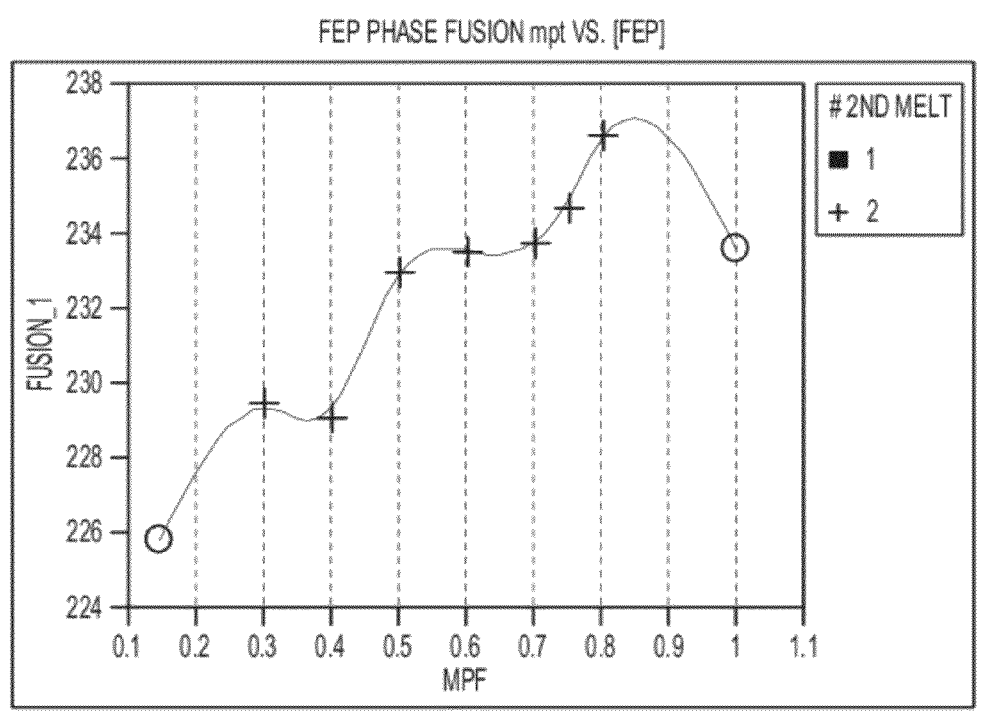
Figure 15:
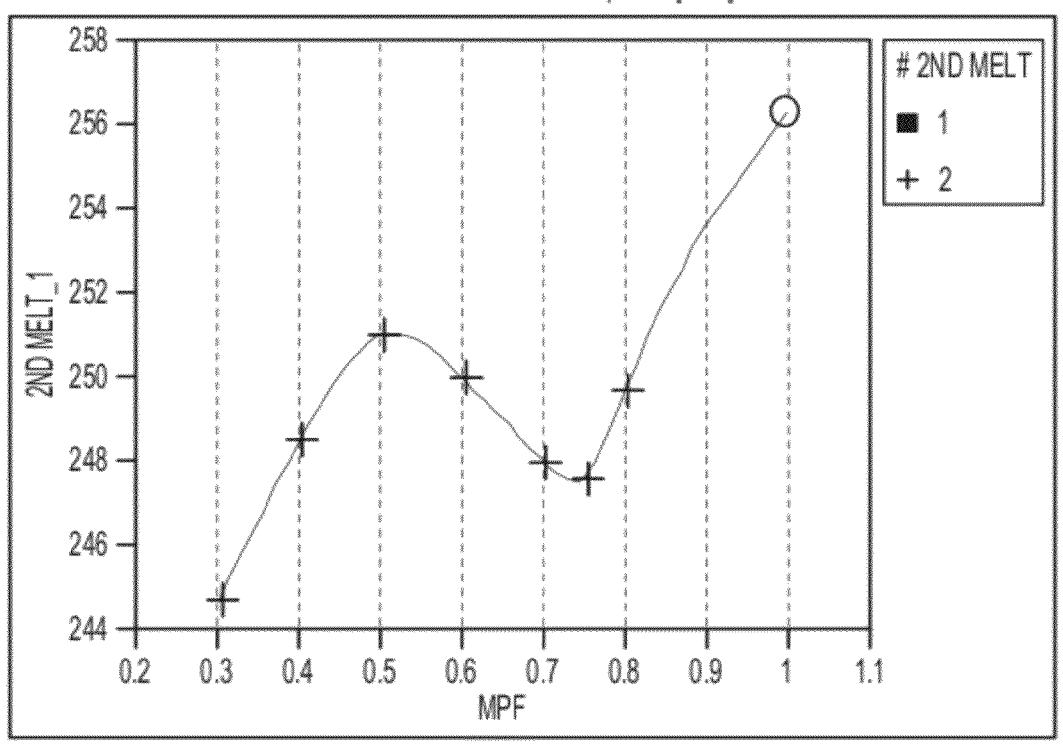

Also, the melting point of the SFN-D phase decreases after a second FEP phase (denoted by + marker in FIG. 12) starts to appear in the re-melt but in the case for MFA shown above this decrease is seen before the second phase occurs (FIG. 8). Examination of the enthalpies shows that there are 2 peaks in both the SFN-D phase (at 50% and 80% FEP) and in the FEP phase (at 40% and at least 80% FEP)(FIGS. 16 and 17). Blends of 40-60% FEP and 80-90% FEP might be expected to show properties in accordance with the beneficial effects of the present invention.

Example 3

PFA/LPTFE Blends

Figure 21:
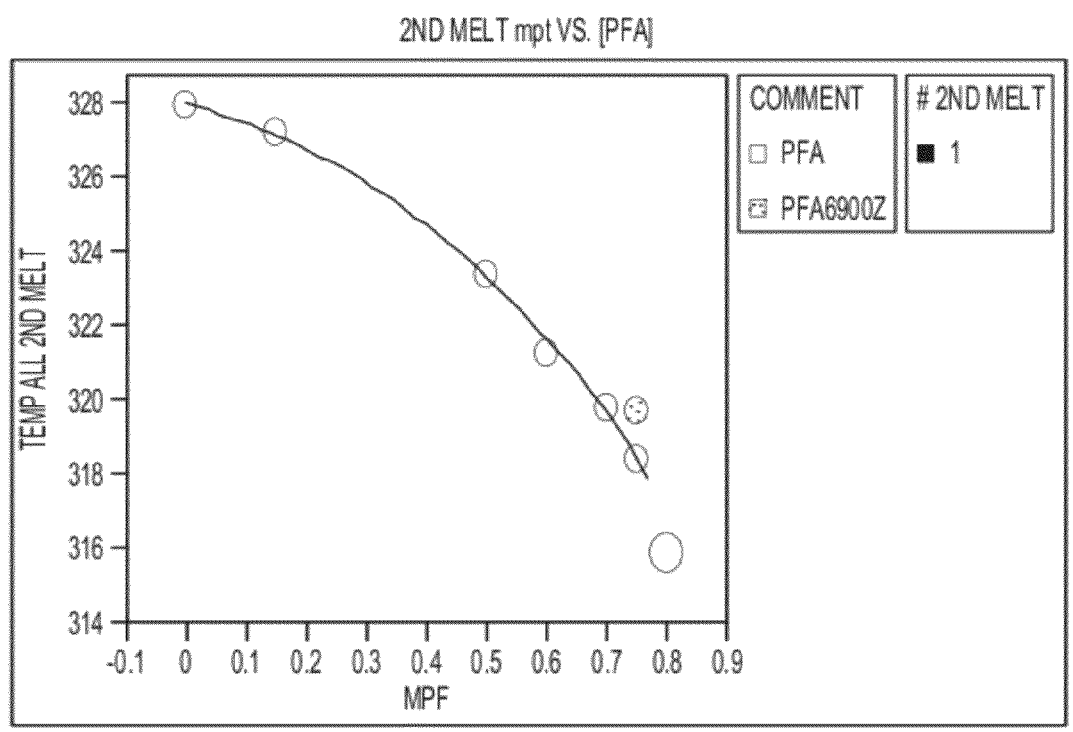
Figure 22:
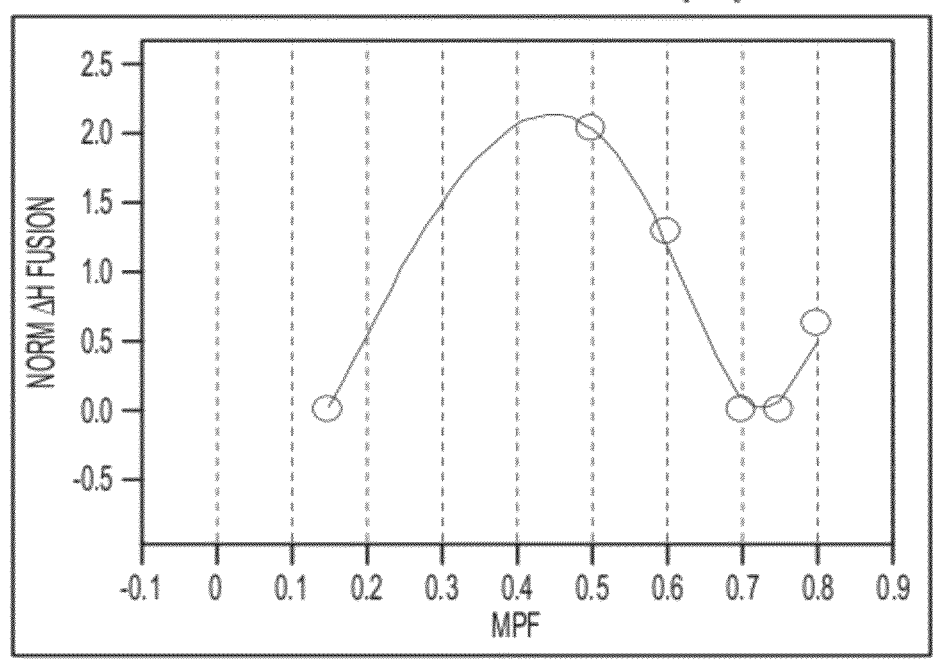
Figure 23:
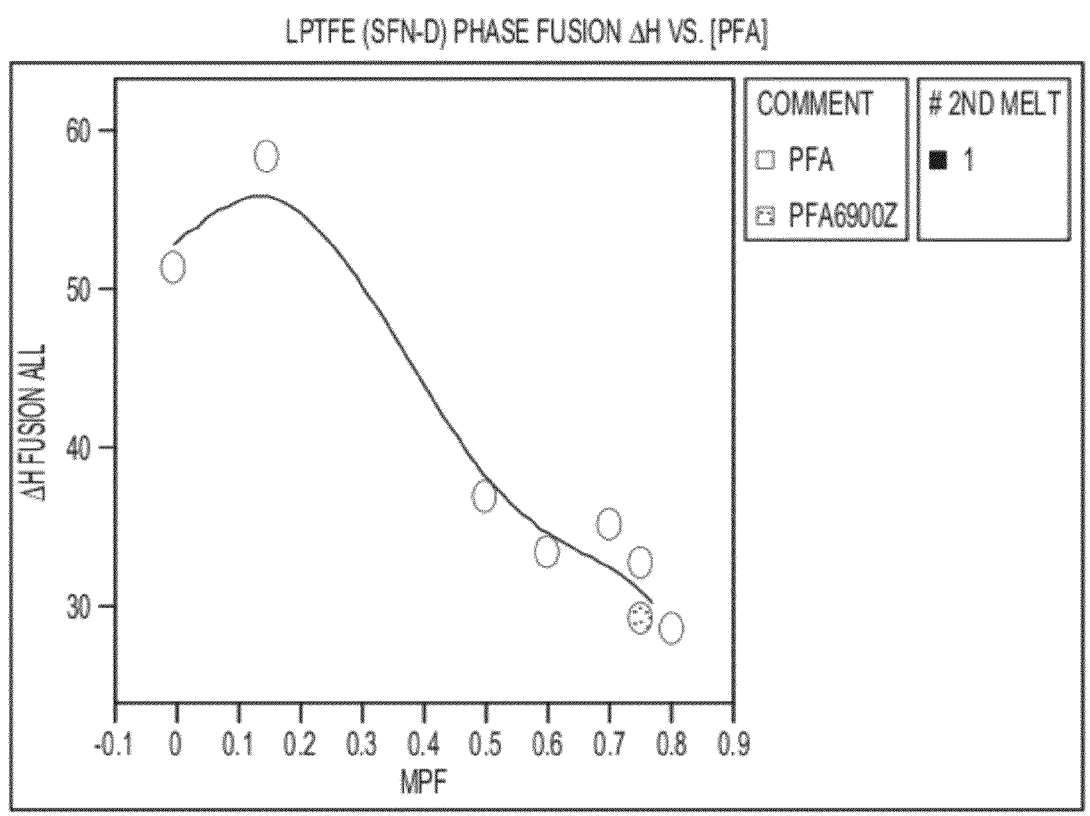
Figure 24:
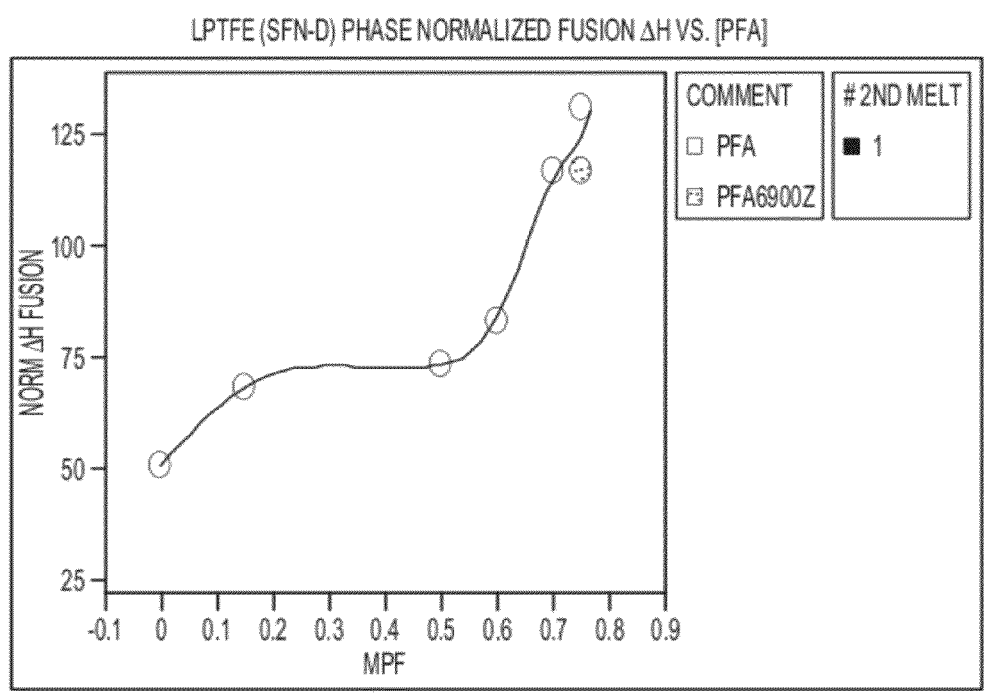
Figure 25:
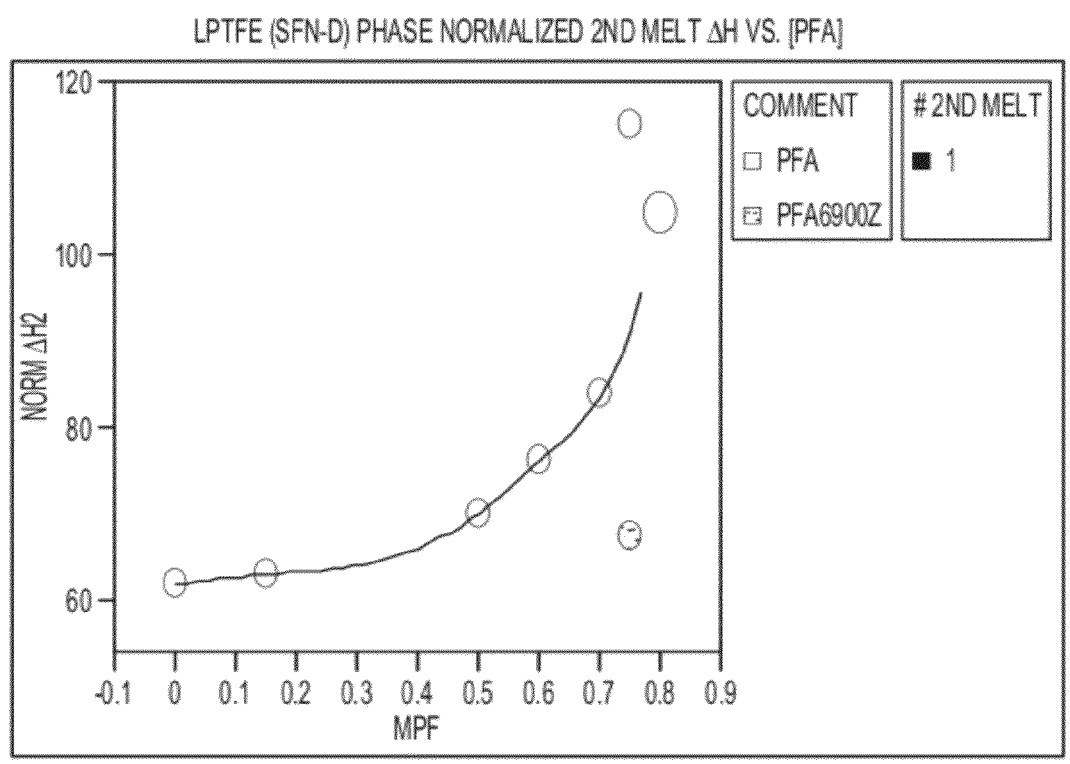

PFA data appears to be somewhat more difficult to analyze due to difficulties in resolving some peaks which are clearly overlapping, especially for the re-melt peaks. Nevertheless the fusion enthalpy curve exhibits a peak in the data at approximately 50% PFA as well as indicating the potential for a further peak at ca. 80% (see FIGS. 21 and 23).

Figure 26A:
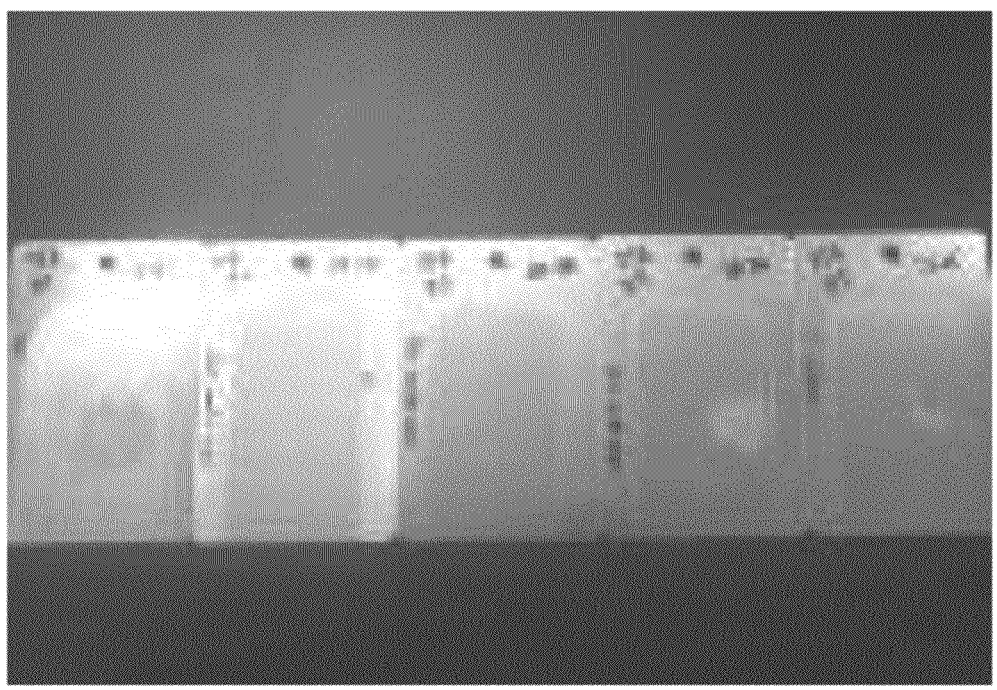
FIG. 26A is an illustration of acid etch test results of PFA/LPTFE blend films of Example 3.
Figure 26B:
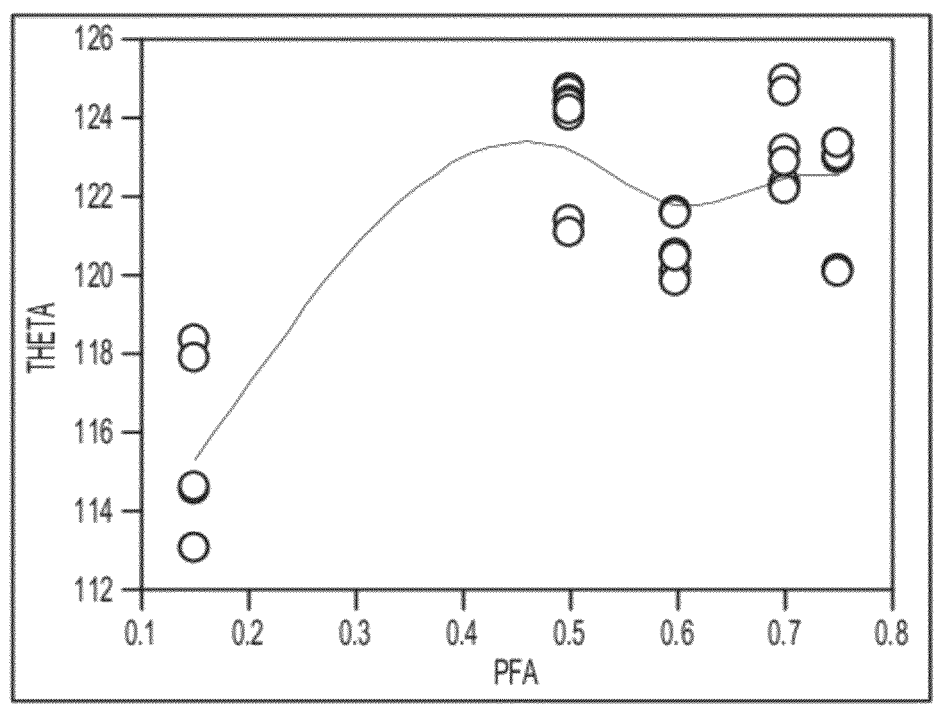
Figure 27:
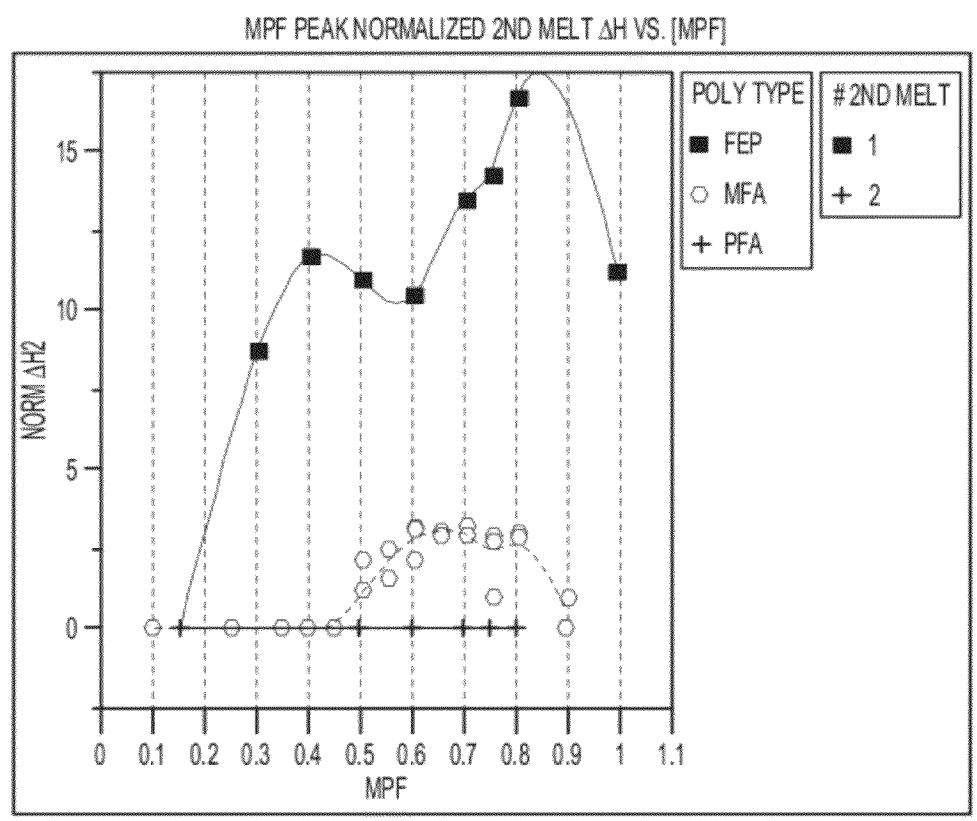
Figure 28:
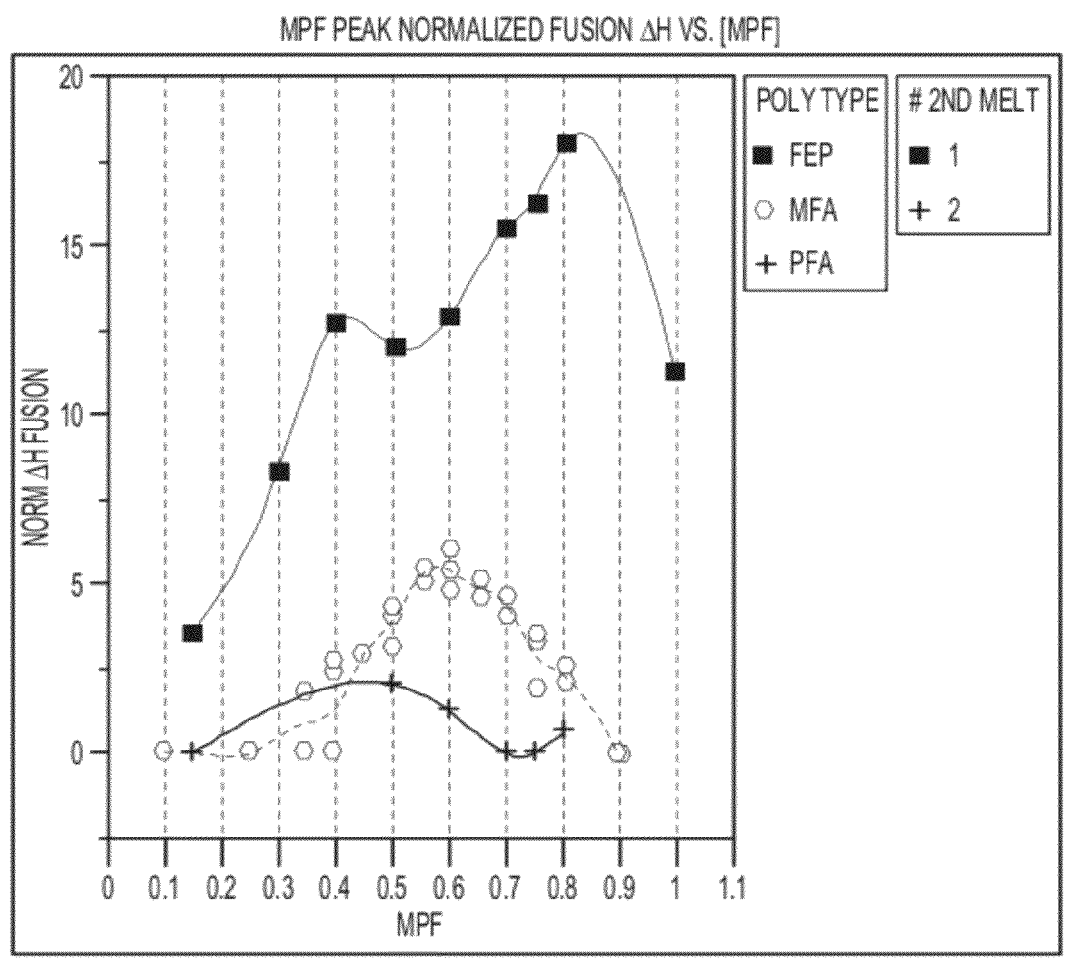

An observation of note was made when films were cast from the dispersion PFA/SFN-D blends onto Al plates and acid etched with concentrated HCl. It was clearly evident that the 50% and 60% PFA blends did not reveal much, if any, penetration whereas the other compositions showed significant breakthrough to the substrate (see FIG. 26A). The present inventors hypothesize that this is clear and unequivocal evidence that, as anticipated, peaks in the melt/fusion enthalpy curves occur at compositions associated with the beneficial effects of the present invention, which in this case is demonstrated by reduced permeability. This observation was further reinforced by contact angle measurements which appear to show a maximum value in a similar range of composition (FIG. 26B).

For PFA it appears possible that second PFA phase peaks occur so close to the primary SFN-D melt/fusion peaks that they are difficult to separate and characterize though there are indications that these second peaks are present. Nevertheless similarly to both MFA and FEP the SFN-D phase does show a reduction in melting point with increasing [PFA] which gives further reason to believe that the so far uncharacterized PFA peaks are there, and at the very least demonstrates that the PFA is affecting the SFN-D phase.

The apparent heat of fusion and $2^{nd}$ melt ΔH for the SFN-D phase increases with increasing [PFA] but this might be misleading; it could be caused by the undetected PFA melt peak hidden beneath. In fact since this polymer blend is the only one to show such an increase in normalized SFN-D peak area with increasing [MPF] (at least above 50% MPF), it appears to indicate that there is a separate (hidden to DSC) PFA phase. However, further examination of the fusion data has shown a peak at ca 50% PFA and the beneficial properties of the present invention have been observed for this blend Example 4

Figure 29:
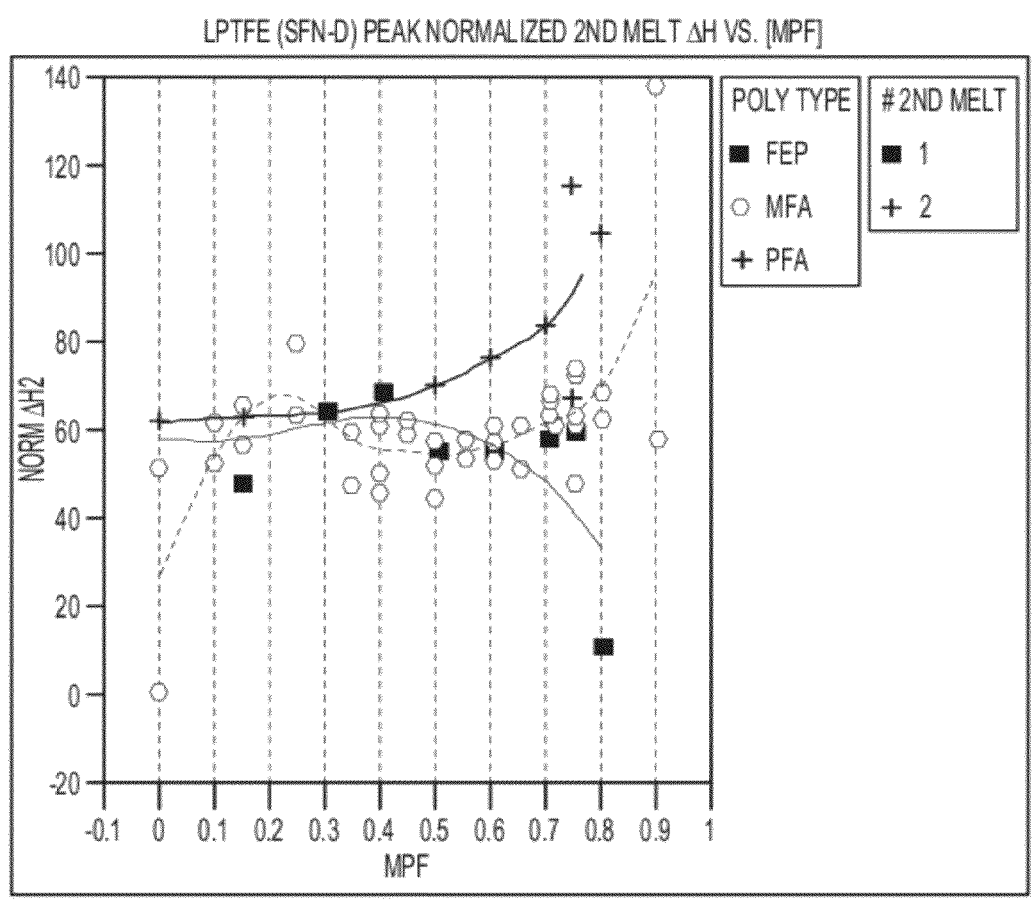
Figure 30:
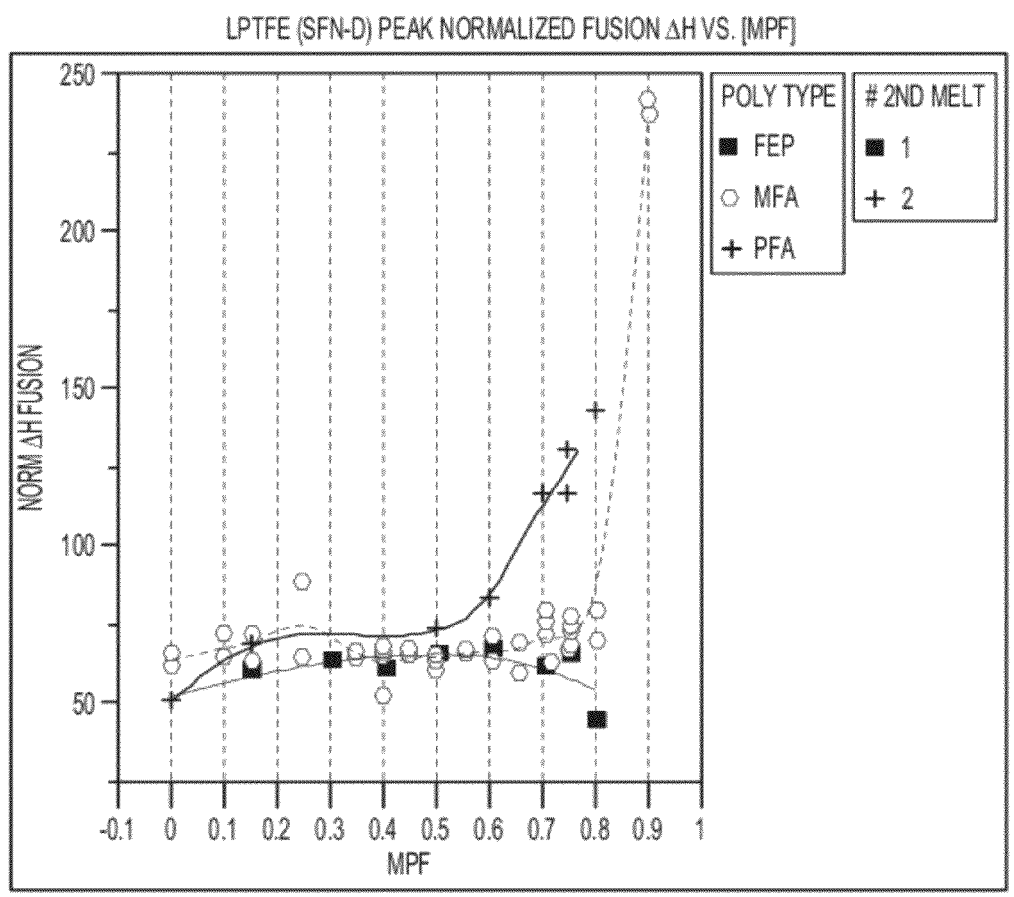
Figure 31:
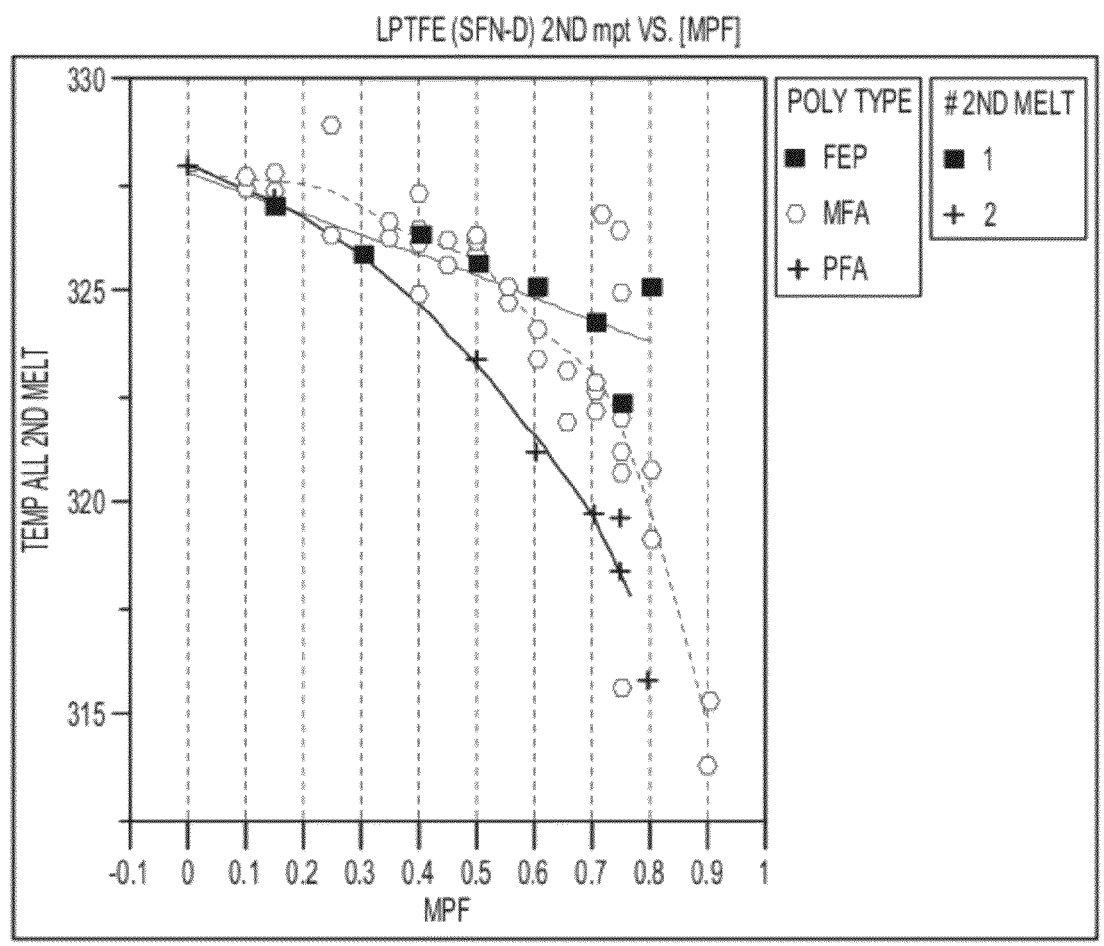
Figure 32:
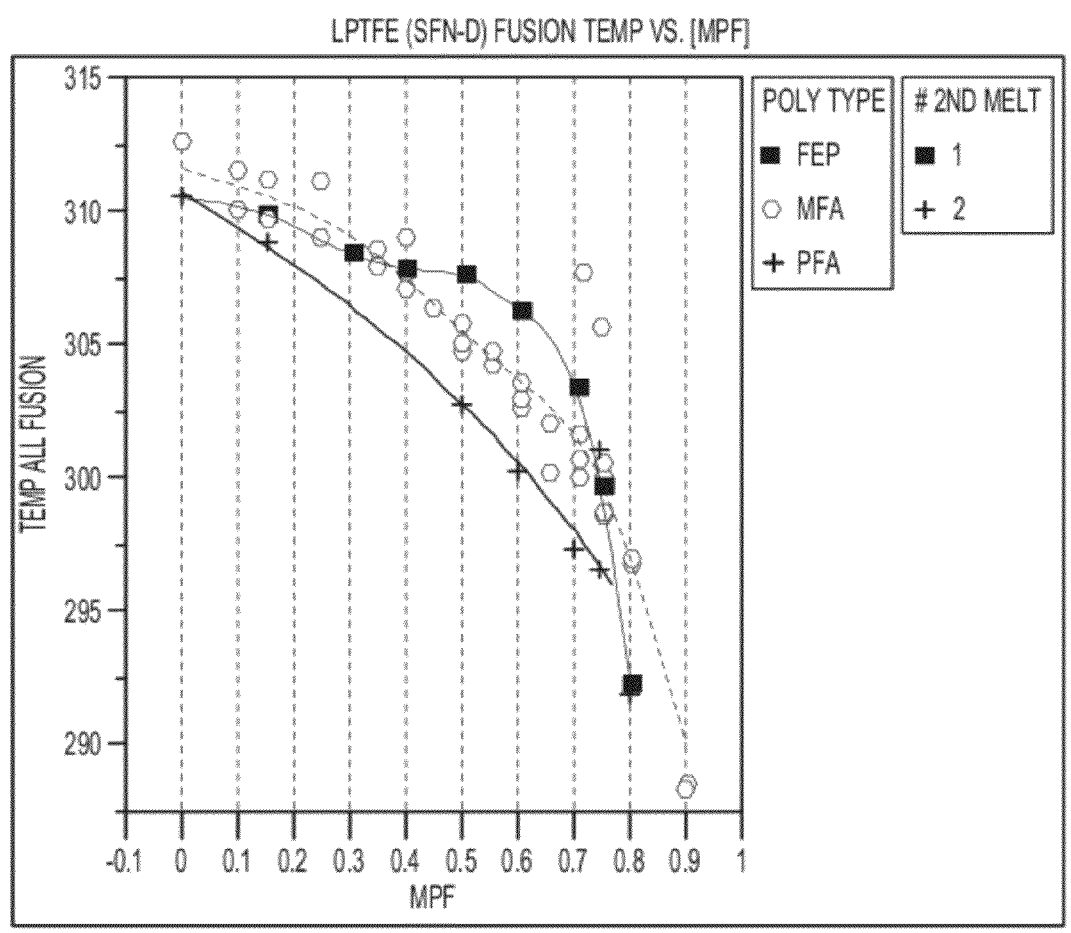
Figure 33:
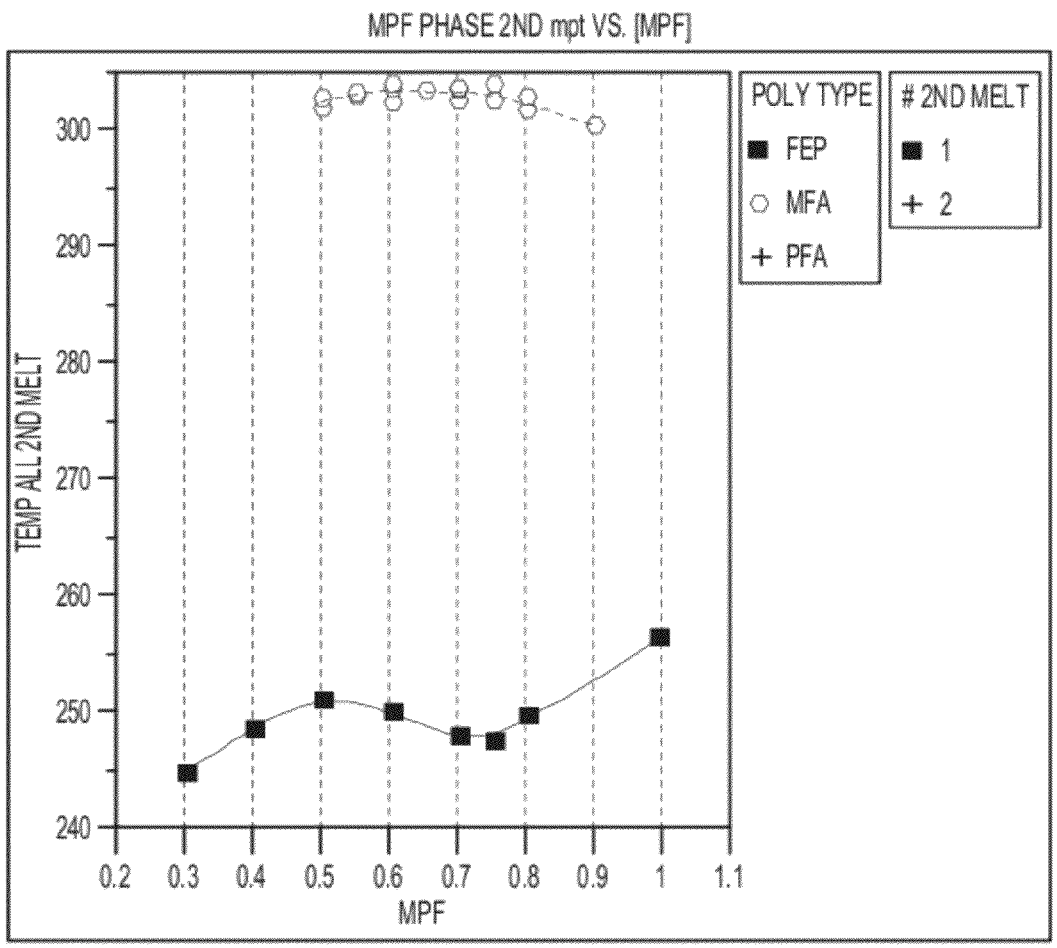
Figure 34:
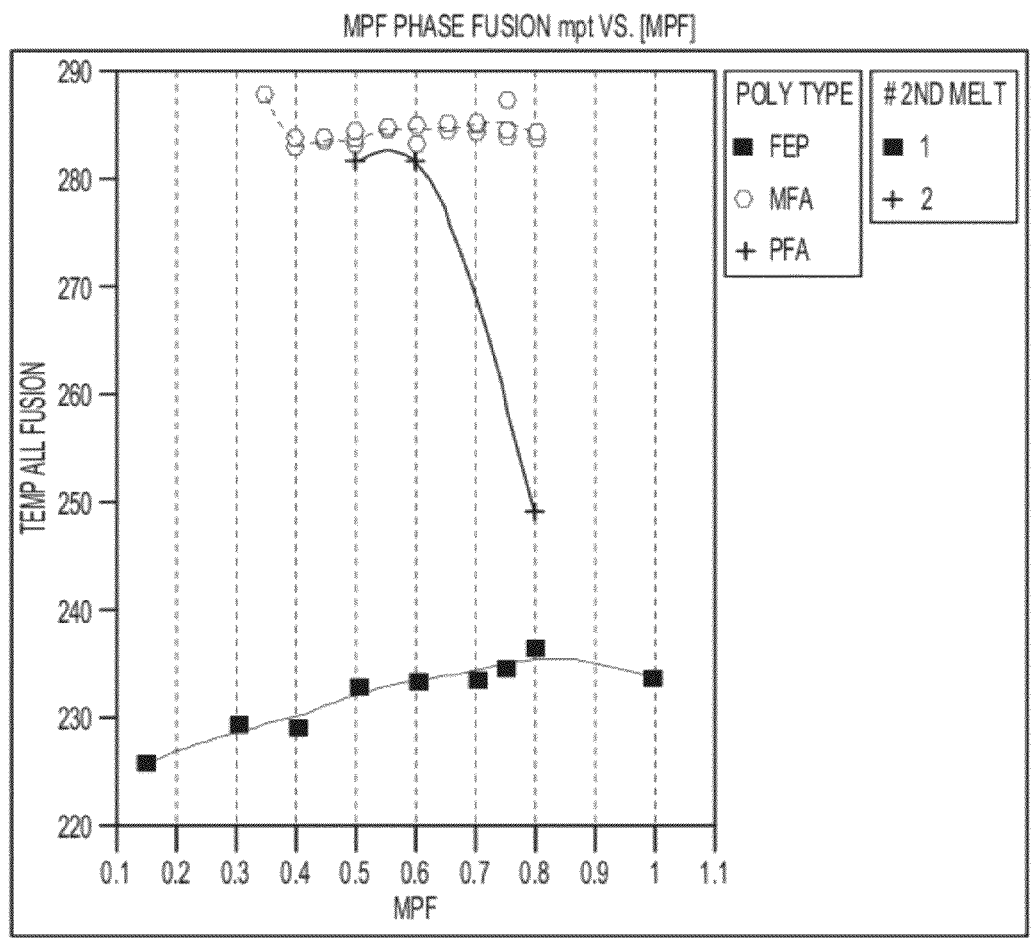

FIGS. 27-34 summarize the differences in location, with respect to the inventive compositions, of the MPF phase fusion and melt enthalpy curves clearly indicate the maxima for each MPF (FIGS. 27, 28) whereas the corresponding SFN-D phase for PFA and MFA appear to be shifted on the [MPF] axis by amount equivalent to the difference in [MPF] of the MPF phase peaks (FIGS. 29, 30). A similar shift is found for the SFN-D fusion and $2^{nd}$ melt temperatures (FIGS. 31, 32).

Examination of FIGS. 27-34 shows that the PFA curves are shifted relative to the MFA curves by between 10-20% towards lower [MPF]. Comparing the regions for the beneficial effects of the present invention between Examples 1 and 3 a strong correlation is observed. In PFA, this occurs at approximately 50% PFA and with MFA at approximately 70%. FEP possibly shows two regions as well, one at approximately 40% FEP and another possibly at >80% FEP.

Example 5

PTFE/MFA Blend

An SFN-DN PTFE aqueous dispersion stabilised with 0.6% D6483 (100% polysiloxane) on PTFE solids was added to MFA 6202-1 MFA dispersion to give 25:75 PTFE:MFA solids content. The dispersions were mixed with slow stirring. The mixture was frozen and freeze-dried. The resulting dry powder was applied by electrostatic spray gun over a Xylan 4018/G0916 primer on to a grit blasted aluminum panel. The panel was flashed off at 150° C. and cured at 400° C. for 20 minutes. The powder melted to form a continuous film.

Figure 35:
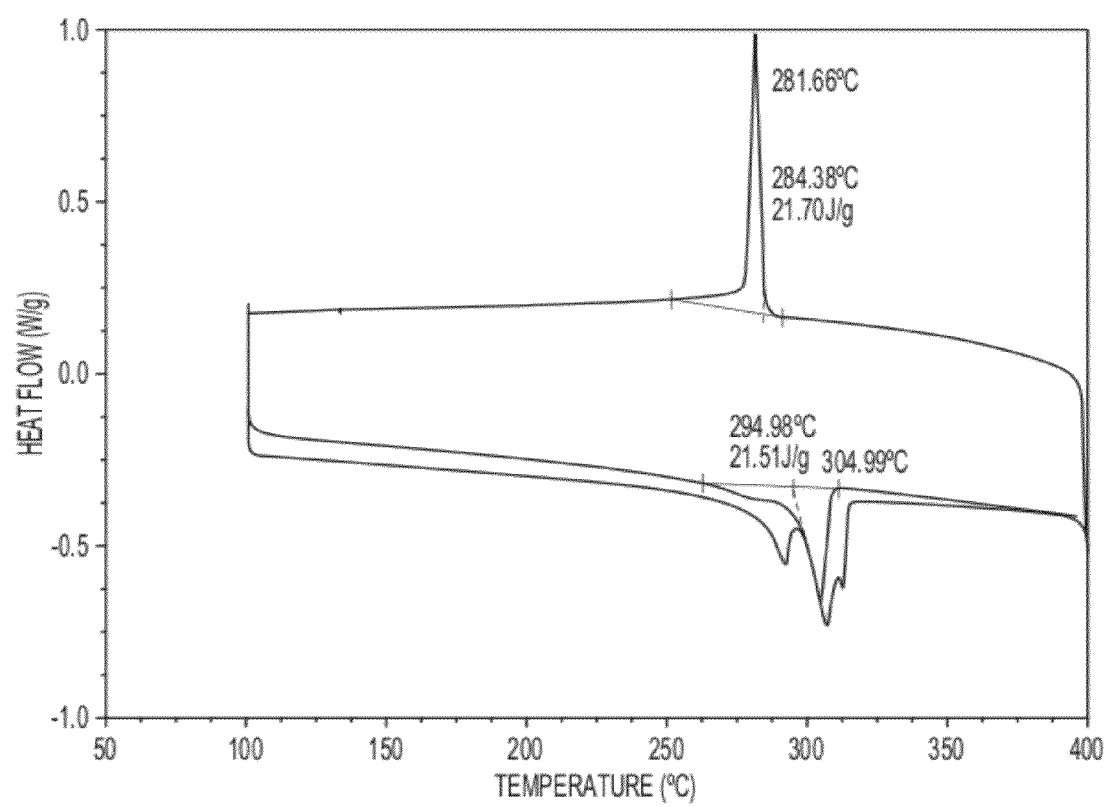
Figure 36:
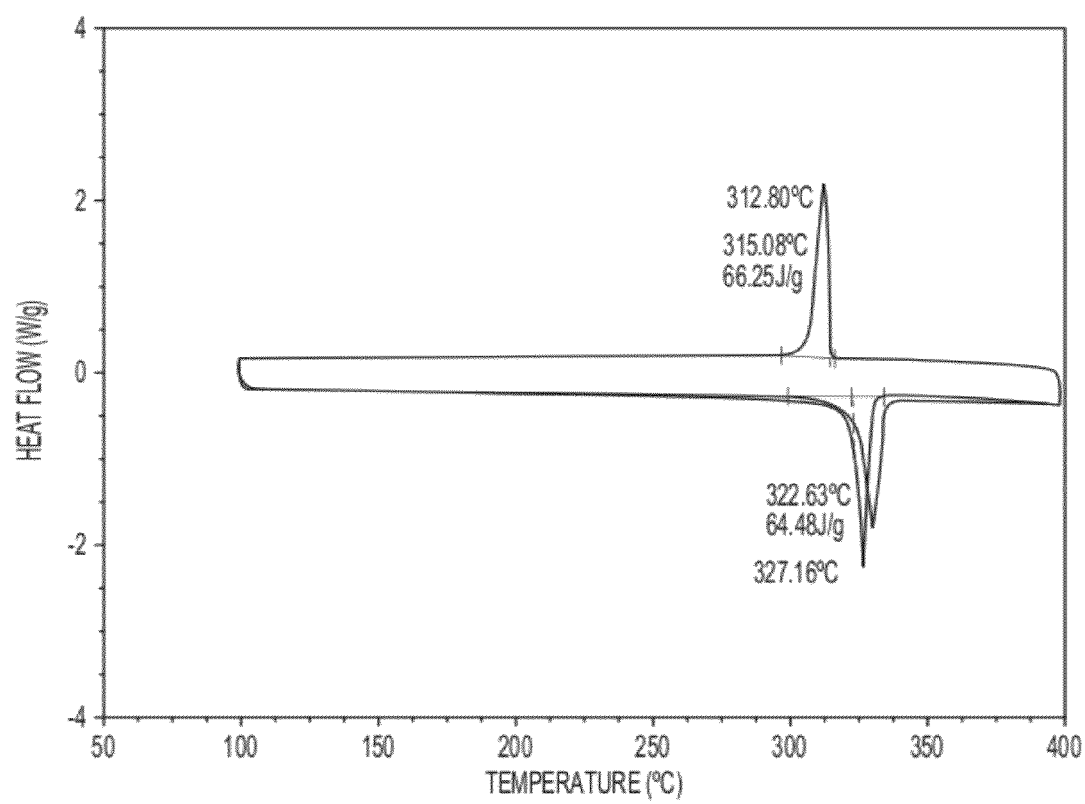
Figure 37:
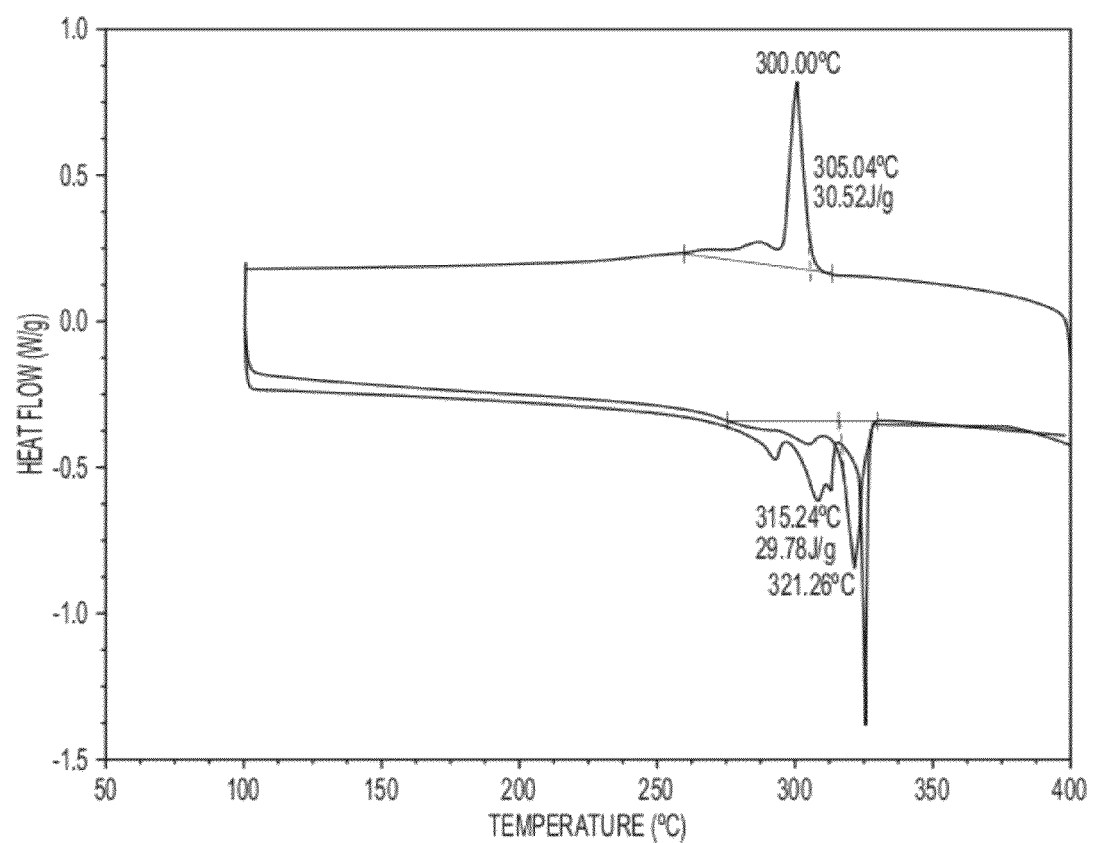

Reference is now made to three DSC data sets in FIGS. 35-37. A comparison of the melting point shift from pure polymers (FIG. 35—MFA and FIG. 36—PTFE) to the alloy (25 PTFE, 75 MFA) FIG. 37, show that the polymers form a true alloy and co-crystallize together.

The MFA/PTFE blend produced by this process has certain advantages. Increasing the crystalline nature of the MFA polymer can be demonstrated by considering the heat of fusion in the DSC data. The high crystalline polymer has better barrier properties. Also, the freeze-drying process yields a homogenous blend of PTFE and MFA. Mixing on a nano scale and freeze drying locks polymer particles in place; no macro aggregation of individual polymer components occurs.

Example 6

Lap Shear Test of PTFE/MFA Blend

In this Example, the release properties of coatings made with a control PFA fluoropolymer and with a blended LPTFE/

MFA fluoropolymer made in accordance with the present invention were investigated. The test method used for evaluation was ASTM D1002 (Standard Test Method for Apparent Shear Strength of Single-Lap-Joint Adhesively Bonded Metal Specimens by Tension Loading (Metal-to-Metal)), which test method was modified as discussed below.

The control fluoropolymer was Daikin ACX-31 PFA powder. An experimental blended fluoropolymer powder was made by blending an MFA dispersion (Solvay Hyflon MFA XPH 6202-1, 27.2% solids) and an LPTFE dispersion (SFN-D, 25% solids) followed by freeze drying to give a 75:25 wt. % ratio of MFA:PTFE in the resulting powder.

Sample panels of gritblasted aluminium were prepared and then treated with Xylan 80-178/G3435 metallic black primer followed by flashing off at 150° C. and allowing to cool. The control and experimental powders were applied by electrostatic powder spray and then cured at 400° C. for 15 minutes. The gritblasting pretreatment used for the coated panels was one method improvement, ensuring a consistent coated surface which in turn gave less scatter in results. Using freshly coated panels gave greater consistency rather than re-using test panels.

The aluminium plates used were 1" wide×4" long. One plate was coated and a second plate was solvent wiped using ethanol. One improvement to the test method was the careful preparation of the panels for testing to ensure that there were no differences in procedure between the two sets of panels. PSI-326 (Polymeric Systems Inc.) epoxy adhesive was mixed 1:1 w/w for approximately 45 seconds and then applied to both surfaces. The plain aluminium panel received the larger proportion with the coated plates being smeared until full wet out was observed. Solid spherical glass beads of nominal 0.6 mm were scattered onto the aluminium plate.

Figure 38:
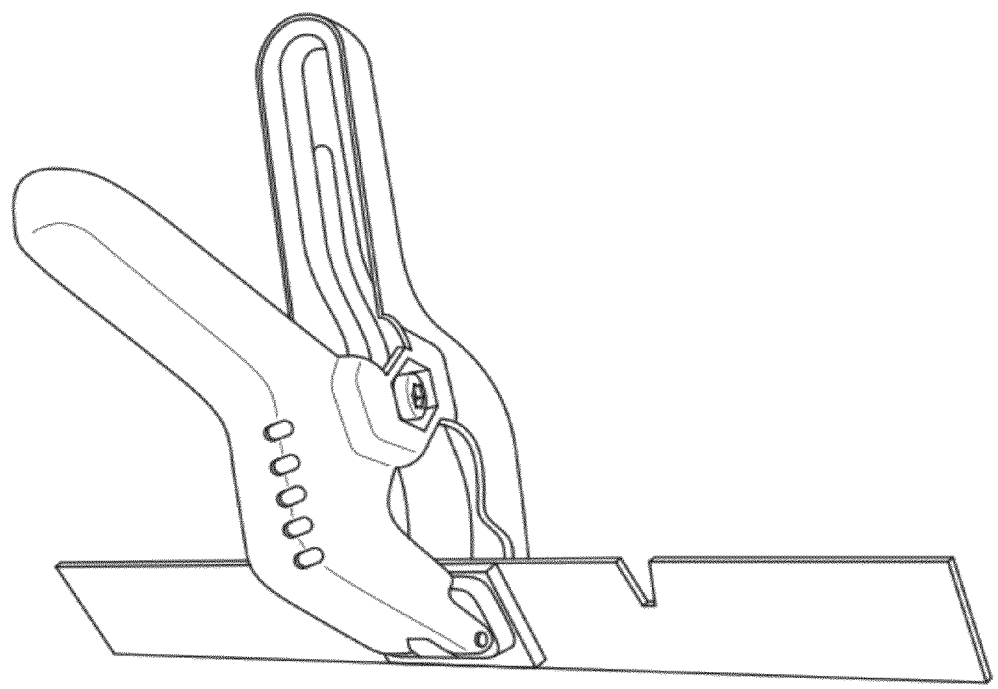
FIG. 38 illustrates the clamping arrangement used in Example 6.

The test was performed using PSI 326 epoxy adhesive. Pairs of plates were aligned and firmly clamped together using strong spring clips as shown in FIG. 38. The coated panel and adhesive overlap is 1 in². The thickness of the epoxy/adhesive bond was set using glass beads (0.6 mm). The adhesive was hand mixed and applied to the panels which were then clamped together. The panels were left to stand for 72 hours prior to testing on the Lloyd Tensometer. The use of clamps was another improvements to the test method. A further improvement included removal of excess adhesive immediately without disturbing the bond. Clamped plates were left for 72 hours undisturbed before testing.

The following results were obtained:

TABLE 3

| Control fluoropolymer | |
| --- | --- |
| Panel # | Pull-apart force (N) |
| 1 | 185 |
| 2 | 235 |
| 3 | 216 |
| 4 | 158 |

TABLE 4

| Experimental blended fluoropolymer | |
| --- | --- |
| Panel # | Pull-apart force (N) |
| 1 | 95.1 |
| 2 | 81.3 |
| 3 | 94.0 |
| 4 | 83.0 |

As is clear from the foregoing, the coatings made with the experimental blended fluoropolymer displayed better release characteristics than the coatings made with the control fluoropolymer, as evidence by approximately 50% lesser pull-apart forces.

Example 7

Stain Resistance

In this example, the stain resistance of coatings made with a control PFA fluoropolymer and with a blended LPTFE/MFA fluoropolymer made in accordance with the present invention were investigated.

The control fluoropolymer was Daikin ACX-31 PFA powder. An experimental blended fluoropolymer powder was made by blending an MFA dispersion (Solvay Hyflon MFA XPH 6202-1, 27.2% solids) and an LPTFE dispersion (SFN-D, 25% solids) followed by freeze drying to give a 75:25 wt. % ratio of MFA:PTFE in the resulting powder.

Two aluminum panels treated with Xylan 80-178/G3435 metallic black primer followed by flashing off at 150° C. and allowing to cool. The control and experimental powders were applied by electrostatic powder spray and then cured at 400° C. for 10 minutes, specifically, the panels were coated as shown in FIG. 39, with each panel coated on its left side with the control coating and on its right side with the experimental coating.

Figure 39:
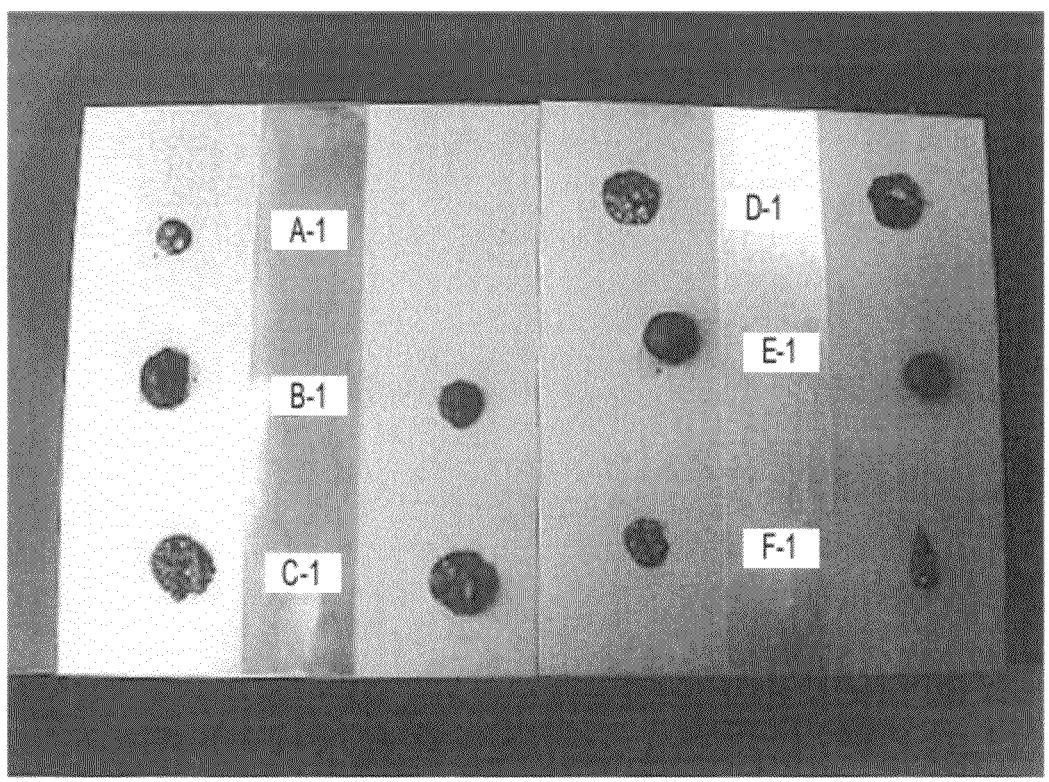
FIGS. 39 and 40 illustrate results of the stain resistance test of Example 7.
Figure 40:
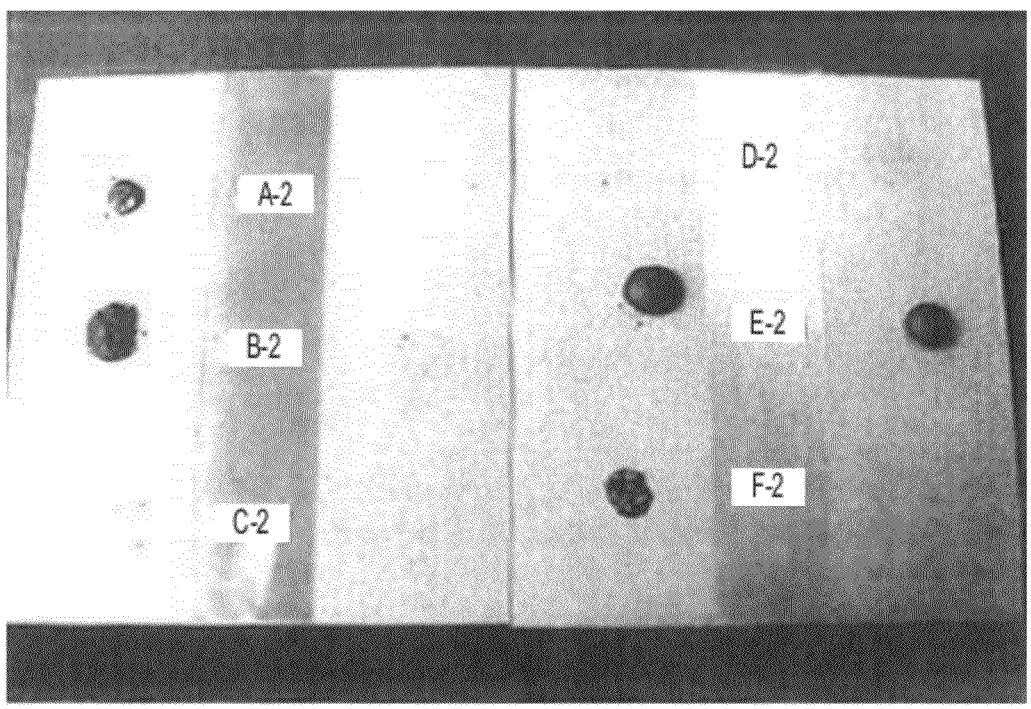

Referring to FIG. 39, six stain-prone materials, including sugar water (A-1), worchestershire sauce and sugar (B-1), honey BBQ sauce (C-1), tomato sauce and sugar (D-1), soy sauce and sugar (E-1), and orange juice (F-1) were dropped onto each side of the panels, and then baked onto each of the control and experimental coatings at 205° C. for 30 minutes. Once cooled, each panel was then turned upside down and tapped once lightly. The improvement in stain resistance exhibited by the right sides of each panel that were coated with the experimental coating can be seen from FIGS. 39 and 40, although no improvement was observed for soy sauce and sugar (E-1).

Introduction to Examples 8-10

Further Examples of MPF/LPTFE blends are given below where more detailed examination of thermal data, contact angles and acid resistance was considered.

The data is summarized in Table 5 below, in which the columns are explained as follows:

"MPF %" and "LPTFE %" are the fractions of the MPF and LPTFE components by weight, i.e., 0.1 is 10 wt. %.

"CA" is the contact angle are for a water droplet in degrees, as determined using the "Drop Shape Analysis" system (DSA10), available from Kruss GmbH of Hamburg, Germany, according to the Young Relation.

"Diff CA" is the difference in contact angle for a given component/mixture from a linear interpolation of the contact angles for that of the pure MPF and LPTFE components, in degrees.

"Mpt" refers to melting point, in degrees C., using the DSC procedure set forth below.

Acid rating scale is on a 0.1-1 scale according to the procedure set forth below, where 1 represents excellent acid resistance as judged by photographic examination.

Enthalpies ("DH") are in J/g.

Examples 10-12 respectively present three data sets for blends of LPTFE (SFN-D, Chenguang) with each of a first PFA, referred to in Table 13 below as "PTFE (A)" (Dyneon PFA6900Z Lot#38C1998X, Solids=49.4%) a second PFA, referred to in Table 13 below as "PTFE (B)" (du Pont PFA TE7224, Lot#0804330005, Solids=58.6%) (Example 10); FEP (Neoflon FEP ND-110 Dispersion, Lot# ND110R86001, Solids 56.5%) (Example 11); and MFA (Solvay Hyflon MFA XPH 6202-1, Lot# Lab, Solids=27.2%) (Example 12).

The data presented was obtained using differential scanning calorimetry (DSC) and, in most cases individual data points in FIGS. 41-64 were each taken from DSC curves.

In Examples 10-12, 'normalized' means data that is normalized for the fraction of the given component in the original mixture, i.e., for the LPTFE (SFN-D) phase the normalized SFN-D data is given by, {SFN-D data}/(1-[MPF]).

The blended fluoropolymer compositions for Examples 10-12 were prepared as follows. The given amounts of aqueous fluoropolymer dispersions were mixed under air in a mixer for 30 minutes to ensure homogenous mixture of the dispersions. The mixture was mixed under low to medium shear to avoid coagulation of blended dispersion. A plastic eye-dropper was used to place a known weight of the mixed, blended dispersion into a pre-weighed drying dish. The dispersion was flashed at 100° C. in an oven for 30 minutes, and the residual powder was then dried at 200° C. for an additional 30 minutes. After the dried powder cooled to room temperature, the powder was weighed and the percent solids in the mixed dispersion was calculated. The blended fluoropolymer powder was then ready for DSC analysis.

For DSC analysis, 10 mg (+/−1 mg) of the dried powder was placed in a aluminum DSC sample pan, and the pan was sealed with a standard lid. The heating and cooling cycles of the DSC were as follows: (1) ramp 15.0° C./min to 400° C.; (2) isothermal for 1.00 min; (3) ramp 15.0° C./min to 135° C.; (4) isothermal for 1.00 min; (5) ramp 15.0° C./min to 400° C.; and (6) air cool.

The melting peaks were obtained during the (1) ramping up heating process. The crystallization peaks were obtained in the (3) cooling process. The 2nd melting peaks were obtained at the (5) heating process.

The panel preparation method for contact angle and acid resistance testing was as follows:
1. Make liquid blend of MPF and LPTFE in the desired ratios.
2. Add the appropriate formulation to the blend created in step 1. Use the following formulations and percentages to make the blends for drawdown.
3. Blend the mix gently to avoid air bubbles.
4. Using a pipet apply a small amount to an aluminum degreased panel.
5. Draw the coating down the panel in a smooth motion using a 3 mil wet path bird applicator.
6. Flash the panel for approximately 5-10 minutes at 200° F.
7. Move the panel to 400° F. and flash an additional 5 minutes.
8. Cure the panel for 10 minutes at 750° F.

The acid etch test procedure was as follows:
1. Trim the panel to fit into the largest petri dish with lid available.
2. Apply 6000 uL of 36.5-38% concentrated HCl in two different locations on the panel to account for any possibility of inconsistent film build.
3. Carefully place the panel with HCl into the petri dish.
4. Cover the petri dish with the lid and seal using vacuum grease.
5. Take pictures of the panels every hour for 8 hours.
6. Rate the pictures at the end of the 6 hours using the rating scale of 0.1-1 (0.1 worst—1 best).

The results are presented below in Table 5:

TABLE 5

MPF/LPTFE Blends

| MPF Type | MPF % | LPTFE % | CA | Diff CA | Acid rating (0-1 scale) | Fusion mpt MPF | Fusion mpt LPTFE | 2nd melt mpt MPF | 2nd melt mpt LPTFE | Norm DH Fusion MPF | Norm DH Remelt MPF |
|---|---|---|---|---|---|---|---|---|---|---|---|
| FEP | 0 | 1.00 | 133.97 | −0.23 | 0.1 | . | 310.55 | . | 326.67 | 0.0 | 0.0 |
| FEP | 0 | 1.00 | 134.02 | −0.18 | 0.1 | . | 310.55 | . | 326.67 | 0.0 | 0.0 |
| FEP | 0 | 1.00 | 134.62 | 0.42 | 0.1 | . | 310.55 | . | 326.67 | 0.0 | 0.0 |
| FEP | 0.1 | 0.90 | 130.64 | −1.96 | 0.1 | . | 310.45 | . | 326.9 | 0.0 | 0.0 |
| FEP | 0.1 | 0.90 | 130.65 | −1.95 | 0.1 | . | 310.45 | . | 326.9 | 0.0 | 0.0 |
| FEP | 0.1 | 0.90 | 129.21 | −3.39 | 0.1 | . | 310.45 | . | 326.9 | 0.0 | 0.0 |
| FEP | 0.2 | 0.80 | 126.69 | −4.31 | 0.6 | . | 310.5 | . | 326.87 | 0.0 | 0.0 |
| FEP | 0.2 | 0.80 | 127.53 | −3.47 | 0.6 | . | 310.5 | . | 326.87 | 0.0 | 0.0 |
| FEP | 0.2 | 0.80 | 129.21 | −1.79 | 0.6 | . | 310.5 | . | 326.87 | 0.0 | 0.0 |
| FEP | 0.4 | 0.60 | 129.77 | 1.98 | 1 | 213.96 | 309.99 | 232.56 | 326.46 | 8.0 | 9.9 |
| FEP | 0.4 | 0.60 | 129.77 | 1.98 | 1 | 213.96 | 309.99 | 232.56 | 326.46 | 8.0 | 9.9 |
| FEP | 0.4 | 0.60 | 129.54 | 1.75 | 1 | 213.96 | 309.99 | 232.56 | 326.46 | 8.0 | 9.9 |
| FEP | 0.45 | 0.55 | 129.78 | 2.79 | 1 | 213.35 | 309.9 | 233.1 | 326.08 | 11.6 | 10.9 |
| FEP | 0.45 | 0.55 | 129.55 | 2.56 | 1 | 213.35 | 309.9 | 233.1 | 326.08 | 11.6 | 10.9 |
| FEP | 0.45 | 0.55 | 128.43 | 1.44 | 1 | 213.35 | 309.9 | 233.1 | 326.08 | 11.6 | 10.9 |
| FEP | 0.5 | 0.50 | 127.38 | 1.19 | 1 | 212.62 | 309.48 | 232.87 | 325.93 | 16.4 | 9.9 |
| FEP | 0.5 | 0.50 | 128.90 | 2.71 | 1 | 212.62 | 309.48 | 232.87 | 325.93 | 16.4 | 9.9 |
| FEP | 0.5 | 0.50 | 130.16 | 3.97 | 1 | 212.62 | 309.48 | 232.87 | 325.93 | 16.4 | 9.9 |
| FEP | 0.55 | 0.45 | 126.95 | 1.56 | 0.9 | 212.6 | 309.41 | 233.53 | 325.42 | 13.2 | 9.5 |
| FEP | 0.55 | 0.45 | 128.54 | 3.15 | 0.9 | 212.6 | 309.41 | 233.53 | 325.42 | 13.2 | 9.5 |
| FEP | 0.55 | 0.45 | 126.89 | 1.50 | 0.9 | 212.6 | 309.41 | 233.53 | 325.42 | 13.2 | 9.5 |
| FEP | 0.6 | 0.40 | 127.92 | 3.34 | 0.5 | 214.36 | 309.4 | 233.45 | 325.24 | 11.7 | 11.0 |
| FEP | 0.6 | 0.40 | 127.60 | 3.02 | 0.5 | 214.36 | 309.4 | 233.45 | 325.24 | 11.7 | 11.0 |
| FEP | 0.6 | 0.40 | 127.38 | 2.80 | 0.5 | 214.36 | 309.4 | 233.45 | 325.24 | 11.7 | 11.0 |
| FEP | 0.7 | 0.30 | 126.75 | 3.77 | 0.4 | 215.51 | 308.69 | 235.16 | 325.16 | 12.4 | 9.3 |
| FEP | 0.7 | 0.30 | 125.96 | 2.98 | 0.4 | 215.51 | 308.69 | 235.16 | 325.16 | 12.4 | 9.3 |
| FEP | 0.7 | 0.30 | 126.23 | 3.25 | 0.4 | 215.51 | 308.69 | 235.16 | 325.16 | 12.4 | 9.3 |
| FEP | 0.8 | 0.20 | 122.48 | 1.10 | 0.2 | 215.21 | 307.93 | 234.79 | 324.63 | 15.1 | 10.9 |
| FEP | 0.8 | 0.20 | 122.61 | 1.23 | 0.2 | 215.21 | 307.93 | 234.79 | 324.63 | 15.1 | 10.9 |
| FEP | 0.8 | 0.20 | 123.87 | 2.49 | 0.2 | 215.21 | 307.93 | 234.79 | 324.63 | 15.1 | 10.9 |
| FEP | 0.9 | 0.10 | 119.87 | 0.10 | 0.1 | 218.96 | 306.42 | 235.27 | 325.49 | 15.7 | 11.6 |

TABLE 5-continued

MPF/LPTFE Blends

| MPF Type | MPF % | LPTFE % | CA | Diff CA | Acid rating (0-1 scale) | Fusion mpt MPF | Fusion mpt LPTFE | 2nd melt mpt MPF | 2nd melt mpt LPTFE | Norm DH Fusion MPF | Norm DH Remelt MPF |
|---|---|---|---|---|---|---|---|---|---|---|---|
| FEP | 0.9 | 0.10 | 116.29 | −3.48 | 0.1 | 218.96 | 306.42 | 235.27 | 325.49 | 15.7 | 11.6 |
| FEP | 0.9 | 0.10 | 120.07 | 0.30 | 0.1 | 218.96 | 306.42 | 235.27 | 325.49 | 15.7 | 11.6 |
| FEP | 1 | 0.00 | 119.27 | 1.10 | 0.1 | . | . | . | . | . | . |
| FEP | 1 | 0.00 | 117.13 | −1.04 | 0.1 | . | . | . | . | . | . |
| FEP | 1 | 0.00 | 117.47 | −0.70 | 0.1 | . | . | . | . | . | . |
| MFA | 0 | 1.00 | 135.23 | 0.94 | 0.1 | . | 310.44 | . | 327.9 | 0.0 | 0.0 |
| MFA | 0 | 1.00 | 134.35 | 0.06 | 0.1 | . | 312.6 | . | 330.31 | 0.0 | 0.0 |
| MFA | 0 | 1.00 | 133.30 | −0.99 | . | . | 310.44 | . | 327.9 | 0.0 | 0.0 |
| MFA | 0 | 1.00 | 135.23 | 0.94 | . | . | 312.6 | . | 330.31 | 0.0 | 0.0 |
| MFA | 0 | 1.00 | 134.35 | 0.06 | . | . | 310.44 | . | 327.9 | 0.0 | 0.0 |
| MFA | 0 | 1.00 | 133.30 | −0.99 | . | . | 312.6 | . | 330.31 | 0.0 | 0.0 |
| MFA | 0.1 | 0.90 | 133.68 | 0.56 | 0.1 | . | 310 | . | 327.65 | 0.0 | 0.0 |
| MFA | 0.1 | 0.90 | 133.90 | 0.78 | . | . | 310 | . | 327.65 | . | . |
| MFA | 0.1 | 0.90 | 132.55 | −0.57 | . | . | 310 | . | 327.65 | . | . |
| MFA | 0.15 | 0.85 | 133.58 | 1.04 | 0.1 | . | 309.65 | . | 327.77 | 0.0 | 0.0 |
| MFA | 0.15 | 0.85 | 133.46 | 0.92 | . | . | 309.65 | . | 327.77 | . | . |
| MFA | 0.15 | 0.85 | 133.73 | 1.19 | . | . | 309.65 | . | 327.77 | . | . |
| MFA | 0.25 | 0.75 | 131.09 | −0.28 | 0.1 | . | 311.07 | . | 326.32 | 0.0 | 0.0 |
| MFA | 0.25 | 0.75 | 129.69 | −1.68 | . | . | 311.07 | . | 326.32 | . | . |
| MFA | 0.25 | 0.75 | 129.86 | −1.51 | . | . | 311.07 | . | 326.32 | . | . |
| MFA | 0.35 | 0.65 | 126.60 | −3.60 | 0.1 | 287.84 | 307.87 | . | 326.25 | 1.8 | 0.0 |
| MFA | 0.35 | 0.65 | 120.23 | −9.97 | . | 287.84 | 307.87 | . | 326.25 | . | . |
| MFA | 0.35 | 0.65 | 132.28 | 2.08 | . | 287.84 | 307.87 | . | 326.25 | . | . |
| MFA | 0.4 | 0.60 | 132.30 | 2.69 | 0.1 | 283.08 | 306.95 | . | 326.1 | 2.3 | 0.0 |
| MFA | 0.4 | 0.60 | 132.42 | 2.81 | . | 283.08 | 306.95 | . | 326.1 | . | . |
| MFA | 0.4 | 0.60 | 131.88 | 2.27 | . | 283.08 | 306.95 | . | 326.1 | . | . |
| MFA | 0.45 | 0.55 | 133.25 | 4.22 | 0.1 | 283.72 | 306.29 | . | 325.59 | 2.9 | 0.0 |
| MFA | 0.45 | 0.55 | 132.62 | 3.59 | . | 283.72 | 306.29 | . | 325.59 | . | . |
| MFA | 0.45 | 0.55 | 131.42 | 2.39 | . | 283.72 | 306.29 | . | 325.59 | . | . |
| MFA | 0.5 | 0.50 | 134.16 | 5.72 | 0.1 | 283.55 | 304.71 | . | 325.84 | 3.1 | 0.0 |
| MFA | 0.5 | 0.50 | 132.86 | 4.42 | . | 283.55 | 304.71 | . | 325.84 | . | . |
| MFA | 0.5 | 0.50 | 132.06 | 3.62 | . | 283.55 | 304.71 | . | 325.84 | . | . |
| MFA | 0.55 | 0.45 | 132.34 | 4.48 | 0.1 | 284.7 | 304.18 | 303.13 | 324.71 | 5.1 | 1.6 |
| MFA | 0.55 | 0.45 | 130.89 | 3.03 | . | 284.7 | 304.18 | 303.13 | 324.71 | . | . |
| MFA | 0.55 | 0.45 | 130.30 | 2.44 | . | 284.7 | 304.18 | 303.13 | 324.71 | . | . |
| MFA | 0.6 | 0.40 | 132.26 | 4.98 | 0.9 | 285.13 | 302.96 | 303.63 | 323.41 | 4.8 | 2.1 |
| MFA | 0.6 | 0.40 | 131.84 | 4.56 | . | 285.13 | 302.96 | 303.63 | 323.41 | . | . |
| MFA | 0.6 | 0.40 | 132.10 | 4.82 | . | 285.13 | 302.96 | 303.63 | 323.41 | . | . |
| MFA | 0.65 | 0.35 | 131.09 | 4.40 | 0.7 | 284.76 | 300.23 | 303.36 | 321.93 | 4.6 | 3.0 |
| MFA | 0.65 | 0.35 | 129.69 | 3.00 | . | 284.76 | 300.23 | 303.36 | 321.93 | . | . |
| MFA | 0.65 | 0.35 | 129.86 | 3.17 | . | 284.76 | 300.23 | 303.36 | 321.93 | . | . |
| MFA | 0.7 | 0.30 | 131.07 | 4.96 | 0.6 | 285.2 | 301.59 | 303.37 | 322.86 | 4.6 | 2.9 |
| MFA | 0.7 | 0.30 | 131.17 | 5.06 | . | 285.2 | 301.59 | 303.37 | 322.86 | . | . |
| MFA | 0.7 | 0.30 | 130.18 | 4.07 | . | 285.2 | 301.59 | 303.37 | 322.86 | . | . |
| MFA | 0.75 | 0.25 | 128.37 | 2.85 | 0.2 | 284.71 | 298.63 | 302.56 | 320.72 | 3.5 | 2.7 |
| MFA | 0.75 | 0.25 | 129.31 | 3.79 | . | 284.71 | 298.63 | 302.56 | 320.72 | . | . |
| MFA | 0.75 | 0.25 | 128.73 | 3.21 | . | 284.71 | 298.63 | 302.56 | 320.72 | . | . |
| MFA | 0.8 | 0.20 | 128.11 | 3.17 | 0.1 | 284.46 | 296.79 | 301.81 | 319.14 | 2.6 | 2.9 |
| MFA | 0.8 | 0.20 | 127.35 | 2.41 | . | 284.46 | 296.79 | 301.81 | 319.14 | . | . |
| MFA | 0.8 | 0.20 | 128.05 | 3.11 | . | 284.46 | 296.79 | 301.81 | 319.14 | . | . |
| MFA | 0.9 | 0.10 | 121.91 | −1.86 | 0.1 | . | 288.35 | . | 313.77 | 0.0 | 0.0 |
| MFA | 0.9 | 0.10 | 123.99 | 0.22 | . | . | 288.35 | . | 313.77 | . | . |
| MFA | 0.9 | 0.10 | 124.99 | 1.22 | . | . | 288.35 | . | 313.77 | . | . |
| MFA | 1 | 0.00 | 122.94 | 0.34 | 0.1 | 279.88 | . | 304.13 | . | 21.9 | 13.8 |
| MFA | 1 | 0.00 | 122.50 | −0.10 | 0.1 | 281.71 | . | 305.09 | . | 16.1 | 13.8 |
| MFA | 1 | 0.00 | 122.36 | −0.24 | . | 279.88 | . | 304.13 | . | . | . |
| PFA (A) | 0 | 1.00 | 133.30 | −0.99 | 0.1 | . | 310.39 | . | 327.85 | 0.0 | 0.0 |
| PFA (A) | 0 | 1.00 | 134.35 | 0.06 | . | . | . | . | . | 0.0 | 0.0 |
| PFA (A) | 0 | 1.00 | 135.23 | 0.94 | . | . | . | . | . | 0.0 | 0.0 |
| PFA (A) | 0.1 | 0.90 | 134.75 | 1.23 | 0.1 | . | 310.09 | . | 327.87 | 0.0 | 0.0 |
| PFA (A) | 0.1 | 0.90 | 135.72 | 2.20 | 0.1 | . | 310.09 | . | 327.87 | 0.0 | 0.0 |
| PFA (A) | 0.1 | 0.90 | 136.08 | 2.56 | 0.1 | . | 310.09 | . | 327.87 | 0.0 | 0.0 |
| PFA (A) | 0.2 | 0.80 | 134.95 | 2.20 | 0.1 | . | 309 | . | 327.88 | 0.0 | 0.0 |
| PFA (A) | 0.2 | 0.80 | 135.12 | 2.37 | 0.1 | . | 309 | . | 327.88 | 0.0 | 0.0 |

TABLE 5-continued

MPF/LPTFE Blends

| MPF Type | MPF % | LPTFE % | CA | Diff CA | Acid rating (0-1 scale) | Fusion mpt MPF | Fusion mpt LPTFE | 2nd melt mpt MPF | 2nd melt mpt LPTFE | Norm DH Fusion MPF | Norm DH Remelt MPF |
|---|---|---|---|---|---|---|---|---|---|---|---|
| PFA (A) | 0.2 | 0.80 | 135.28 | 2.53 | 0.1 | . | 309 | . | 327.88 | 0.0 | 0.0 |
| PFA (A) | 0.4 | 0.60 | 137.00 | 5.79 | 0.7 | . | 306.95 | . | 326.42 | 0.0 | 0.0 |
| PFA (A) | 0.4 | 0.60 | 138.20 | 6.99 | 0.7 | . | 306.95 | . | 326.42 | 0.0 | 0.0 |
| PFA (A) | 0.4 | 0.60 | 138.71 | 7.50 | 0.7 | . | 306.95 | . | 326.42 | 0.0 | 0.0 |
| PFA (A) | 0.45 | 0.55 | 136.84 | 6.01 | 1 | 285 | 306.08 | . | 325.87 | 0.0 | 0.0 |
| PFA (A) | 0.45 | 0.55 | 137.54 | 6.71 | 1 | 285 | 306.08 | . | 325.87 | 0.0 | 0.0 |
| PFA (A) | 0.45 | 0.55 | 137.92 | 7.09 | 1 | 285 | 306.08 | . | 325.87 | 0.0 | 0.0 |
| PFA (A) | 0.5 | 0.50 | 135.94 | 5.50 | 1 | 285.44 | 305.65 | 300.41 | 324.91 | 4.8 | 4.9 |
| PFA (A) | 0.5 | 0.50 | 136.53 | 6.09 | 1 | 285.44 | 305.65 | 300.41 | 324.91 | 4.8 | 4.9 |
| PFA (A) | 0.5 | 0.50 | 137.18 | 6.74 | 1 | 285.44 | 305.65 | 300.41 | 324.91 | 4.8 | 4.9 |
| PFA (A) | 0.55 | 0.45 | 135.86 | 5.81 | 1 | 285.1 | 304.39 | 302.67 | 324.51 | 5.1 | 37.9 |
| PFA (A) | 0.55 | 0.45 | 137.23 | 7.18 | 1 | 285.1 | 304.39 | 302.67 | 324.51 | 5.1 | 37.9 |
| PFA (A) | 0.55 | 0.45 | 138.05 | 8.00 | 1 | 285.1 | 304.39 | 302.67 | 324.51 | 5.1 | 37.9 |
| PFA (A) | 0.6 | 0.40 | 136.06 | 6.39 | 1 | 285 | 303.94 | 298.43 | 323.23 | 4.0 | 5.6 |
| PFA (A) | 0.6 | 0.40 | 135.44 | 5.77 | 1 | 285 | 303.94 | 298.43 | 323.23 | 4.0 | 5.6 |
| PFA (A) | 0.6 | 0.40 | 135.35 | 5.68 | 1 | 285 | 303.94 | 298.43 | 323.23 | 4.0 | 5.6 |
| PFA (A) | 0.75 | 0.25 | 132.46 | 3.95 | 0.7 | 285.3 | 300.85 | 295.17 | 320.56 | 11.7 | 4.3 |
| PFA (A) | 0.75 | 0.25 | 129.88 | 1.37 | 0.7 | 285.3 | 300.85 | 295.17 | 320.56 | 11.7 | 4.3 |
| PFA (A) | 0.75 | 0.25 | 132.65 | 4.14 | 0.7 | 285.3 | 300.85 | 295.17 | 320.56 | 11.7 | 4.3 |
| PFA (A) | 0.9 | 0.10 | 128.07 | 0.71 | 0.1 | 296.12 | . | 296.86 | 316.14 | 33.3 | 45.0 |
| PFA (A) | 0.9 | 0.10 | 127.86 | 0.50 | 0.1 | 296.12 | . | 296.86 | 316.14 | 33.3 | 45.0 |
| PFA (A) | 0.9 | 0.10 | 127.60 | 0.24 | 0.1 | 296.12 | . | 296.86 | 316.14 | 33.3 | 45.0 |
| PFA (A) | 1 | 0.00 | 126.50 | −0.09 | 0.1 | 291.94 | . | 311.87 | . | 28.3 | 0.0 |
| PFA (A) | 1 | 0.00 | 126.47 | −0.12 | 0.1 | 291.94 | . | 311.87 | . | 28.3 | 0.0 |
| PFA (A) | 1 | 0.00 | 126.79 | 0.20 | 0.1 | 291.94 | . | 311.87 | . | 28.3 | 0.0 |
| PFA (B) | 0 | 1.00 | 135.23 | 0.94 | 0.1 | . | 310.44 | . | 327.9 | 0.0 | 0.0 |
| PFA (B) | 0 | 1.00 | 134.35 | 0.06 | 0.1 | . | 310.44 | . | 327.9 | 0.0 | 0.0 |
| PFA (B) | 0 | 1.00 | 133.30 | −0.99 | 0.1 | . | 310.44 | . | 327.9 | 0.0 | 0.0 |
| PFA (B) | 0.15 | 0.85 | 128.77 | −3.83 | 0.1 | . | 308.79 | . | 327.12 | 0.0 | 0.0 |
| PFA (B) | 0.15 | 0.85 | 126.77 | −5.83 | 0.1 | . | 308.79 | . | 327.12 | 0.0 | 0.0 |
| PFA (B) | 0.15 | 0.85 | 133.12 | 0.52 | 0.1 | . | 308.79 | . | 327.12 | 0.0 | 0.0 |
| PFA (B) | 0.2 | 0.80 | 131.67 | −0.37 | 0.1 | . | 307.97 | . | 325.1 | 0.0 | 0.0 |
| PFA (B) | 0.2 | 0.80 | 131.92 | −0.12 | 0.1 | . | 307.97 | . | 325.1 | 0.0 | 0.0 |
| PFA (B) | 0.2 | 0.80 | 131.95 | −0.09 | 0.1 | . | 307.97 | . | 325.1 | 0.0 | 0.0 |
| PFA (B) | 0.3 | 0.70 | 129.38 | −1.53 | 0.3 | . | 306.33 | . | 326.42 | 0.0 | 0.0 |
| PFA (B) | 0.3 | 0.70 | 132.77 | 1.86 | 0.1 | . | 306.33 | . | 326.42 | 0.0 | 0.0 |

TABLE 5-continued

MPF/LPTFE Blends

| MPF Type | MPF % | LPTFE % | CA | Diff CA | Acid rating (0-1 scale) | Fusion mpt MPF | Fusion mpt LPTFE | 2nd melt mpt MPF | 2nd melt mpt LPTFE | Norm DH Fusion MPF | Norm DH Remelt MPF |
|---|---|---|---|---|---|---|---|---|---|---|---|
| PFA (B) | 0.3 | 0.70 | 131.14 | 0.23 | 0.1 | . | 306.33 | . | 326.42 | 0.0 | 0.0 |
| PFA (B) | 0.4 | 0.60 | 134.42 | 4.63 | 0.7 | 284.33 | 304.38 | 302.08 | 325.14 | 0.0 | 0.0 |
| PFA (B) | 0.4 | 0.60 | 133.52 | 3.73 | 0.7 | 284.33 | 304.38 | 302.08 | 325.14 | 0.0 | 0.0 |
| PFA (B) | 0.4 | 0.60 | 133.69 | 3.90 | 0.7 | 284.33 | 304.38 | 302.08 | 325.14 | 0.0 | 0.0 |
| PFA (B) | 0.45 | 0.55 | 135.39 | 6.17 | 0.1 | . | 304.02 | . | 324.48 | 0.0 | 0.0 |
| PFA (B) | 0.45 | 0.55 | 135.26 | 6.04 | 0.1 | . | 304.02 | . | 324.48 | 0.0 | 0.0 |
| PFA (B) | 0.45 | 0.55 | 135.39 | 6.17 | 0.1 | . | 304.02 | . | 324.48 | 0.0 | 0.0 |
| PFA (B) | 0.5 | 0.50 | 135.78 | 7.12 | 0.9 | 281.64 | 302.69 | . | 323.34 | 2.0 | 0.0 |
| PFA (B) | 0.5 | 0.50 | 134.98 | 6.32 | 0.9 | 281.64 | 302.69 | . | 323.34 | 2.0 | 0.0 |
| PFA (B) | 0.5 | 0.50 | 135.27 | 6.61 | 0.9 | 281.64 | 302.69 | . | 323.34 | 2.0 | 0.0 |
| PFA (B) | 0.55 | 0.45 | 133.84 | 5.74 | 0.9 | 281.16 | 301.88 | . | 316.5 | 2.2 | 0.0 |
| PFA (B) | 0.55 | 0.45 | 135.15 | 7.05 | 0.9 | 281.16 | 301.88 | . | 316.5 | 2.2 | 0.0 |
| PFA (B) | 0.55 | 0.45 | 133.91 | 5.81 | 0.9 | 281.16 | 301.88 | . | 316.5 | 2.2 | 0.0 |
| PFA (B) | 0.6 | 0.40 | 130.12 | 2.59 | 0.5 | 281.75 | 300.23 | . | 321.15 | 1.3 | 0.0 |
| PFA (B) | 0.6 | 0.40 | 131.32 | 3.79 | 0.5 | 281.75 | 300.23 | . | 321.15 | 1.3 | 0.0 |
| PFA (B) | 0.6 | 0.40 | 131.65 | 4.12 | 0.5 | 281.75 | 300.23 | . | 321.15 | 1.3 | 0.0 |
| PFA (B) | 0.7 | 0.30 | 131.27 | 4.86 | 0.8 | 252.07 | 297.29 | . | 319.71 | 0.0 | 0.0 |
| PFA (B) | 0.7 | 0.30 | 131.32 | 4.91 | 0.8 | 252.07 | 297.29 | . | 319.71 | 0.0 | 0.0 |
| PFA (B) | 0.7 | 0.30 | 130.62 | 4.21 | 0.8 | 252.07 | 297.29 | . | 319.71 | 0.0 | 0.0 |
| PFA (B) | 0.75 | 0.25 | 127.70 | 1.86 | 0.5 | 254.53 | 296.54 | . | 318.33 | 0.0 | 0.0 |
| PFA (B) | 0.75 | 0.25 | 129.14 | 3.30 | 0.1 | 254.53 | 296.54 | . | 318.33 | 0.0 | 0.0 |
| PFA (B) | 0.75 | 0.25 | 128.03 | 2.19 | 0.1 | 254.53 | 296.54 | . | 318.33 | 0.0 | 0.0 |
| PFA (B) | 0.8 | 0.20 | 127.99 | 2.71 | 0.4 | 249.05 | 291.86 | . | 315.78 | 0.6 | 0.0 |
| PFA (B) | 0.8 | 0.20 | 126.40 | 1.12 | 0.4 | 249.05 | 291.86 | . | 315.78 | 0.6 | 0.0 |
| PFA (B) | 0.8 | 0.20 | 127.51 | 2.23 | 0.4 | 249.05 | 291.86 | . | 315.78 | 0.6 | 0.0 |
| PFA (B) | 0.9 | 0.10 | 126.29 | 2.14 | 0.5 | 251.12 | 292.45 | 294.28 | 314.19 | 0.0 | 0.0 |
| PFA (B) | 0.9 | 0.10 | 126.41 | 2.26 | 0.5 | 251.12 | 292.45 | 294.28 | 314.19 | 0.0 | 0.0 |
| PFA (B) | 0.9 | 0.10 | 126.27 | 2.12 | 0.5 | 251.12 | 292.45 | 294.28 | 314.19 | 0.0 | 0.0 |
| PFA (B) | 1 | 0.00 | 122.83 | −0.20 | 0.1 | 308.79 | 308.79 | 309.18 | 309.18 | 58.2 | 14.6 |
| PFA (B) | 1 | 0.00 | 122.93 | −0.10 | 0.1 | 308.79 | 308.79 | 309.18 | 309.18 | 58.2 | 14.6 |
| PFA (B) | 1 | 0.00 | 123.32 | 0.29 | 0.1 | 308.79 | 308.79 | 309.18 | 309.18 | 58.2 | 14.6 |

Example 8

PFA/LPTFE Blends

Example 8 is an extension of previous Examples for further measurements made on PFA/LPTFE blends. In this Example, two systems were examined based on TE-7224 (PFA (B)) and PFA6900Z (PFA (A)), respectively.

Figure 41:
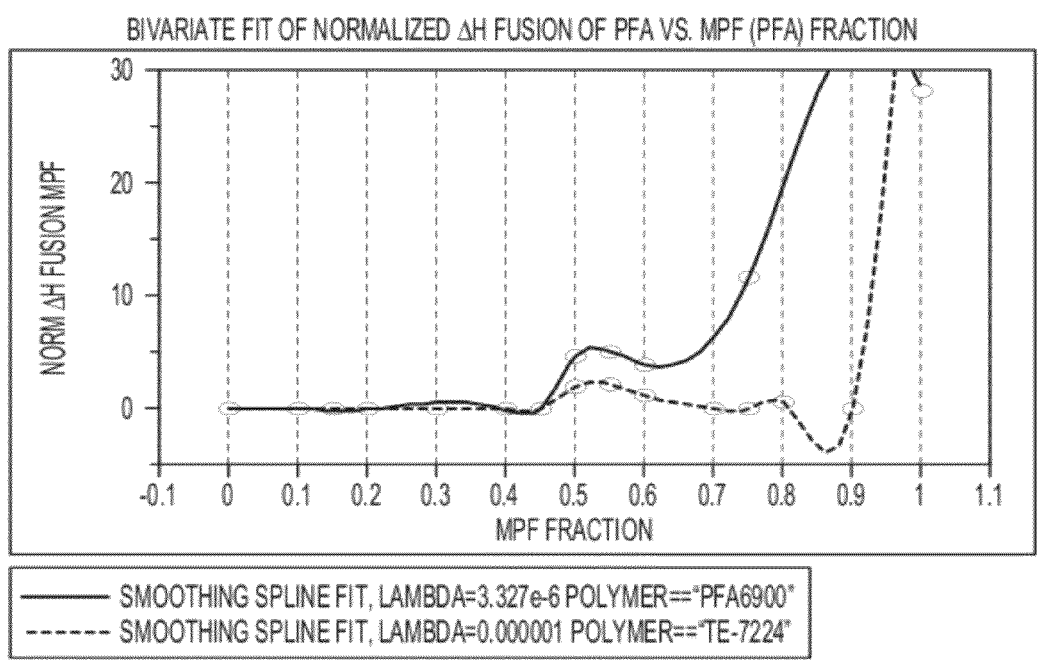
Figure 42:
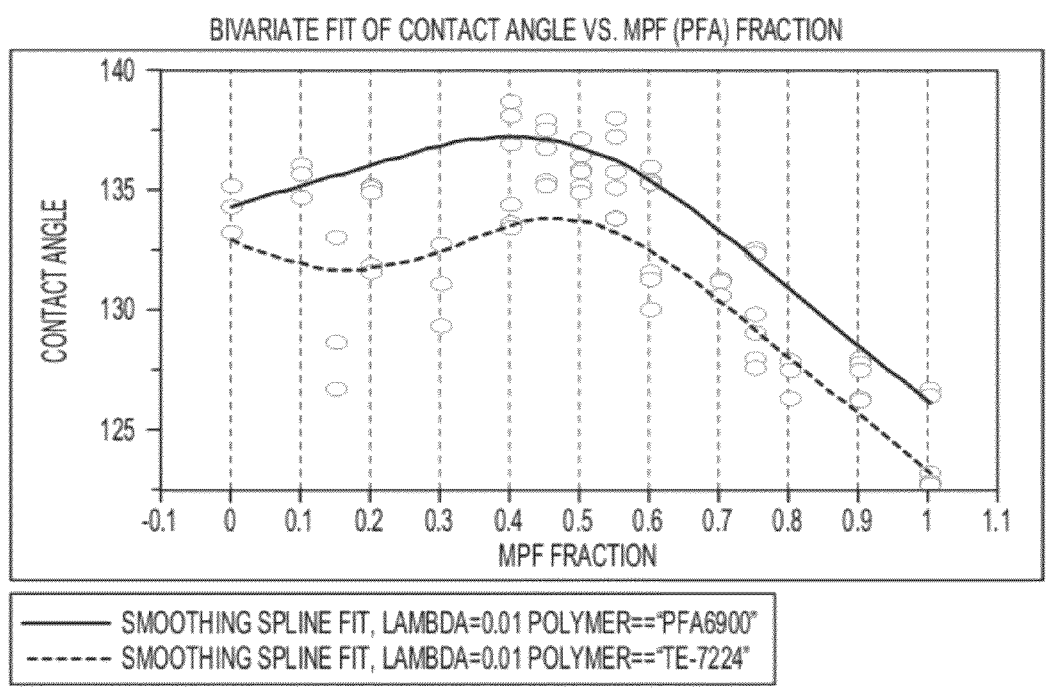
Figure 43:
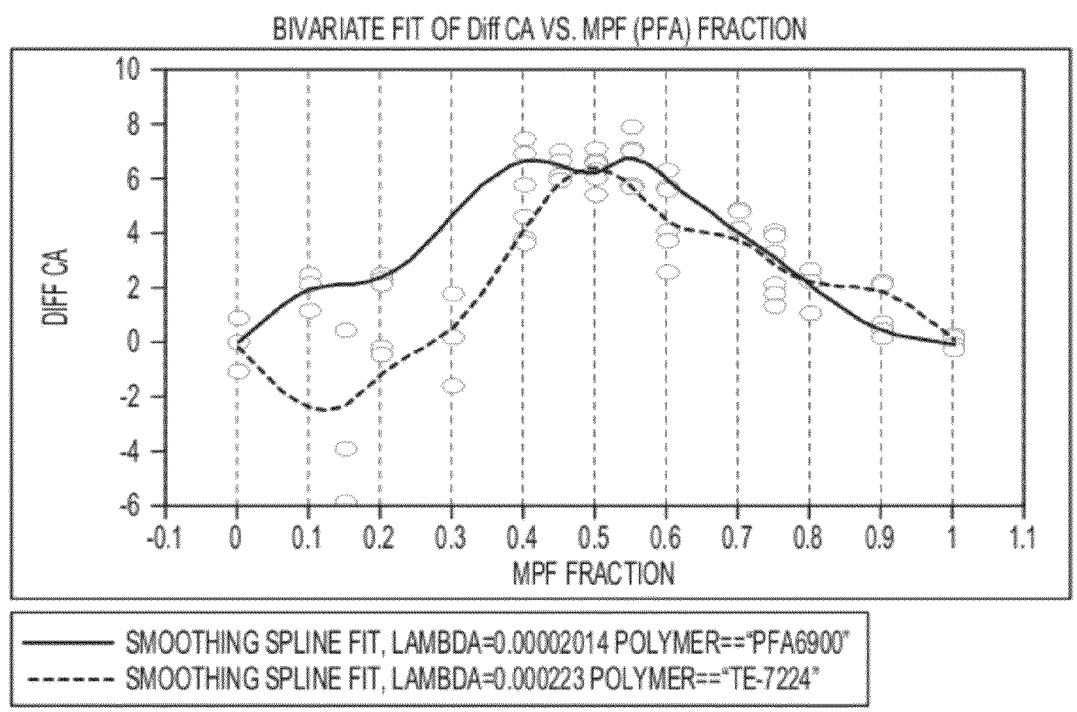
Figure 44:
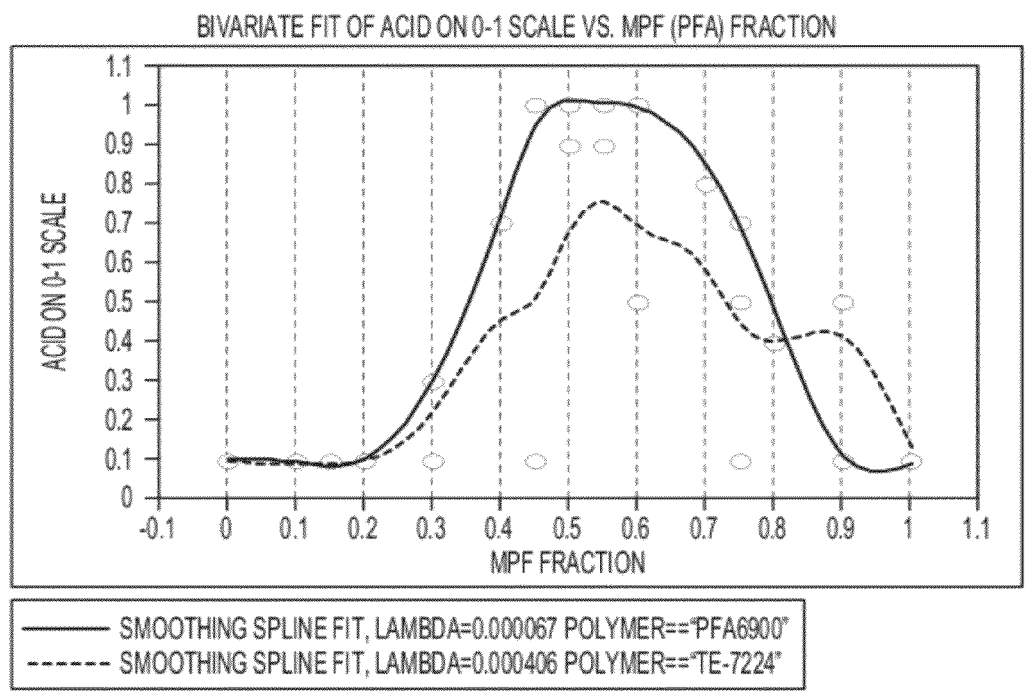

FIG. 41 shows the normalized heat of fusion for these polymer blends as a function of [MPF], a peak is visible in both cases centered on a weight fraction MPF=ca 0.53. Likewise FIGS. 42 and 43 show peaks in the contact angle data at the same concentration. FIG. 43 plots the difference between the observed contact angle and that expected from a linear interpolation between the two components; there is a greater than 6 degree difference at the optimal concentration of

[MPF]=0.53 with significant differences between [MPF]= 0.3-0.7. This behavior is precisely mirrored in FIG. 44, which shows the acid resistance after 6 hours exposure to HCL. Under these conditions, both pure components have failed catastrophically. However, the compositions in the region of [MPF]=ca 0.53 remain pristine.

Figure 45:
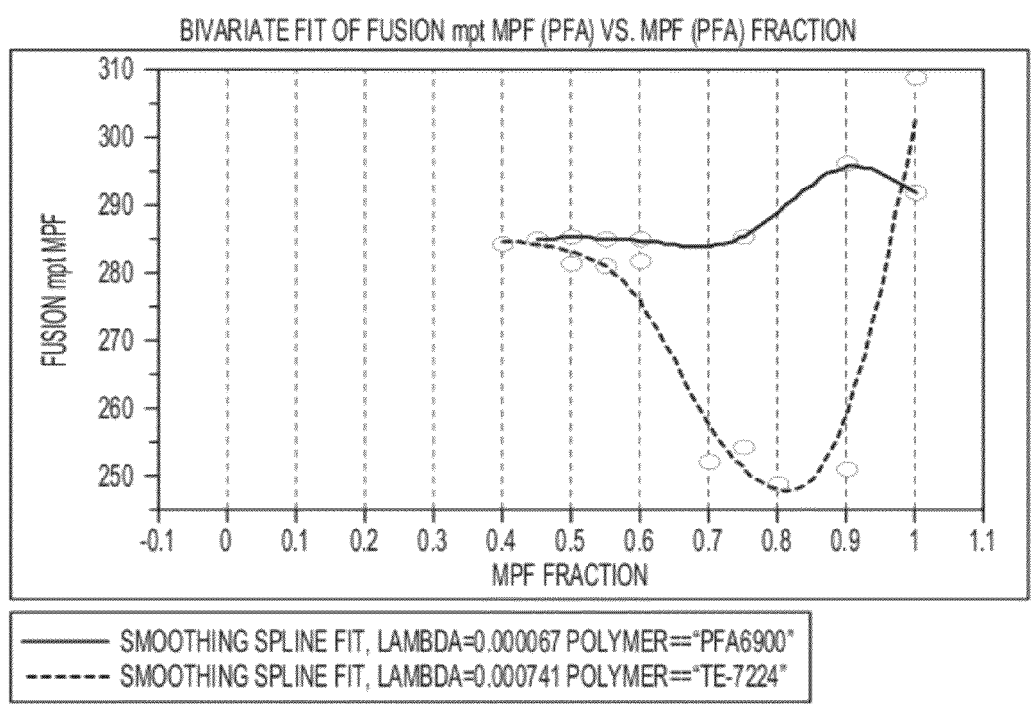
Figure 46:
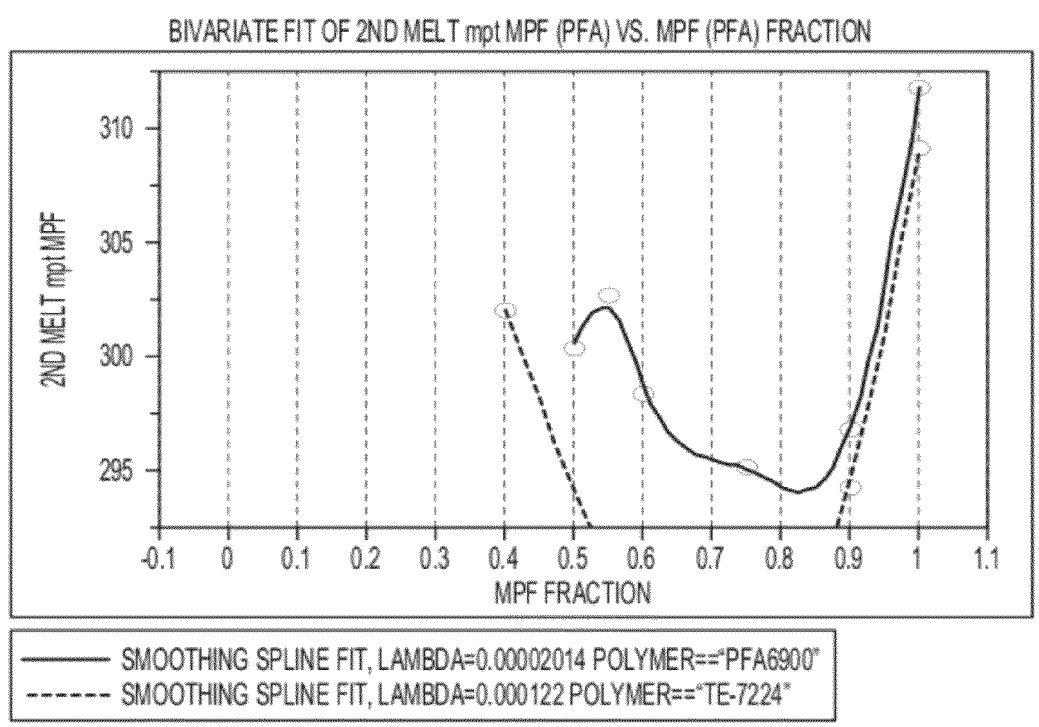
Figure 47:
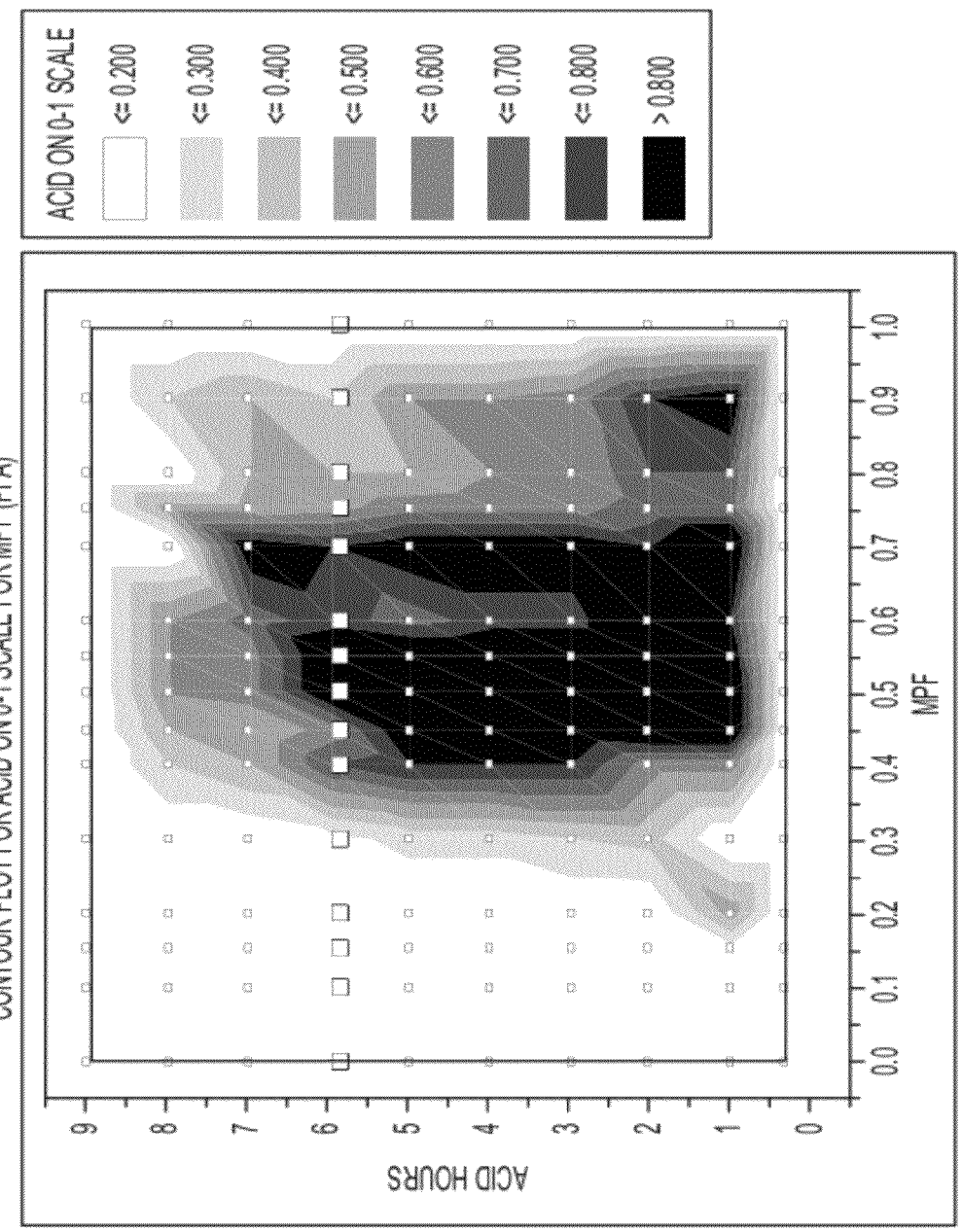

FIGS. 45 and 46 show the melting points of the PFA based samples and give some indication of local maxima associated with the optimal compositions discussed above. Finally, FIG. 47 shows the acid resistance performance with time and [MPF] in a contour plot; the darker regions represent superior performance, it is quite clear from this figure that prolonged acid resistance is only obtainable at compositions between [MPF]=ca 0.3-0.75.

Example 9

FEP/LPTFE Blends

Example 9 is an extension of previous Examples for further measurements made on FEP/LPTFE blends in this case a different system was examined based on ND-110.

Figure 48:
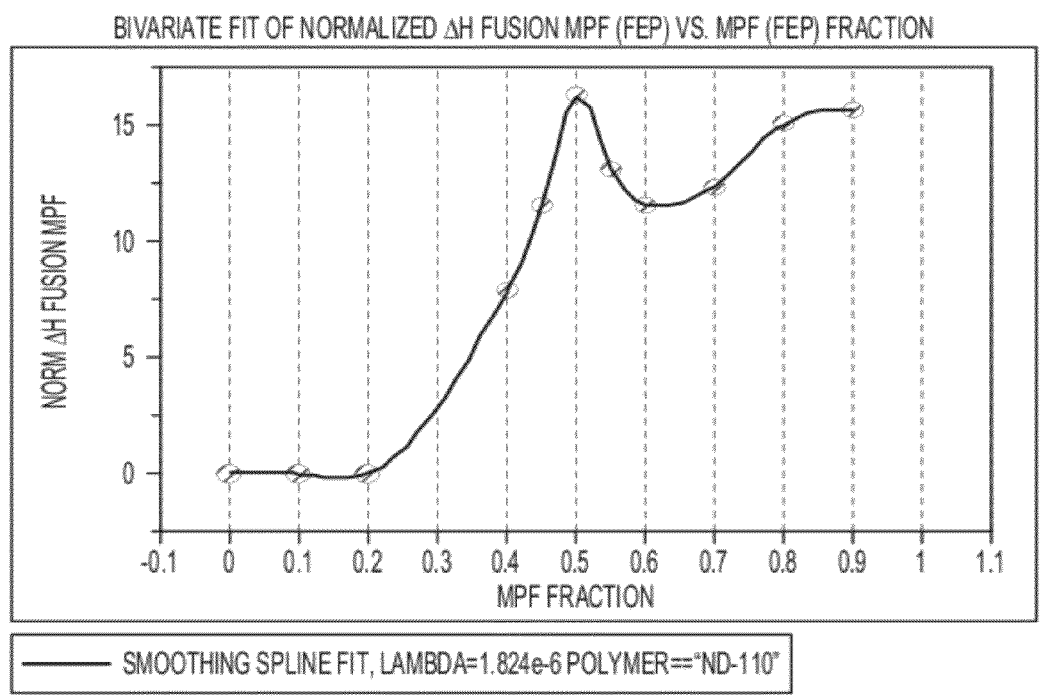
Figure 49:
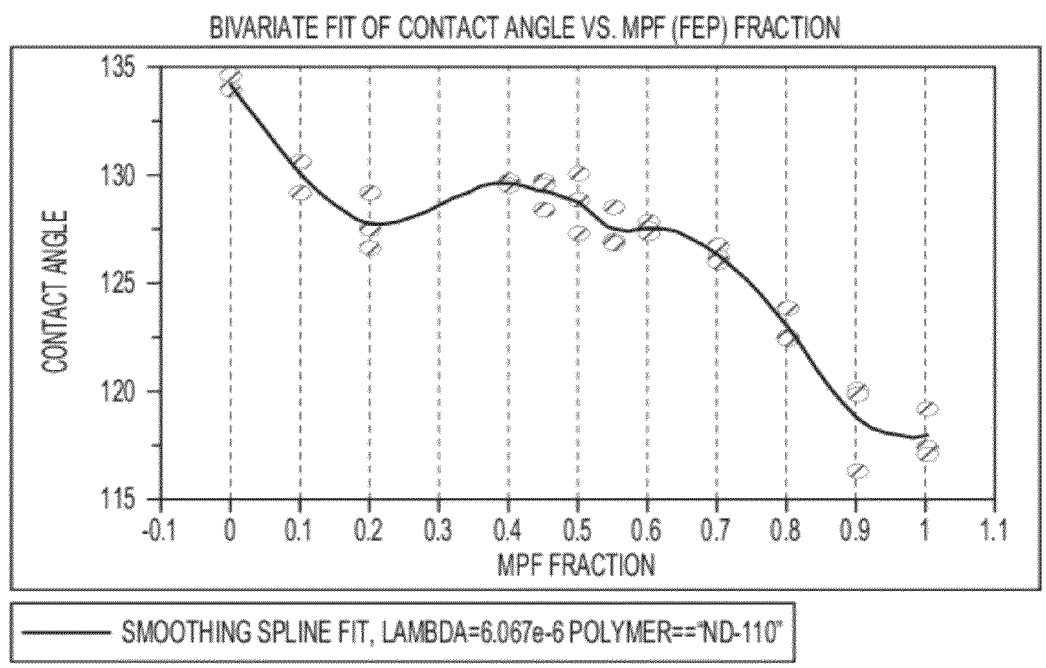
Figure 50:
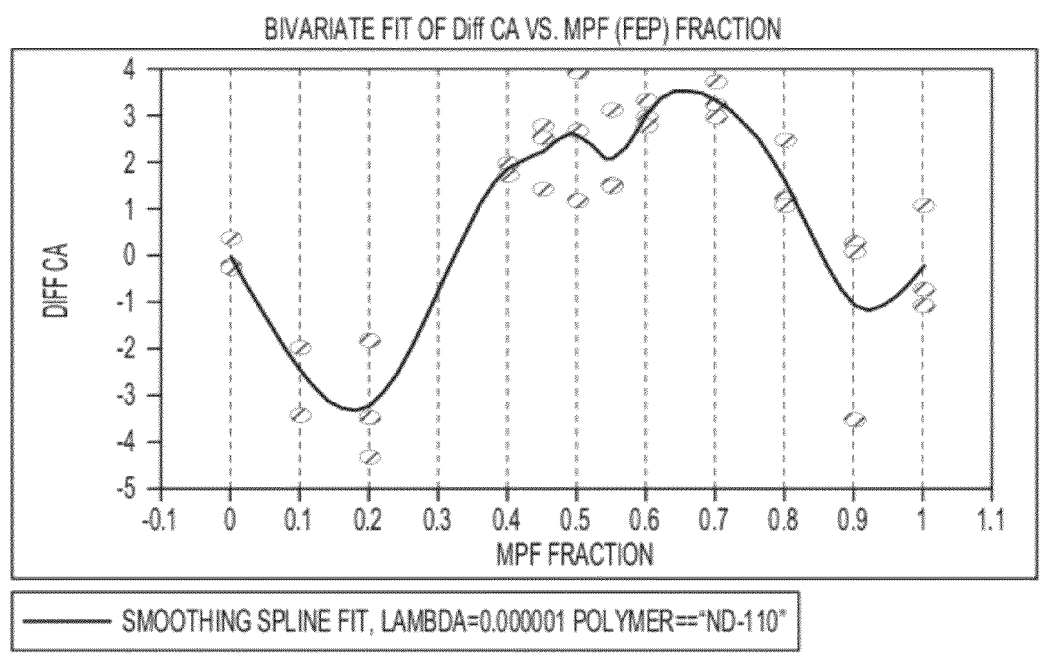
Figure 51:
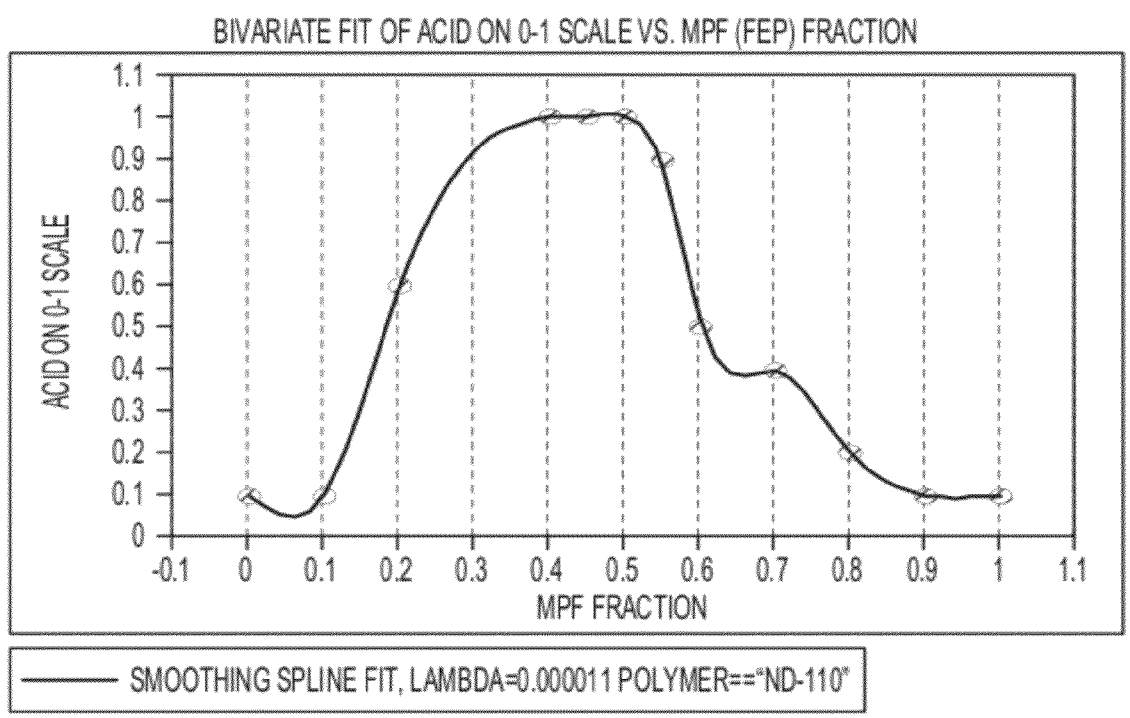

FIG. 48 shows the normalized heat of fusion for this polymer blend as a function of [MPF], a peak is visible in this case centered on a weight fraction, MPF=0.5. Likewise, FIGS. 49 and 50 show peaks in the contact angle data at the same concentration, but an additional peak is also observed at [MPF]=ca 0.7. FIG. 50 plots the difference between the observed contact angle and that expected from a linear interpolation between the two components; there is a greater than 3 degree difference at these optimal concentrations of [MPF] =ca 0.5-0.7, with significant differences between [MPF]=0.4-0.8. This behavior is precisely mirrored in FIG. 51, which shows the acid resistance after 6 hours exposure to HCL. Under these conditions, both pure components have failed catastrophically. However, the compositions in the region of [MPF]=ca 0.35-0.6 remain pristine and there is some indication that at [MPF]=0.7 acid resistance is slightly enhanced.

Figure 52:
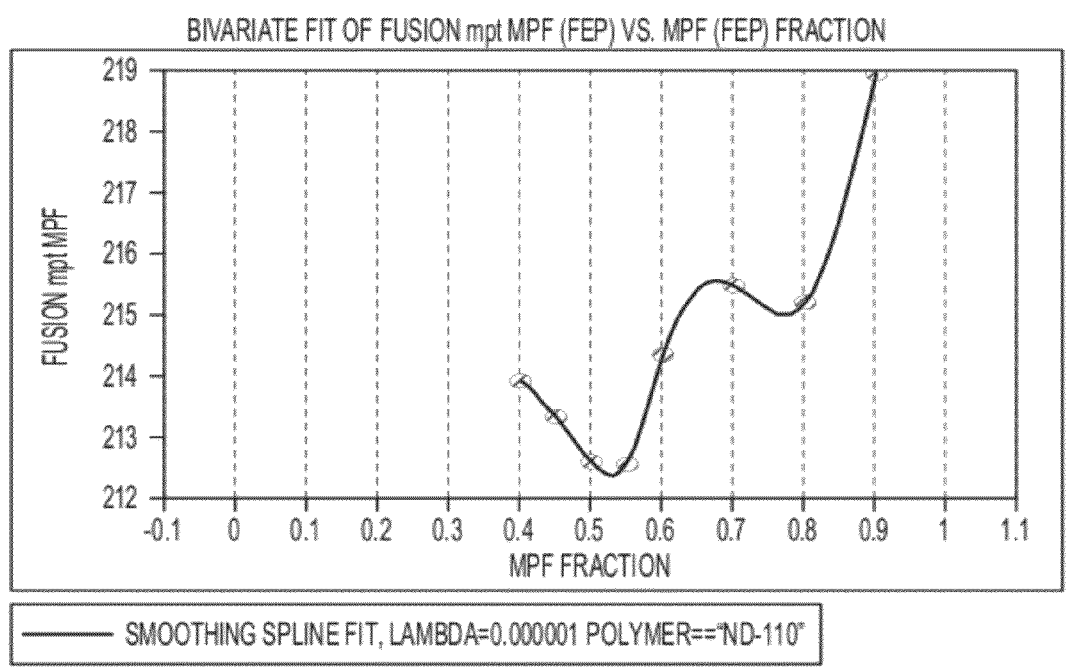
Figure 53:
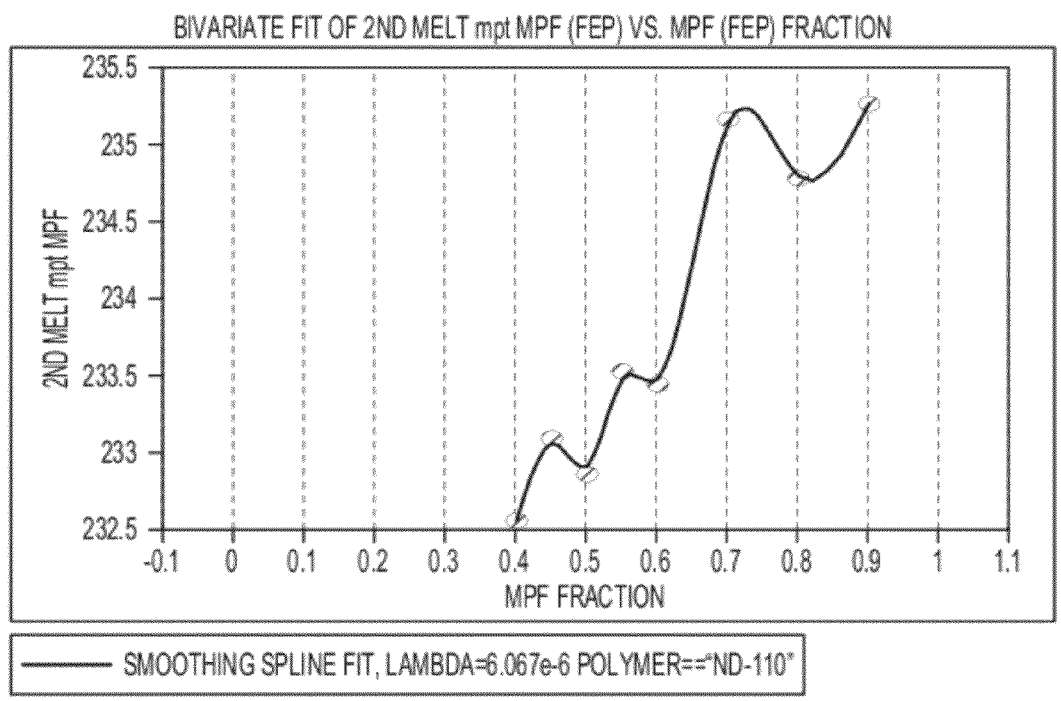

FIGS. 52 and 53 show the melting points of the FEP based samples and give some indication of local maxima associated with the optimal compositions discussed above.

Figure 54:
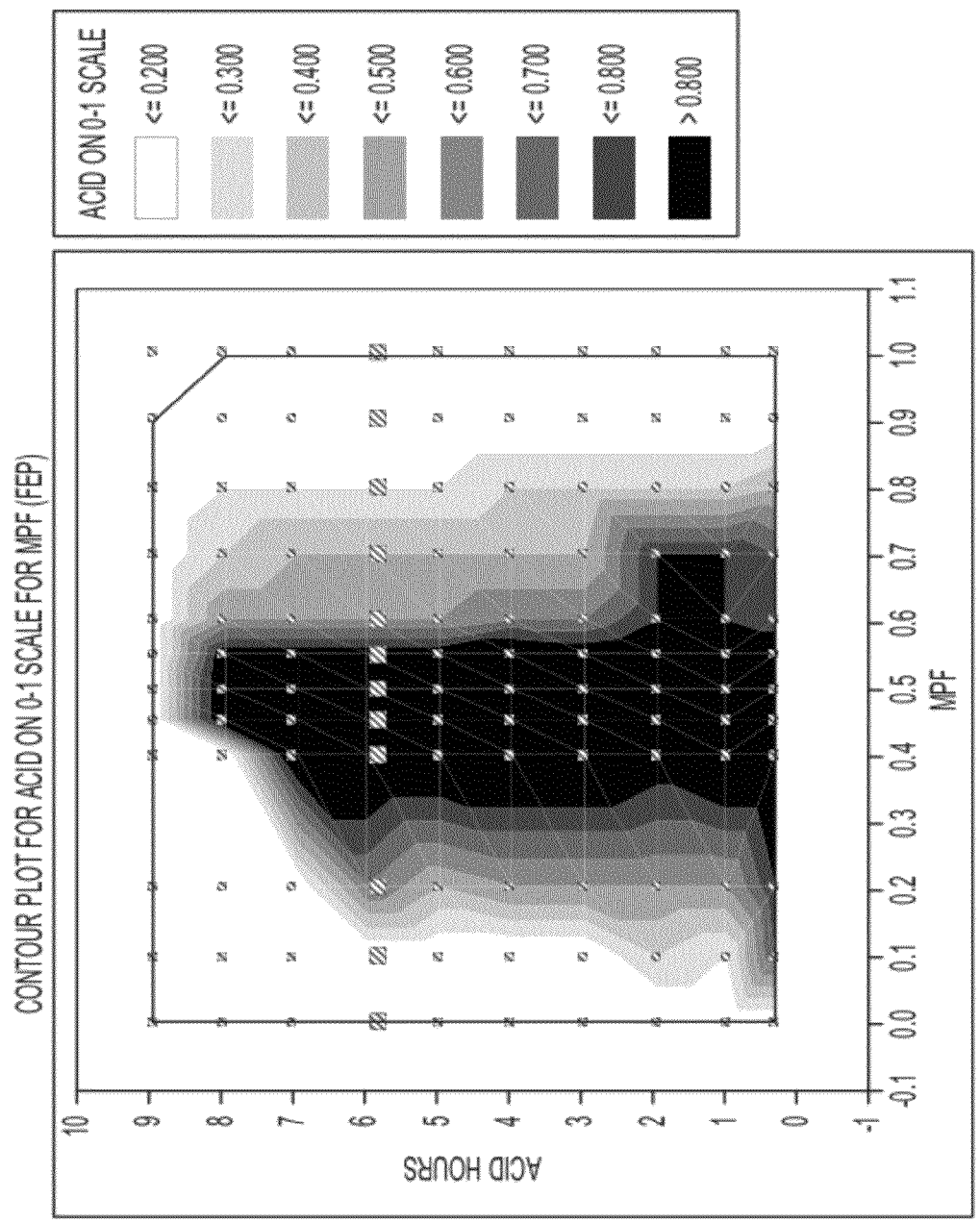

Finally, FIG. 54 shows the acid resistance performance with time and [MPF] in a contour plot; the darker regions represent superior performance, it is quite clear from this figure that prolonged acid resistance is only obtainable at compositions between [MPF]=0.3-0.6, with samples outside this range failing quickly.

Example 10

MFA/LPTFE Blends

Example 10 is an extension of previous Examples for further measurements made on MFA/LPTFE blends.

Figure 55:
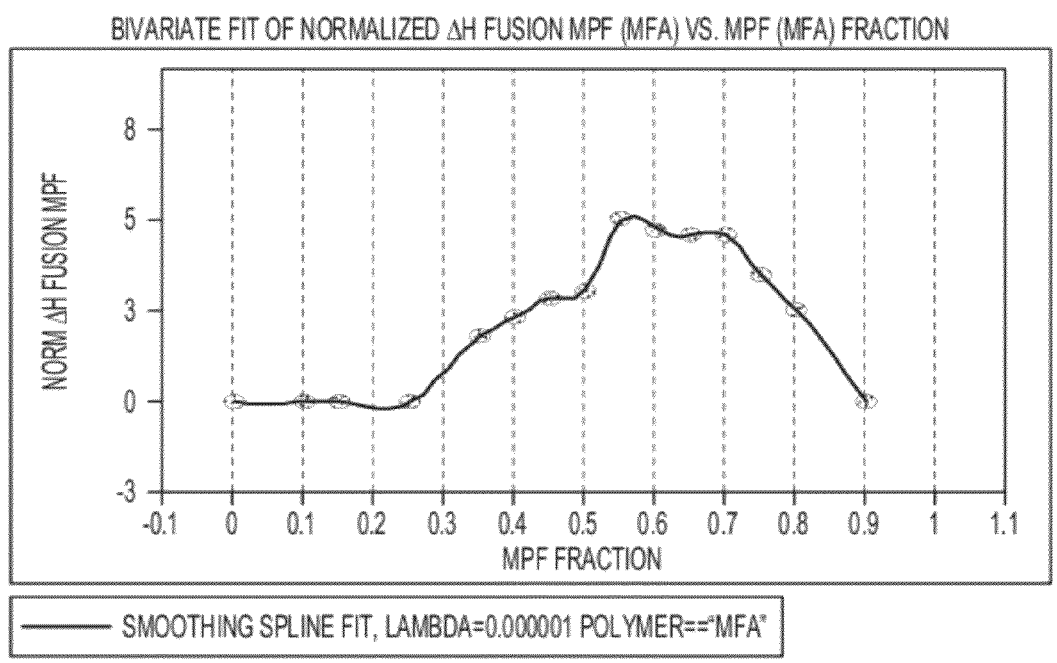
Figure 56:
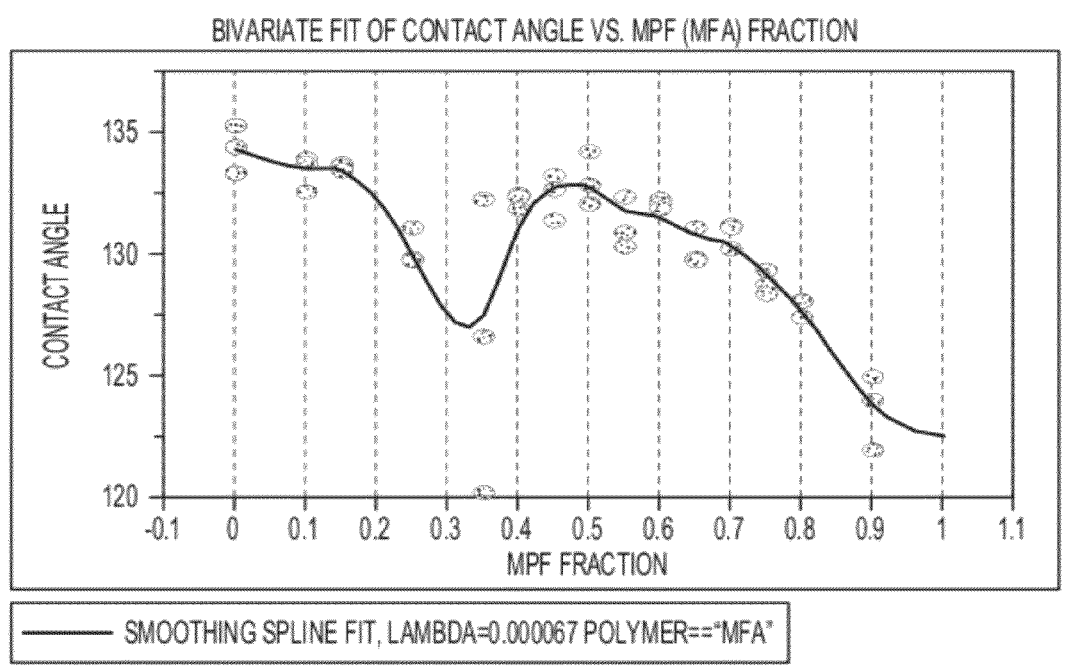
Figure 57:
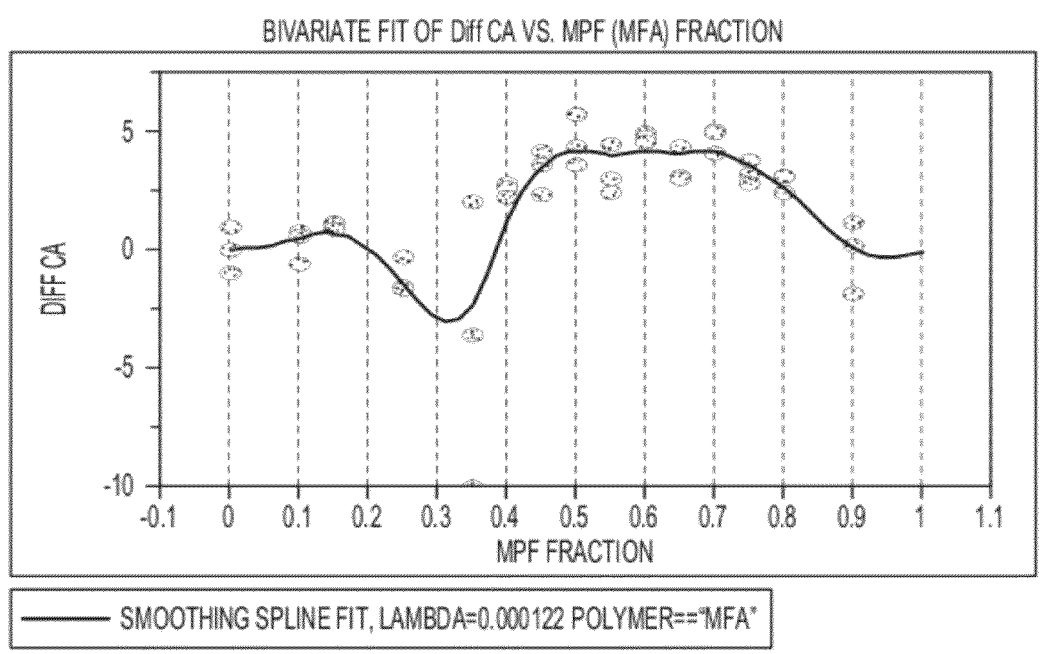
Figure 58:
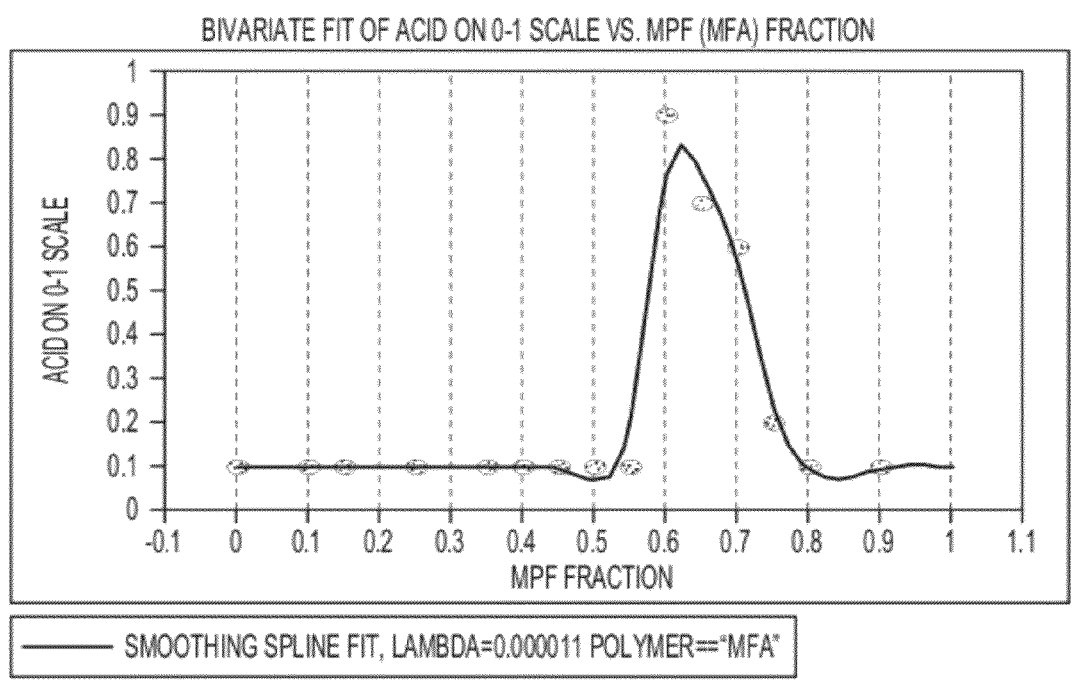

FIG. 55 shows the normalized heat of fusion for this polymer blend as a function of [MPF], a peak is visible in this case centered on a weight fraction, MPF=ca. 0.65. Likewise, FIGS. 56 and 57 show peaks in the contact angle data at the same concentration. FIG. 57 plots the difference between the observed contact angle and that expected from a linear interpolation between the two components; there is a greater than 5 degree difference at the optimal concentration of between [MPF]=ca 0.45-0.7 with significant differences between [MPF]=0.45-0.8. This behavior is mirrored in FIG. 58, which shows the acid resistance after 6 hours exposure to HCL. Under these conditions, both pure components have failed catastrophically. However, the compositions in the region of [MPF]=ca 0.6-0.7 are largely unaffected.

Figure 59:
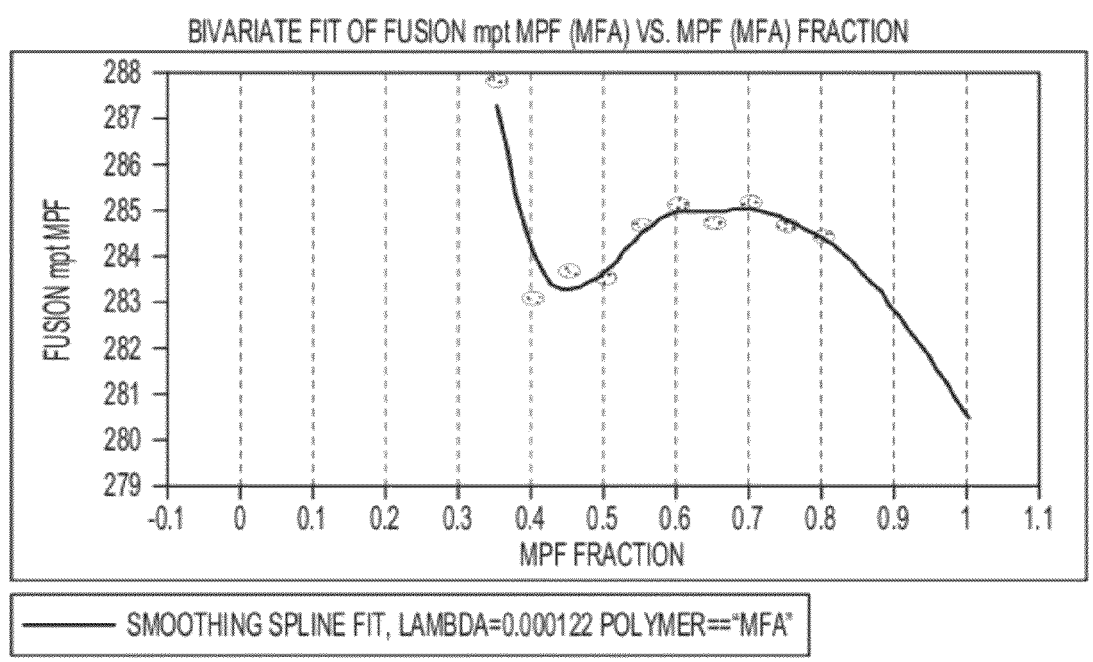
Figure 60:
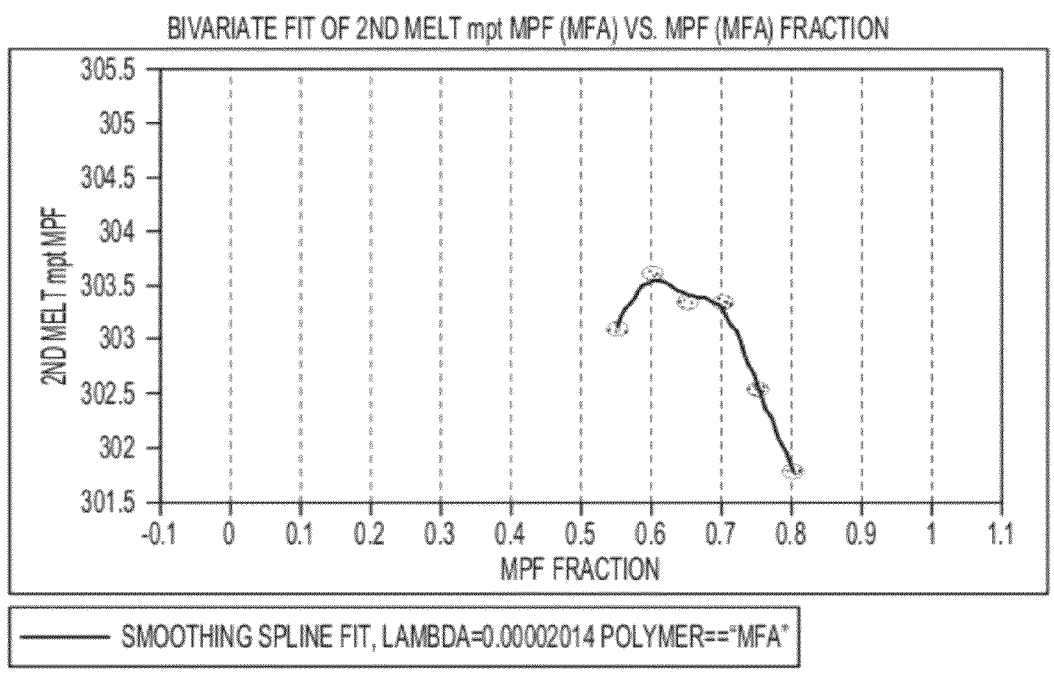

FIGS. 59 and 60 show the melting points of the MFA based samples and give some indication of local maxima associated with the optimal compositions discussed above.

Figure 61:
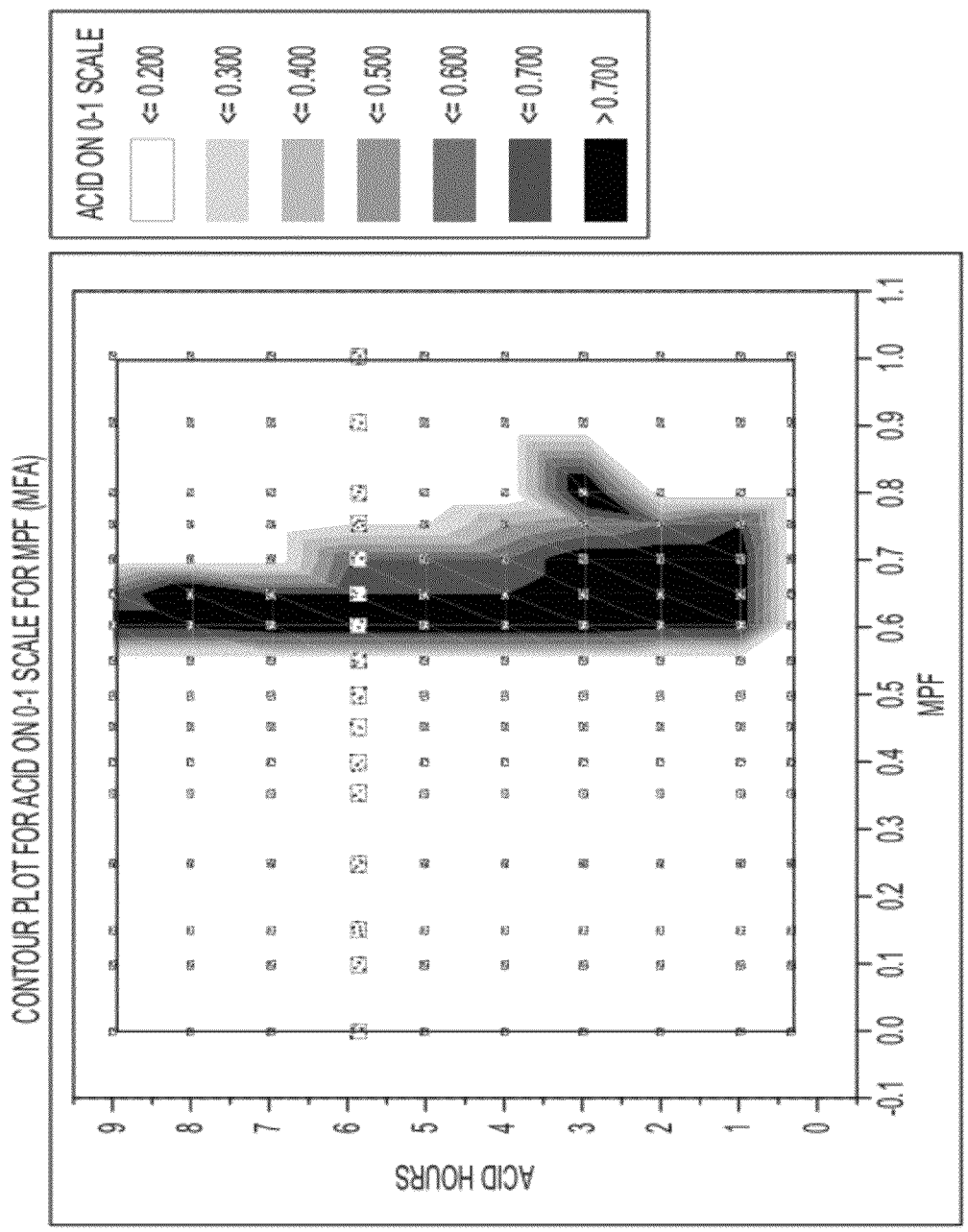
Figure 62:
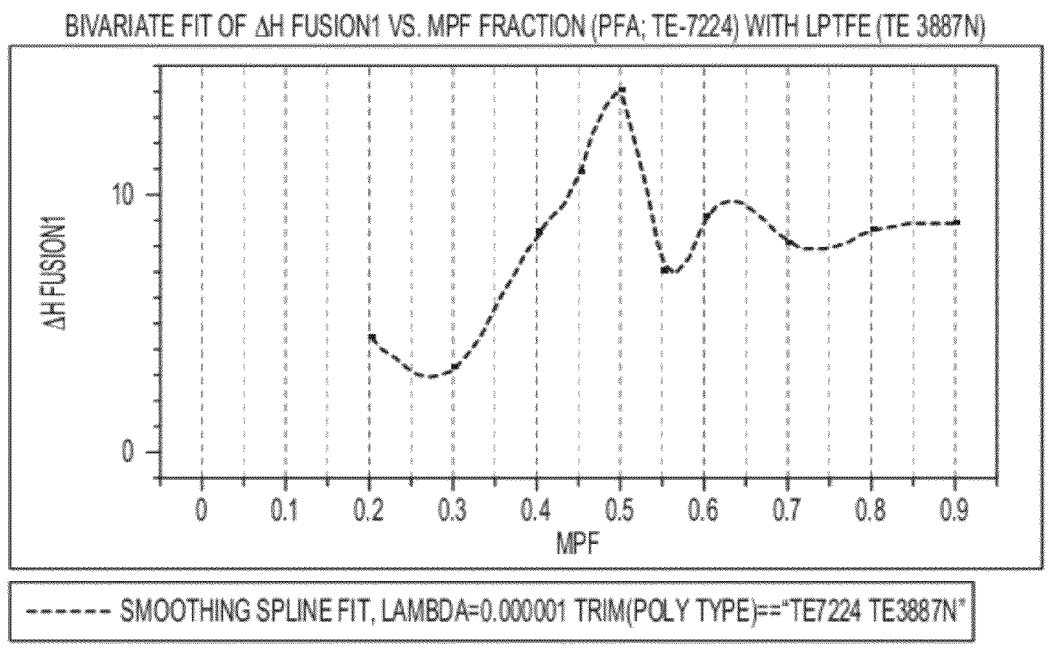

Finally, FIG. 61 shows the acid resistance performance with time and [MPF] in a contour plot; the darker regions represent superior performance, it is quite clear from this figure that prolonged acid resistance is only obtainable at compositions between [MPF]=ca 0.55-0.75, with samples outside this range failing quickly.

Example 11

PFA/LPTFE Blend Using DuPont TE-7224/TE-3887N

Figure 63:
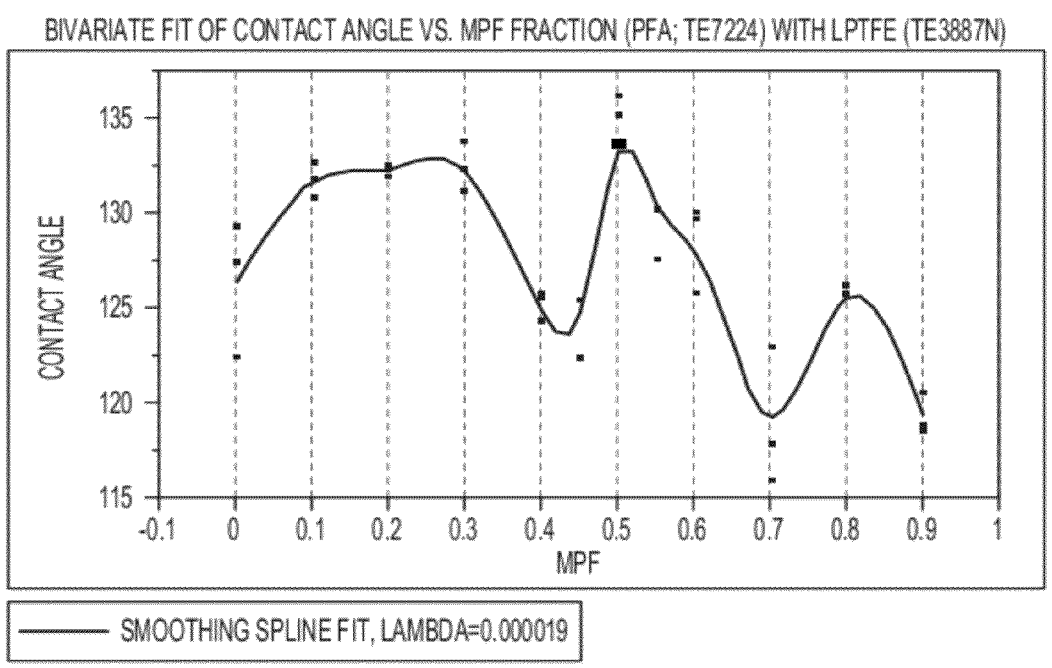
Figure 64:
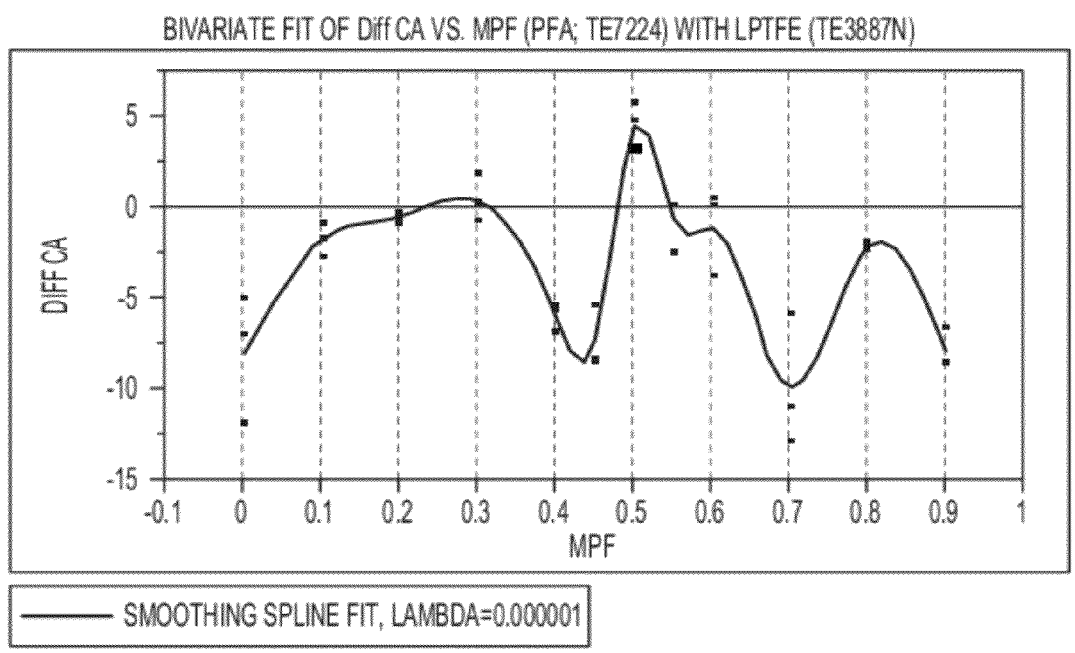
FIG. 64 is a chart of Diff CA vs. PFA fraction.

Blends of PFA TE-7224 with DuPont's Zonyl TE-3887N LPTFE were made in an analogous manner to those of Example 10 given above with the SFN-D being substituted by TE-3887N. Measurement of the heat of fusion data for the PFA component (FIG. 62) showed very similar behavior as for Example 3 (FIG. 41) indicating that this substitution had a negligible effect. We measure the first melting point of SFN-D as 327.9 deg C. and that of TE-3887N as 329.9 deg C. indicating that TE-3887N is higher in mwt than SFN-D and that such a change in mwt has a negligible impact on optimum blend properties. FIGS. 63 and 64 show the contact angle and contact angle difference respectively for these TE-7224/TE-3887 blends and here again a peak in the data at approximately MPF=0.5 is observed consistent with the heat of fusion data and the analogous plots of Example 10 i.e. FIGS. 42 and 43, further demonstrating the negligible impact of the use of a different LPTFE.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of forming a fluoropolymer powder composition, comprising the steps of:
providing a blended fluoropolymer composition comprising:
perfluorinated low molecular weight polytetrafluoroethylene (LPTFE) having a number average molecular weight ($M_n$) less than 500,000 and a first melt temperature ($T_m$) of 332° C. or less, in the form of a liquid dispersion of particles having a mean particle size of 1.0 microns (µm) or less, the liquid dispersion of LPTFE particles including less than 1.0 wt. % surfactant, based on the weight of the LPTFE liquid dispersion,
perfluoroalkoxy (PFA) in the form of a liquid dispersion of particles having a mean particle size of 1.0 microns (µm) or less and having a melt flow rate (MFR) of at least 4.0 g/10 min;
the blended fluoropolymer composition comprising a PFA content of 37 wt. % to 65 wt. % and a LPTFE content of 35 wt. % to 63 wt. %, based on the total solids of the LPTFE and PFA; and
drying the blended fluoropolymer composition to form a powder.

2. The method of claim 1, wherein said drying step comprises freeze drying.

3. The method of claim 1, wherein the blended fluoropolymer composition comprises a PFA content of 43 wt. % to 63 wt. % and a LPTFE content of 37 wt. % to 57 wt. %, based on the total solids of the LPTFE and PFA.

4. The method of claim 1, wherein the blended fluoropolymer composition comprises a PFA content of 50 wt. % to 60 wt. % and a LPTFE content of 40 wt. % to 50 wt. %, based on the total solids of the LPTFE and PFA.

5. The method of claim 1, wherein said low molecular weight polytetrafluoroethylene (LPTFE) dispersion has a mean particle size of 0.75 microns (μm) or less.

6. The method of claim 1, wherein said low molecular weight polytetrafluoroethylene (LPTFE) dispersion has a mean particle size of 0.5 microns (μm) or less.

7. The method of claim 1, wherein said low molecular weight polytetrafluoroethylene (LPTFE) has a first melt temperature ($T_m$) of 329° C. or less.

8. The method of claim 1, wherein said low molecular weight polytetrafluoroethylene (LPTFE) has a first melt temperature ($T_m$) of 326° C. or less.

9. The method of claim 1, wherein said low molecular weight polytetrafluoroethylene (LPTFE) dispersion is obtained via emulsion polymerization and without being subjected to agglomeration, thermal degradation, or irradiation.

10. The method of claim 1, wherein said low molecular weight polytetrafluoroethylene (LPTFE) includes a modifying co-monomer in an amount less than 0.1 wt. % based on the weight of said low molecular weight polytetrafluoroethylene (LPTFE).

11. The method of claim 1, wherein the low molecular weight polytetrafluoroethylene (LPTFE) is LPTFE homopolymer.

12. The method of claim 1, wherein:
the blended fluoropolymer composition comprises a PFA content of 43 wt. % to 63 wt. % and a LPTFE content of 37 wt. % to 57 wt. %, based on the total solids of the LPTFE and PFA;
said low molecular weight polytetrafluoroethylene (LPTFE) dispersion has a mean particle size of 0.75 microns (μm) or less; and
said low molecular weight polytetrafluoroethylene (LPTFE) dispersion has a first melt temperature ($T_m$) of 329° C. or less.

13. The method of claim 12, wherein the blended fluoropolymer composition comprises a PFA content of 50 wt. % to 60 wt. % and a LPTFE content of 40 wt. % to 50 wt. %, based on the total solids of the LPTFE and PFA.

14. The method of claim 1, wherein said providing step further comprises mixing the liquid dispersions of LPTFE and PFA particles without coagulation of the particles.

15. A method of forming a fluoropolymer powder composition, comprising the steps of:
providing a blended fluoropolymer composition comprising:
low molecular weight polytetrafluoroethylene (LPTFE) having a number average molecular weight ($M_n$) less than 500,000 and a first melt temperature ($T_m$) of 332° C. or less, in the form of a liquid dispersion of particles having a mean particle size of 1.0 microns (μm) or less, the liquid dispersion of LPTFE particles includes less than 1.0 wt. % surfactant, based on the weight of the LPTFE liquid dispersion; and
methylfluoroalkoxy (MFA) in the form of a liquid dispersion of particles having a mean particle size of 1.0 microns (μm) or less;
the blended fluoropolymer composition comprising a MFA content of 35 wt. % to 90 wt. % and a LPTFE content of 10 wt. % to 65 wt. %, based on the total solids of the LPTFE and MFA; and
drying the blended fluoropolymer composition to form a powder.

16. The method of claim 15, wherein said drying step comprises freeze drying.

17. The method of claim 15, wherein the blended fluoropolymer composition comprises a MFA content of 45 wt. % to 76 wt. % and a LPTFE content of 24 wt. % to 65 wt. %, based on the total solids of the LPTFE and MFA.

18. The method of claim 15, wherein the blended fluoropolymer composition comprises a MFA content of 56 wt. % to 76 wt % and a LPTFE content of 24 wt. % to 44 wt. %, based on the total solids of the LPTFE and MFA.

19. The method of claim 15, wherein the blended fluoropolymer composition comprises a MFA content of 63 wt. % to 70 wt. % and a LPTFE content of 30 wt. % to 37 wt. %, based on the total solids of the LPTFE and MFA.

20. The method of claim 15, wherein said low molecular weight polytetrafluoroethylene (LPTFE) dispersion has a mean particle size of 0.75 microns (μm) or less.

21. The method of claim 15, wherein said low molecular weight polytetrafluoroethylene (LPTFE) dispersion has a mean particle size of 0.5 microns (μm) or less.

22. The method of claim 15, wherein said low molecular weight polytetrafluoroethylene (LPTFE) has a first melt temperature ($T_m$) of 329° C. or less.

23. The method of claim 15, wherein said low molecular weight polytetrafluoroethylene (LPTFE) has a first melt temperature ($T_m$) of 326° C. or less.

24. The method of claim 15, wherein said low molecular weight polytetrafluoroethylene (LPTFE) dispersion is obtained via emulsion polymerization and without being subjected to agglomeration, thermal degradation, or irradiation.

25. The method of claim 15, wherein said low molecular weight polytetrafluoroethylene (LPTFE) includes a modifying co-monomer in an amount less than 0.1 wt. % based on the weight of said low molecular weight polytetrafluoroethylene (LPTFE).

26. The method of claim 15, wherein said MFA has a melt flow rate (MFR) of at least 4.0 g/10 min.

27. The method of claim 15, wherein the low molecular weight polytetrafluoroethylene (LPTFE) is LPTFE homopolymer.

28. The method of claim 15, wherein the low molecular weight polytetrafluoroethylene (LPTFE) is perfluorinated.

29. The method of claim 15, wherein:
the blended fluoropolymer composition comprises a MFA content of 56 wt. % to 76 wt. % and a LPTFE content of 24 wt. % to 44 wt. %, based on the total solids of the LPTFE and MFA;
said low molecular weight polytetrafluoroethylene (LPTFE) dispersion has a mean particle size of 0.75 microns (μm) or less; and
said low molecular weight polytetrafluoroethylene (LPTFE) dispersion has a first melt temperature ($T_m$) of 329° C. or less.

30. The method of claim 29, wherein the blended fluoropolymer composition comprises a MFA content of 63 wt. % to 70 wt. % and a LPTFE content of 30 wt. % to 37 wt. %, based on the total solids of the LPTFE and MFA.

31. The method of claim 15, wherein said providing step further comprises mixing the liquid dispersions of LPTFE and PFA particles without coagulation of the particles.

* * * * *